United States Patent
Yana Motta et al.

(10) Patent No.: US 11,111,424 B2
(45) Date of Patent: Sep. 7, 2021

(54) HEAT TRANSFER COMPOSITIONS, METHODS, AND SYSTEMS

(71) Applicant: HONEYWELL INTERNATIONAL INC., Morris Plains, NJ (US)

(72) Inventors: Samuel F. Yana Motta, East Amherst, NY (US); Michael Petersen, Clarence Center, NY (US); Ankit Sethi, Buffalo, NY (US); Elizabet del Carmen Vera Becerra, Amherst, NY (US); Yang Zou, Williamsville, NY (US); Gregory Smith, Niagara Falls (CA)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/194,330

(22) Filed: Nov. 17, 2018

(65) Prior Publication Data

US 2019/0161660 A1  May 30, 2019

Related U.S. Application Data

(60) Provisional application No. 62/587,722, filed on Nov. 17, 2017, provisional application No. 62/592,494, (Continued)

(51) Int. Cl.
*C09K 5/04* (2006.01)
*C10M 107/32* (2006.01)
(Continued)

(52) U.S. Cl.
CPC ........... *C09K 5/044* (2013.01); *C10M 107/32* (2013.01); *C10M 171/008* (2013.01); *F25B 9/006* (2013.01); *C09K 2205/106* (2013.01); *C09K 2205/122* (2013.01); *C09K 2205/126* (2013.01); *C10M 2203/065* (2013.01); *C10M 2205/0265* (2013.01); *C10M 2205/0285* (2013.01); *C10M 2205/063* (2013.01); *C10M 2207/2835* (2013.01); *C10M 2209/1023* (2013.01);
(Continued)

(58) Field of Classification Search
CPC ........ F25B 9/006; F25B 9/008; F25B 31/008; F25B 40/00; F25B 2400/121; C10M 2203/065; C10M 2205/0265; C10M 2205/0285; C10M 2205/063; C10M 2207/2835; C10M 2209/1023; C10M 107/32; C10M 171/008; C10N 2020/097; C10N 2020/106; C10N 2020/101; C10N 2040/30; C09K 5/044; C09K 2205/106; C09K 2205/122; C09K 2205/126
See application file for complete search history.

(56) References Cited

U.S. PATENT DOCUMENTS

| | | | |
|---|---|---|---|
| 2004/0021124 A1* | 2/2004 | Cho ..................... | C09K 5/042 252/2 |
| 2008/0157022 A1* | 7/2008 | Singh .................... | C09K 5/045 252/68 |
| 2017/0073559 A1* | 3/2017 | Minor ................. | B01F 17/0035 |

* cited by examiner

*Primary Examiner* — Joseph F Trpisovsky
(74) *Attorney, Agent, or Firm* — Colleen D. Szuch

(57) ABSTRACT

A refrigerant composition, including trifluoroiodomethane ($CF_3I$); 1,1,1,2-tetrafluoropropene (HFO-1234yf); difluoromethane (HFC-32); and carbon dioxide ($CO_2$), for use in a heat exchange system, including refrigeration applications and in particular aspects to the use of such compositions as a replacement of the refrigerant R-404A for heating and cooling applications and to retrofitting heat exchange systems, including systems designed for use with R-404A.

20 Claims, 5 Drawing Sheets

Related U.S. Application Data filed on Nov. 30, 2017, provisional application No. 62/593,393, filed on Dec. 1, 2017.

(51) Int. Cl.
| | | |
|---|---|---|
| *F25B 9/00* | (2006.01) | |
| *C10M 171/00* | (2006.01) | |
| *F25B 40/00* | (2006.01) | |
| *F25B 31/00* | (2006.01) | |
| *C10N 20/00* | (2006.01) | |
| *C10N 40/30* | (2006.01) | |

(52) U.S. Cl.
CPC .. *C10N 2020/097* (2020.05); *C10N 2020/101* (2020.05); *C10N 2020/106* (2020.05); *C10N 2040/30* (2013.01); *F25B 9/008* (2013.01); *F25B 31/008* (2013.01); *F25B 40/00* (2013.01); *F25B 2400/121* (2013.01); *F25B 2400/13* (2013.01)

HEAT TRANSFER COMPOSITIONS, METHODS, AND SYSTEMS

CROSS REFERENCE TO RELATED APPLICATIONS

This application claims priority to U.S. Ser. No. 62/587,722 filed on Nov. 17, 2017 incorporated herein in its entirety.
This application claims priority to U.S. Ser. No. 62/592,494 filed on Nov. 30, 2017 incorporated herein in its entirety.
The present application claims the priority benefit of U.S. Provisional 62/593,393, filed Dec. 1, 2017, which is incorporated herein by reference.

FIELD OF THE INVENTION

This invention relates to compositions, methods, and systems having utility in refrigeration applications, with particular benefit in medium and low temperature refrigeration applications, and in particular aspects to refrigerant compositions for replacement of the refrigerant R-404A for heating and cooling applications in medium and low temperature refrigerant systems, including systems designed for use with R-404A, and to retrofitting medium and low temperature refrigerant systems, including systems designed for use with R-404A.

BACKGROUND

Mechanical refrigeration systems, and related heat transfer devices such as heat pumps and air conditioners, using refrigerant liquids are well known in the art for industrial, commercial, and domestic uses. Several fluorocarbon-based fluids have found widespread use in many residential, commercial and industrial applications, including as the working fluid in systems such as air conditioning, heat pump and refrigeration systems. Because of certain suspected environmental problems, including the relatively high global warming potentials associated with the use of some hydrofluorocarbon ("HFC") based compositions that have heretofore been used in these applications, it has become increasingly desirable to use fluids having low global warming potentials ("GWP") in addition to low or zero ozone depletion potentials, such as hydrofluoroolefins (hereinafter "HFOs"). For example, a number of governments have signed the Kyoto Protocol to protect the global environment and setting forth a reduction of CO2 emissions (global warming). Thus, there is a need for alternatives to replace high global warming HFCs.

One important type of refrigeration system is known as a "low temperature refrigeration system." Such systems are particularly important to the food manufacture, distribution and retail industries in that they play a vital role in ensuring that food which reaches the consumer is both fresh and fit to eat. In such low temperature refrigeration systems, a commonly used refrigerant has been HFC-404A or R-404A (the combination of HFC-125:HFC-143a:HFC134a in an approximate 44:52:4 weight percent). R-404A has an estimated GWP of 3922.

It is generally considered important, however, with respect to heat transfer fluids, that any potential substitute must also possess those properties present in many of the most widely used HFC based fluids, such as excellent heat transfer properties, chemical stability, low- or no-toxicity, non-flammability, and lubricant compatibility, among others. In addition, any replacement or retrofit for R-404A would desirably be a good match for the operating conditions of R-404A in such systems order to avoid modification or redesign of the system.

With regard to efficiency in use, it is important to note that a loss in refrigerant thermodynamic performance or energy efficiency may have secondary environmental impacts through increased fossil fuel usage arising from an increased demand for electrical energy. In other words, a proposed new refrigerant that has an improved GWP and/or ODP relative to an existing fluid might nevertheless be less environmentally friendly than the fluid it is replacing if another characteristic of the proposed new fluid, such as efficiency in use, results in increased environmental emissions indirectly, such as by requiring higher fuel combustion to achieve the same level of refrigeration. It is thus seen that the selection of a replacement or retrofit fluid is a complicated, challenging endeavor that may not have predictable results.

Furthermore, it is generally considered desirable for HFC refrigerant substitutes to be effective without major engineering changes to conventional vapor compression technology currently used with HFC refrigerants.

Flammability is another important property for many applications. That is, it is considered either important or essential in some applications, including particularly in certain heat transfer applications, to use compositions that are non-flammable. One advantage of the use of non-flammable refrigerants in a heat transfer system is flame suppression equipment will not be required in such systems in order to mitigate possible risks associated with leakage of refrigerant from the system. This advantage is especially important in systems that would suffer from the secondary disadvantage of the increased system weight that would be associated with, for example, transport refrigeration systems.

As used herein, the term "non-flammable" refers to compounds or compositions which are determined to be non-flammable as determined in accordance with ASTM standard E-681-2009 Standard Test Method for Concentration Limits of Flammability of Chemicals (Vapors and Gases) at conditions described in ASHRAE Standard 34-2016 Designation and Safety Classification of Refrigerants and described in Appendix B1 to ASHRAE Standard 34-2016, which is incorporated herein by reference and referred to herein for convenience as "Non-Flammability Test". Unfortunately, many materials that might otherwise be desirable for use in refrigerant compositions are not non-flammable as that term is used herein. For example, fluoroalkane difluoroethane (HFC-152a) and fluoroalkene 1,1,1-trifluoropropene (HFO-1243zf) have flammability profiles which make them less preferred for use in some applications.

It is critical for maintenance of system efficiency and proper and reliable functioning of the compressor, that lubricant circulating in a vapor compression heat transfer system is returned to the compressor to perform its intended lubricating function. Otherwise, lubricant might accumulate and become lodged in the coils and piping of the system, including in the heat transfer components. Furthermore, when lubricant accumulates on the inner surfaces of the evaporator, it lowers the heat exchange efficiency of the evaporator, and thereby reduces the efficiency of the system. For these reasons, it is desirable for many systems that the refrigerant is miscible over at least the operating temperature range of the system with the lubricant that is used in the system. Since R-404A is currently commonly used with polyol ester (POE) lubricating oils, a proposed replacement refrigerant is desirably miscible with POE lubricants over the temperature range in the system and for the concentrations of lubricant that are present in the system, particularly over the operating temperature ranges in the condenser and evaporator.

Applicants have thus come to appreciate a need for compositions, and particularly heat transfer compositions, that are highly advantageous in heating and cooling systems and methods, particularly medium and low temperature refrigeration systems, and even more particularly medium and low temperature refrigeration systems, including medium and low temperature transport refrigeration systems, that have been designed for use with or are suitable for use with R-404A.

SUMMARY OF THE INVENTION

Applicants have found that the compositions of the present invention satisfy in an exceptional and unexpected way the need for alternatives and/or replacements for and/or retrofits for refrigerants, in particular R-404A, in heat transfer applications in which has been commonly used. In particular the present invention provides heat transfer fluids, heat transfer methods and heat transfer systems that exhibit in preferred embodiments the desired mosaic of properties of excellent heat transfer properties (including being a close match in cooling efficiency and capacity to R-404A in such systems, including as a drop-in or near drop-in replacement for R-404A in low and medium temperature refrigeration), chemical stability, low or no toxicity, non-flammability, lubricant miscibility and lubricant compatibility in combination with low Global Warming Potential (GWP) and near zero ODP.

The present invention includes refrigerant comprising at least about 98.5% by weight of the following four compounds, with each compound being present in the following relative percentages:
about 41 to about 49% by weight trifluoroiodomethane ($CF_3I$);
about 36 to about 44% by weight 1,1,1,2-tetrafluoropropene (HFO-1234yf);
about 12 to about 15% by weight difluoromethane (HFC-32); and
1±0.2 to 3.5±0.2% by weight carbon dioxide ($CO_2$). Refrigerants as described in this paragraph are sometimes referred to for convenience as Refrigerant 1.

The present invention includes refrigerant comprising at least about 99.5% by weight of the following four compounds, with each compound being present in the following relative percentages:
about 41 to about 49% by weight trifluoroiodomethane ($CF_3I$);
about 36 to about 44% by weight 1,1,1,2-tetrafluoropropene (HFO-1234yf);
about 12 to about 15% by weight difluoromethane (HFC-32); and
1±0.2 to 3.5±0.2% by weight carbon dioxide ($CO_2$). Refrigerants as described in this paragraph are sometimes referred to for convenience as Refrigerant 2.

The present invention includes refrigerant consisting essentially of the following four compounds, with each compound being present in the following relative percentages: 41 to 49% by weight trifluoroiodomethane ($CF_3I$);
36 to 44% by weight 1,1,1,2-tetrafluoropropene (HFO-1234yf);
12 to 15% by weight difluoromethane (HFC-32); and
1±0.2 to 3.5±0.2% by weight carbon dioxide ($CO_2$). Refrigerants as described in this paragraph are sometimes referred to for convenience as Refrigerant 3.

The present invention includes refrigerant consisting of the following four compounds, with each compound being present in the following relative percentages:
41 to 49% by weight trifluoroiodomethane ($CF_3I$);
36 to 44% by weight 1,1,1,2-tetrafluoropropene (HFO-1234yf);
12 to 15% by weight difluoromethane (HFC-32); and
1±0.2 to 3.5±0.2% by weight carbon dioxide ($CO_2$). Refrigerants as described in this paragraph are sometimes referred to for convenience as Refrigerant 4.

The present invention includes to refrigerant comprising at least about 98.5% by weight of the following four compounds, with each compound being present in the following relative percentages:
about 43 to about 47% by weight trifluoroiodomethane ($CF_3I$);
about 38 to about 42% by weight 1,1,1,2-tetrafluoropropene (HFO-1234yf);
about 12 to about 15% by weight difluoromethane (HFC-32); and
1±0.2 to 3.5±0.2% by weight carbon dioxide ($CO_2$). Refrigerants as described in this paragraph are sometimes referred to for convenience as Refrigerant 5.

The present invention includes refrigerant comprising at least about 99.5% by weight of the following four compounds, with each compound being present in the following relative percentages:
about 43 to about 47% by weight trifluoroiodomethane ($CF_3I$);
about 38 to about 42% by weight 1,1,1,2-tetrafluoropropene (HFO-1234yf);
about 12 to about 15% by weight difluoromethane (HFC-32); and
1±0.2 to 3.5±0.2% by weight carbon dioxide ($CO_2$). Refrigerants as described in this paragraph are sometimes referred to for convenience as Refrigerant 6.

The present invention includes refrigerant consisting essentially of the following four compounds, with each compound being present in the following relative percentages:
about 43 to about 47% by weight trifluoroiodomethane (CF3I);
about 38 to about 42% by weight 1,1,1,2-tetrafluoropropene (HFO-1234yf);
about 12 to about 15% by weight difluoromethane (HFC-32); and
1±0.2 to 3.5±0.2% by weight carbon dioxide (CO2). Refrigerants as described in this paragraph are sometimes referred to for convenience as Refrigerant 7.

The present invention includes refrigerant consisting of the following four compounds, with each compound being present in the following relative percentages:
about 43 to about 47% by weight trifluoroiodomethane (CF3I);
about 38 to about 42% by weight 1,1,1,2-tetrafluoropropene (HFO-1234yf);
about 12 to about 15% by weight difluoromethane (HFC-32); and
1±0.2 to 3.5±0.2% by weight carbon dioxide (CO2). Refrigerants as described in this paragraph are sometimes referred to for convenience as Refrigerant 8.

The present invention includes refrigerant comprising at least about 97% by weight of the following four compounds, with each compound being present in the following relative percentages:
45±1% by weight trifluoroiodomethane ($CF_3I$);
40±1% by weight 1,1,1,2-tetrafluoropropene (HFO-1234yf);
13±1% by weight difluoromethane (HFC-32); and
2%±0.2% by weight carbon dioxide ($CO_2$). Refrigerants as described in this paragraph are sometimes referred to for convenience as Refrigerant 9.

The present invention includes refrigerant comprising at least about 98.5% by weight of the following four compounds, with each compound being present in the following relative percentages:
45±1% by weight trifluoroiodomethane ($CF_3I$);
40±1% by weight 1,1,1,2-tetrafluoropropene (HFO-1234yf);
13±1% by weight difluoromethane (HFC-32); and
2%±0.2% by weight carbon dioxide ($CO_2$). Refrigerants as described in this paragraph are sometimes referred to for convenience as Refrigerant 10.

The present invention includes refrigerant comprising at least about 99.5% by weight of the following four compounds, with each compound being present in the following relative percentages:
45±1% by weight trifluoroiodomethane ($CF_3I$);
40±1% by weight 1,1,1,2-tetrafluoropropene (HFO-1234yf);
13±1% by weight difluoromethane (HFC-32); and
2%±0.2% by weight carbon dioxide ($CO_2$). Refrigerants as described in this paragraph are sometimes referred to for convenience as Refrigerant 11.

The present invention includes refrigerant consisting essentially of the following four compounds, with each compound being present in the following relative percentages:
45±1% by weight trifluoroiodomethane ($CF_3I$);
40±1% by weight 1,1,1,2-tetrafluoropropene (HFO-1234yf);
13±1% by weight difluoromethane (HFC-32); and
2%±0.2% by weight carbon dioxide ($CO_2$). Refrigerants as described in this paragraph are sometimes referred to for convenience as Refrigerant 12.

The present invention includes refrigerant consisting of the following four compounds, with each compound being present in the following relative percentages:
45±1% by weight trifluoroiodomethane ($CF_3I$);
40±1% by weight 1,1,1,2-tetrafluoropropene (HFO-1234yf);
13±1% by weight difluoromethane (HFC-32); and
2%±0.2% by weight carbon dioxide ($CO_2$). Refrigerants as described in this paragraph are sometimes referred to for convenience as Refrigerant 13.

The present invention includes refrigerant comprising at least about 98.5% by weight of the following four compounds with each compound being present in the following relative percentages:
about 41 to about 49% by weight trifluoroiodomethane ($CF_3I$);
about 36 to about 44% by weight 1,1,1,2-tetrafluoropropene (HFO-1234yf);
about 12 to about 15% by weight difluoromethane (HFC-32); and
1±0.2% to 3.5±0.2% by weight carbon dioxide ($CO_2$), wherein said refrigerant is non-flammable and has a GWP of 100 or less. Refrigerants as described in this paragraph are sometimes referred to for convenience as Refrigerant 14.

The present invention includes refrigerant comprising at least about 98.5% by weight of the following four compounds, with each compound being present in the following relative percentages:
about 43 to about 47% by weight trifluoroiodomethane ($CF_3I$);
about 38 to about 42% by weight 1,1,1,2-tetrafluoropropene (HFO-1234yf);
about 12 to about 15% by weight difluoromethane (HFC-32); and
1±0.2 to 3.5±0.2% by weight carbon dioxide ($CO_2$), wherein said refrigerant is non-flammable and has a GWP of 100 or less. Refrigerants as described in this paragraph are sometimes referred to for convenience as Refrigerant 15.

The present invention includes refrigerant comprising at least about 98.5% by weight of the following four compounds, with each compound being present in the following relative percentages:
45±1% by weight trifluoroiodomethane ($CF_3I$);
40±1% by weight 1,1,1,2-tetrafluoropropene (HFO-1234yf);
13±1% by weight difluoromethane (HFC-32); and
2%±0.2% by weight carbon dioxide ($CO_2$), wherein said refrigerant is non-flammable and wherein said refrigerant has a GWP of 100 or less. Refrigerants as described in this paragraph are sometimes referred to for convenience as Refrigerant 16.

The present invention includes refrigerant comprising at least about 98.5% by weight of the following four compounds, with each compound being present in the following relative percentages:
45±1% by weight trifluoroiodomethane ($CF_3I$);
40±1% by weight 1,1,1,2-tetrafluoropropene (HFO-1234yf);
13±1% by weight difluoromethane (HFC-32); and
2%±0.2% by weight carbon dioxide ($CO_2$), wherein said refrigerant is non-flammable and wherein said refrigerant has a GWP of 100 or less. Refrigerants as described in this paragraph are sometimes referred to for convenience as Refrigerant 17

The present invention includes refrigerant comprising at least about 98.5% by weight of the following four compounds, with each compound being present in the following relative percentages:
43±0.2% to 45±0.2% by weight trifluoroiodomethane ($CF_3I$);
40±0.5% by weight 1,1,1,2-tetrafluoropropene (HFO-1234yf);
13±0.2 to 14±0.2% by weight difluoromethane (HFC-32); and
2±0.2% to 3±0.2% by weight carbon dioxide ($CO_2$). Refrigerants as described in this paragraph are sometimes referred to for convenience as Refrigerant 18.

The present invention includes refrigerant comprising at least about 99.5% by weight of the following four compounds, with each compound being present in the following relative percentages:
43±0.2% to 45±0.2% by weight trifluoroiodomethane (CF3I);
40±0.5% by weight 1,1,1,2-tetrafluoropropene (HFO-1234yf);
13±0.2 to 14±0.2% by weight difluoromethane (HFC-32); and
2±0.2% to 3±0.2% by weight carbon dioxide (CO2). Refrigerants as described in this paragraph are sometimes referred to for convenience as Refrigerant 19.

The present invention includes refrigerant consisting essentially of the following four compounds, with each compound being present in the following relative percentages:

43±0.2% to 45±0.2% by weight trifluoroiodomethane (CF3I);
40±0.5% by weight 1,1,1,2-tetrafluoropropene (HFO-1234yf);
13±0.2 to 14±0.2% by weight difluoromethane (HFC-32); and
2±0.2% to 3±0.2% by weight carbon dioxide (CO2). Refrigerants as described in this paragraph are sometimes referred to for convenience as Refrigerant 20.

DETAILED DESCRIPTION

Figure 1:
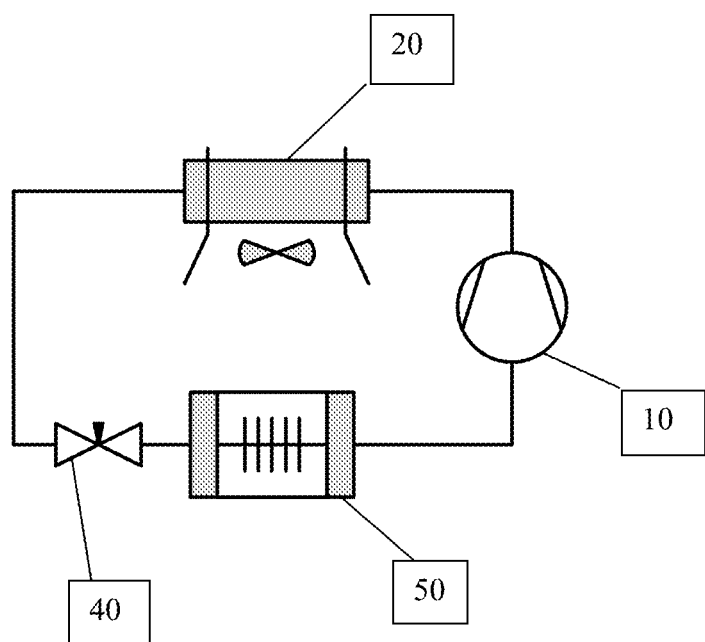
FIG. 1 is a schematic representation of an exemplary heat transfer system useful in low and medium temperature refrigeration.

Definitions:

For the purposes of this invention, the term "about" in relation to the amounts expressed in weight percent means that the amount of the component can vary by an amount of +/−2% by weight.

For the purposes of this invention, the term "about" in relation to temperatures in degrees centigrade (° C.) means that the stated temperature can vary by an amount of +/−5° C.

The term "capacity" is the amount of cooling provided, in BTUs/hr, by the refrigerant in the refrigeration system. This is experimentally determined by multiplying the change in enthalpy in BTU/lb, of the refrigerant as it passes through the evaporator by the mass flow rate of the refrigerant. The enthalpy can be determined from the measurement of the pressure and temperature of the refrigerant. The capacity of the refrigeration system relates to the ability to maintain an area to be cooled at a specific temperature. The capacity of a refrigerant represents the amount of cooling or heating that it provides and provides some measure of the capability of a compressor to pump quantities of heat for a given volumetric flow rate of refrigerant. In other words, given a specific compressor, a refrigerant with a higher capacity will deliver more cooling or heating power.

The phrase "coefficient of performance" (hereinafter "COP") is a universally accepted measure of refrigerant performance, especially useful in representing the relative thermodynamic efficiency of a refrigerant in a specific heating or cooling cycle involving evaporation or condensation of the refrigerant. In refrigeration engineering, this term expresses the ratio of useful refrigeration or cooling capacity to the energy applied by the compressor in compressing the vapor and therefore expresses the capability of a given compressor to pump quantities of heat for a given volumetric flow rate of a heat transfer fluid, such as a refrigerant. In other words, given a specific compressor, a refrigerant with a higher COP will deliver more cooling or heating power. One means for estimating COP of a refrigerant at specific operating conditions is from the thermodynamic properties of the refrigerant using standard refrigeration cycle analysis techniques (see for example, R. C. Downing, FLUOROCARBON REFRIGERANTS HANDBOOK, Chapter 3, Prentice-Hall, 1988 which is incorporated herein by reference in its entirety).

The phrase "discharge temperature" refers to the temperature of the refrigerant at the outlet of the compressor. The advantage of a low discharge temperature is that it permits the use of existing equipment without activation of the thermal protection aspects of the system which are preferably designed to protect compressor components and avoids the use of costly controls such as liquid injection to reduce discharge temperature.

The phrase "Global Warming Potential" (hereinafter "GWP") was developed to allow comparisons of the global warming impact of different gases. Specifically, it is a measure of how much energy the emission of one ton of a gas will absorb over a given period of time, relative to the emission of one ton of carbon dioxide. The larger the GWP, the more that a given gas warms the Earth compared to CO2 over that time period. The time period usually used for GWP is 100 years. GWP provides a common measure, which allows analysts to add up emission estimates of different gases. See http://www.protocolodemontreal.org.br/site/images/publicacoes/setor_manufatura_equipam entos_refrigeracao_arcondicionado/Como_calcular_el_Potencial_de-_Calentamiento_Atmos ferico_en_las_mezclas_de_refrigerantes.pdf The term "Occupational Exposure Limit (OEL)" is determined in accordance with ASHRAE Standard 34-2016 Designation and Safety Classification of Refrigerants.

The term "mass flow rate" is the mass of refrigerant passing through a conduit per unit of time.

As used herein, the term "replacement" means the use of a composition of the present invention in a heat transfer system that had been designed for use with, or is commonly used with, or is suitable for use with another refrigerant. By way of example, when a refrigerant or heat transfer composition of the present invention is used in a heat transfer system that was designed for use with R-404A, then the refrigerant or heat transfer composition of the present invention is a replacement for R-404A in said system. It will thus be understood that the term "replacement" includes the use of the refrigerants and heat transfer compositions of the present invention in both new and existing systems that had been designed for use with, are commonly used with, or are suitable for use with R-404A.

As used herein the terms "retrofit" and "retrofitting" mean and refer to system and methods which involve removing at least a portion of an refrigerant from an existing heat transfer system and introducing a different refrigerant into the system such that the system is operable without requiring substantial engineering modification of the existing system, particularly without modification of the condenser, the evaporator and/or the expansion valve.

The phrase "thermodynamic glide" applies to zeotropic refrigerant mixtures that have varying temperatures during phase change processes in the evaporator or condenser at constant pressure.

The term "low temperature refrigeration system" refers to heat transfer systems which operate with a condensing temperature of from about 20° C. to about 60° C. and evaporating temperature of from about −45° C. up to and including −12° C.

The term "medium temperature refrigeration system" refers to heat transfer systems which operate with a condensing temperature of from about 20° C. to about 60° C. and evaporating temperature of from −12° C. to about 0° C.

The term "supermarket refrigeration" as used herein refers to commercial refrigeration systems that are used to maintain chilled or frozen food in both product display cases and storage refrigerators.

The term "transport refrigeration" as used herein refers to refrigeration system that are used in the transportation of chilled or frozen products by means of trucks, trailers, vans, intermodal containers and boxes. The term also includes the use of refrigeration and air conditioning on merchant, naval and fishing vessels above about 100 gross tonnes (GT) (over about 24 m in length).

Refrigerants and Heat Transfer Compositions

Applicants have found that the refrigerant of the present invention, including each of Refrigerants 1-20 as described herein, is capable of providing exceptionally advantageous properties including: heat transfer properties, low or no toxicity, non-flammability, near zero ozone depletion potential ("ODP"), and lubricant compatibility, including miscibility with POE lubricants over the operating temperature and concentration ranges used in low and medium temperature refrigeration systems, as well as low GWP, especially as a replacement and as a retrofit for R-404A in low and medium temperature refrigeration systems, including in prior R-404A transport refrigeration systems, prior 404A commercial refrigeration systems, in prior 404A supermarket refrigeration systems, in prior 404A self-contained refrigeration systems, prior R-404A industrial refrigeration systems, prior R-404A plug-in and vending machines, prior R-404A vapor injection refrigeration systems, and prior R-404A liquid injection refrigeration systems.

A particular advantage of the refrigerants of the present invention is that they are non-flammable when tested in accordance with the Non-Flammability Test defined herein. It will be appreciated by the skilled person that the flammability of a refrigerant is an important characteristic for use in certain important heat transfer applications. Thus, it is a desire in the art to provide a refrigerant composition which can be used as a replacement and/or a retrofit for R-404A which has excellent heat transfer properties, low or no toxicity, near zero ODP, and lubricant compatibility, including miscibility with POE lubricants over the operating temperature and concentration ranges used in low and medium temperature refrigeration systems, and which maintains non-flammability in use. This desirable advantage can be achieved met by the refrigerants of the present invention.

Another particular advantage of the refrigerants of the present invention is that exhibit an excellent match to the capacity and COP of R-404A in low and medium temperature systems, including in particular low and medium temperature transport refrigeration systems and supermarket refrigeration systems, which provided the unexpected advantage of excellent performance in retrofit methods for such system based on the refrigerants of the present invention, including each of Refrigerants 1-20.

Applicants have found that the refrigerant compositions of the invention are capable of achieving a difficult to achieve combination of properties including particularly low GWP. Thus, the compositions of the invention have a GWP of 150 or less and preferably less than 100.

In addition, the refrigerant compositions of the invention have a low ODP. Thus, the compositions of the invention have an ODP of not greater than 0.05, preferably not greater than 0.02, and more preferably about zero.

In addition, the refrigerant compositions of the invention show acceptable toxicity and preferably have an OEL of greater than about 400. As those skilled in the art are aware, a non-flammable refrigerant that has an OEL of greater than about 400 is advantageous since it results in the refrigerant being classified in the desirable Class A of ASHRAE standard 34.

Applicants have found that the heat transfer compositions of the present invention, including heat transfer compositions that include each of Refrigerants 1-13 as described herein, is capable of providing exceptionally advantageous properties including: heat transfer properties, chemical stability under the conditions of use, low or no toxicity, non-flammability, near zero ozone depletion potential ("ODP"), and lubricant compatibility, including miscibility with POE lubricants over the operating temperature and concentration ranges used in low and medium temperature refrigeration systems, as well as low GWP, especially as a replacement for R-404A in low and medium temperature refrigeration systems, including in prior R-404A transport refrigeration systems, prior 404A commercial refrigeration systems, in prior 404A supermarket refrigeration systems, in prior 404A self-contained refrigeration systems, prior R-404A industrial refrigeration systems, prior R-404A plug-in and vending machines, prior R-404A vapor injection refrigeration systems, and prior R-404A liquid injection refrigeration systems.

The heat transfer compositions can consist essentially of any refrigerant of the present invention, including each of Refrigerants 1-20.

The heat transfer compositions of the present invention can consist of any refrigerant of the present invention, including each of Refrigerants 1-20.

The heat transfer compositions of the invention may include other components for the purpose of enhancing or providing certain functionality to the compositions. Such other components may include one or more of lubricants, dyes, solubilizing agents, compatibilizers, stabilizers, antioxidants, corrosion inhibitors, extreme pressure additives and anti-wear additives.

Lubricants

The heat transfer composition of the invention particularly comprises a refrigerant as discussed herein, including each of Refrigerants 1-20, and a lubricant. Applicants have found that the heat transfer compositions of the present invention, including heat transfer compositions that include a lubricant, and particularly a POE lubricant and each of Refrigerants 1-20 as described herein, is capable of providing exceptionally advantageous properties including, in addition to the advantageous properties identified herein with respect to the refrigerant, excellent refrigerant/lubricant compatibility, including miscibility with POE lubricants over the operating temperature and concentration ranges used in low and medium temperature refrigeration systems, especially as a replacement for and as a retrofit for R-404A in low and medium temperature refrigeration systems, including in low and medium temperature transport refrigeration systems, commercial refrigeration systems, supermarket refrigeration systems, self-contained refrigeration systems, industrial refrigeration systems, and plug-in and vending machines.

In general, the heat transfer compositions of the present invention that include a lubricant comprise lubricant in amounts preferably of from about 0.1% by weight to about 5%, or from 0.1% by weight to about 1% by weight, or from 0.1% by weight to about 0.5% by weight, based on the weight of the heat transfer composition.

Commonly used refrigerant lubricants such as polyol esters (POEs), polyalkylene glycols (PAGs), silicone oils, mineral oil, alkylbenzenes (ABs), polyvinyl ethers (PVEs), polyethers (PEs) and poly(alpha-olefin) (PAO) that are used in refrigeration machinery may be used with the refrigerant compositions of the present invention.

Preferably the lubricants are selected from POEs, mineral oil, ABs, PVE, and PEs.

Preferably the lubricants are POEs.

In general, the heat transfer compositions of the present invention that include POE lubricant comprise POE lubricant in amounts preferably of from about 0.1% by weight to about 5%, or from 0.1% by weight to about 1% by weight, or from 0.1% by weight to about 0.5% by weight, based on the weight of the heat transfer composition.

Commercially available POEs that are preferred for use in the present heat transfer compositions include neopentyl glycol dipelargonate which is available as Emery 2917 (registered trademark) and Hatcol 2370 (registered trademark) and pentaerythritol derivatives including those sold under the trade designations Emkarate RL32-3MAF and Emkarate RL68H by CPI Fluid Engineering. Emkarate RL32-3MAF and Emkarate RL68H are preferred POE lubricants having the properties identified below:

| Property | RL32-3MAF | RL68H |
|---|---|---|
| Viscosity @ 40° C. (ASTM D445), cSt | about 31 | about 67 |
| Viscosity @ 100° C. (ASTM D445), cSt | about 5.6 | about 9.4 |
| Pour Point (ASTM D97), ° C. | about −40 | about −40 |

Commercially available polyvinyl ethers that are preferred for use in the present heat transfer compositions include those lubricants sold under the trade designations FVC32D and FVC68D, from Idemitsu.

Commercially available mineral oils that are preferred for use in the present heat transfer compositions include Witco LP 250 (registered trademark) from Witco, Suniso 3GS from Witco and Calumet R015 from Calumet. Commercially available alkylbenzene lubricants include Zerol 150 (registered trademark) and Zerol 300° from Shrieve Chemical.

A preferred heat transfer composition comprises Refrigerant 1 and POE lubricant.

A preferred heat transfer composition comprises Refrigerant 2 and POE lubricant.

A preferred heat transfer composition comprises Refrigerant 3 and POE lubricant.

A preferred heat transfer composition comprises Refrigerant 4 and POE lubricant.

A preferred heat transfer composition comprises Refrigerant 5 and POE lubricant.

A preferred heat transfer composition comprises Refrigerant 6 and POE lubricant.

A preferred heat transfer composition comprises Refrigerant 7 and POE lubricant.

A preferred heat transfer composition comprises Refrigerant 8 and POE lubricant.

A preferred heat transfer composition comprises Refrigerant 9 and POE lubricant.

A preferred heat transfer composition comprises Refrigerant 10 and POE lubricant.

A preferred heat transfer composition comprises Refrigerant 11 and POE lubricant.

A preferred heat transfer composition comprises Refrigerant 12 and POE lubricant.

A preferred heat transfer composition comprises Refrigerant 13 and POE lubricant.

A preferred heat transfer composition comprises Refrigerant 14 and POE lubricant.

A preferred heat transfer composition comprises Refrigerant 15 and POE lubricant.

A preferred heat transfer composition comprises Refrigerant 16 and POE lubricant.

A preferred heat transfer composition comprises Refrigerant 17 and POE lubricant.

A preferred heat transfer composition comprises Refrigerant 18 and POE lubricant.

A preferred heat transfer composition comprises Refrigerant 19 and POE lubricant.

A preferred heat transfer composition comprises Refrigerant 20 and POE lubricant.

A lubricant consisting essentially of a POE having a viscosity at 40° C. measured in accordance with ASTM D445 of from about 30 to about 70 is referred to herein as Lubricant 1.

A preferred heat transfer composition comprises Refrigerant 1 and Lubricant 1.

A preferred heat transfer composition comprises Refrigerant 2 and Lubricant 1.

A preferred heat transfer composition comprises Refrigerant 3 and Lubricant 1.

A preferred heat transfer composition comprises Refrigerant 4 and Lubricant 1.

A preferred heat transfer composition comprises Refrigerant 5 and Lubricant 1.

A preferred heat transfer composition comprises Refrigerant 6 and Lubricant 1

A preferred heat transfer composition comprises Refrigerant 7 and Lubricant 1.

A preferred heat transfer composition comprises Refrigerant 8 and Lubricant 1.

A preferred heat transfer composition comprises Refrigerant 9 and Lubricant 1.

A preferred heat transfer composition comprises Refrigerant 10 and Lubricant 1.

A preferred heat transfer composition comprises Refrigerant 11 and Lubricant 1.

A preferred heat transfer composition comprises Refrigerant 12 and Lubricant 1.

A preferred heat transfer composition comprises Refrigerant 13 and Lubricant 1.

A preferred heat transfer composition comprises Refrigerant 14 and Lubricant 1.

A preferred heat transfer composition comprises Refrigerant 15 and Lubricant 1.

A preferred heat transfer composition comprises Refrigerant 16 and Lubricant 1.

A preferred heat transfer composition comprises Refrigerant 17 and Lubricant 1.

A preferred heat transfer composition comprises Refrigerant 18 and Lubricant 1.

A preferred heat transfer composition comprises Refrigerant 19 and Lubricant 1.

A preferred heat transfer composition comprises Refrigerant 20 and Lubricant 1.

A lubricant consisting essentially of a POE having a viscosity at 40° C. measured in accordance with ASTM D445 of from about 30 to about 70 and which is present in an amount of from about 0.1% to about 1% based on the weight of the heat transfer composition, is referred to herein as Lubricant 2.

A preferred heat transfer composition comprises Refrigerant 1 and Lubricant 2.

A preferred heat transfer composition comprises Refrigerant 2 and Lubricant 2.

A preferred heat transfer composition comprises Refrigerant 3 and Lubricant 2.

A preferred heat transfer composition comprises Refrigerant 4 and Lubricant 2.

A preferred heat transfer composition comprises Refrigerant 5 and Lubricant 2.

A preferred heat transfer composition comprises Refrigerant 6 and Lubricant 2.

A preferred heat transfer composition comprises Refrigerant 7 and Lubricant 2.

A preferred heat transfer composition comprises Refrigerant 8 and Lubricant 2.

A preferred heat transfer composition comprises Refrigerant 9 and Lubricant 2.

A preferred heat transfer composition comprises Refrigerant 10 and Lubricant 2.

A preferred heat transfer composition comprises Refrigerant 11 and Lubricant 2.

A preferred heat transfer composition comprises Refrigerant 12 and Lubricant 2.

A preferred heat transfer composition comprises Refrigerant 13 and Lubricant 2.

A preferred heat transfer composition comprises Refrigerant 14 and Lubricant 2.

A preferred heat transfer composition comprises Refrigerant 15 and Lubricant 2.

A preferred heat transfer composition comprises Refrigerant 16 and Lubricant 2.

A preferred heat transfer composition comprises Refrigerant 17 and Lubricant 2.

A preferred heat transfer composition comprises Refrigerant 18 and Lubricant 2.

A preferred heat transfer composition comprises Refrigerant 19 and Lubricant 2.

A preferred heat transfer composition comprises Refrigerant 20 and Lubricant 2.

A preferred heat transfer composition comprises a refrigerant of the present invention, including each of Refrigerants 1-20, and from about 0.1% to about 5%, or from about 0.1% to about 1%, or from about 0.1% to about 0.5%, of a lubricant, wherein said percentage is based on the weight of the lubricant in the heat transfer composition.

A preferred heat transfer composition comprises a refrigerant of the present invention, including each of Refrigerants 1-20, and from about 0.1% to about 5%, or from about 0.1% to about 1%, or from about 0.1% to about 0.5%, of a POE lubricant, wherein said percentage is based on the weight of the lubricant in the heat transfer composition.

A preferred heat transfer composition comprises a refrigerant of the present invention, including each of Refrigerants 1-20, and from about 0.1% to about 5% or from about 0.1% to about 1% of a Lubricant 1, wherein said percentage is based on the weight of the lubricant in the heat transfer composition.

A lubricant consisting essentially of a POE having a viscosity at 40° C. measured in accordance with ASTM D445 of from about 30 to about 70 and which is present in an amount of from about 0.1% to about 0.5% based on the weight of the heat transfer composition, is referred to herein as Lubricant 3.

A preferred heat transfer composition comprises a refrigerant of the present invention, including each of Refrigerants 1-20, and Lubricant 3.

A lubricant consisting essentially of a POE having a viscosity at 40° C. measured in accordance with ASTM D445 of from about 30 to about 70 and which is present in an amount of from about 0.1% to about 0.5% based on the weight of the heat transfer composition, is referred to herein as Lubricant 4.

A preferred heat transfer composition comprises a refrigerant of the present invention, including each of Refrigerants 1-20, and Lubricant 4.

Stabilizers:

The heat transfer composition of the invention particularly comprises a refrigerant as discussed herein, including each of Refrigerants 1-20, and a stabilizer. Applicants have found that the heat transfer compositions of the present invention, including heat transfer compositions that include a stabilizer and each of Refrigerants 1-20 as described herein, is capable of providing exceptionally advantageous properties including, in addition to the advantageous properties identified herein with respect to the refrigerant, chemical stability over the operating temperature and concentration ranges used in low and medium temperature refrigeration systems, especially as a replacement for R-404A in low and medium temperature refrigeration systems, including in prior R-404A transport refrigeration systems, prior 404A commercial refrigeration systems, in prior 404A supermarket refrigeration systems, in prior 404A self-contained refrigeration systems, prior R-404A industrial refrigeration systems, prior R-404A plug-in and vending machines, prior R-404A vapor injection refrigeration systems, and prior R-404A liquid injection refrigeration systems.

In preferred embodiments the stabilizer comprises one or more of alkylated naphthalene compounds, diene-based compounds, phenol-based compounds and isobutylene. Other compounds that may be used in the stabilizer include phosphorus-based compounds, nitrogen-based compounds and epoxide compounds. Preferred compounds within each of these groups are described below.

Alkylated Naphthalenes

Applicants have surprisingly and unexpectedly found that alkylated Naphthalenes are highly effective as stabilizers for the heat transfer compositions of the present invention. As used herein, the term "alkylated naphthalene" refers to compounds having the following structure:

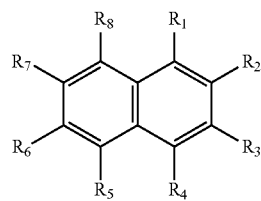

where each $R_1$-$R_8$ is independently selected from linear alkyl group, a branched alkyl group and hydrogen. The particular length of the alkyl chains and the mixtures or branched and straight chains and hydrogens can vary within the scope of the present invention, and it will be appreciated and understood by those skilled in the art that such variation is reflected the physical properties of the alkylated naphthalene, including in particular the viscosity of the alkylated compound, and producers of such materials frequently define the materials by reference to one or more of such properties as an alternative the specification of the particular R groups.

Applicants have found unexpected, surprising and advantageous results are associated with the use of alkylated naphthalene as a stabilizer according to the present invention having the following properties, and alkylated naphthalene compounds having the indicated properties are referred to for convenience herein as Alkylated Naphthalene 1-Alkylated Naphthalene 5 as indicated respectively in rows 1-5 in the Alkylated Naphthalene Property Table 1 below:

TABLE 1

| | ALKYLATED NAPHTHALENE PROPERTY | | | | |
|---|---|---|---|---|---|
| Property | Alkylated Naphthalene 1 (AN1) | Alkylated Naphthalene 2 (AN2) | Alkylated Naphthalene 3 (AN3) | Alkylated Naphthalene 4 (AN4) | Alkylated Naphthalene 5 (AN5) |
| Viscosity @ 40° C. (ASTM D445), cSt | 20-200 | 20-100 | 20-50 | 30-40 | about 36 |
| Viscosity @ 100° C. (ASTM D445), cSt | 3-20 | 3-10 | 3-8 | 5-7 | about 5.6 |
| Pour Point (ASTM D97), ° C. | −50 to −20 | −45 to −25 | −40 to −30 | −35 to −30 | about −33 |

As used herein in connection with viscosity at 40° C. measured according to ASTM D445, the term "about" means+/−4 cSt.

As used herein in connection with viscosity at 100° C. measured according to ASTM D445, the term "about" means+/−0.4 cSt.

As used herein in connection with pour point as measured according to ASTM D97, the term "about" means+/−5° C.

Applicants have also found that unexpected, surprising and advantageous results are associated with the use of alkylated naphthalene as a stabilizer according to the present invention having the following properties, and alkylated naphthalene compounds having the indicated properties are referred to for convenience herein as Alkylated Naphthalene 6-Alkylated Naphthalene 10 as indicated respectively in rows 6-10 in the Alkylated Naphthalene Property Table 2 below:

TABLE 2

| | ALKYLATED NAPHTHALENE PROPERTY | | | | |
|---|---|---|---|---|---|
| Property | Alkylated Naphthalene 6 (AN6) | Alkylated Naphthalene 7 (AN7) | Alkylated Naphthalene 8 (AN8) | Alkylated Naphthalene 9 (AN9) | Alkylated Naphthalene 10 (AN10) |
| Viscosity @ 40° C. (ASTM D445), cSt | 20-200 | 20-100 | 20-50 | 30-40 | about 36 |
| Viscosity @ 100° C. (ASTM D445), cSt | 3-20 | 3-10 | 3-8 | 5-7 | about 5.6 |
| Aniline Point (ASTM D611), ° C. | 40-110 | 50-90 | 50-80 | 60-70 | about 36 |

TABLE 2-continued

ALKYLATED NAPHTHALENE PROPERTY

| Property | Alkylated Naphthalene 6 (AN6) | Alkylated Naphthalene 7 (AN7) | Alkylated Naphthalene 8 (AN8) | Alkylated Naphthalene 9 (AN9) | Alkylated Naphthalene 10 (AN10) |
|---|---|---|---|---|---|
| Noack Volatility CEC L40 (ASTM D6375), wt % | 1-50 | 5-30 | 5-15 | 10-15 | about 12 |
| Pour Point (ASTM D97), ° C. | −50 to −20 | −45 to −25 | −40 to −30 | −35 to −30 | about −33 |
| Flash Point (ASTM D92)), ° C. | 200-300 | 200-270 | 220-250 | 230-240 | about 236 |

Examples of alkylated naphthalenes within the meaning of Alkylated Naphthalene 1 through Alkylated Naphthalene 6 include those sold by King Industries under the trade designations NA-LUBE KR-007A; KR-008, KR-009; KR-015; KR-019; KR-005FG; KR-015FG; and KR-029FG.

Examples of alkylated naphthalenes within the meaning of Alkylated Naphthalene 2 and Alkylated Naphthalene 7 include those sold by King Industries under the trade designations NA-LUBE KR-007A; KR-008, KR-009; and KR-005FG.

An example of an alkylated naphthalene that is within the meaning of Alkylated Naphthalene 5 and Alkylated Naphthalene 10 includes the product sold by King Industries under the trade designation NA-LUBE KR-008.

The alkylated naphthalene is preferably in the heat transfer compositions of the present invention that include a refrigerant of the present invention, including each of Refrigerants 1-20, wherein the alkylated naphthalene is present in an amount of from 0.01% to about 10%, or from about 1.5% to about 4.5%, or from about 2.5% to about 3.5%, where amounts are in percent by weight based on the amount of alkylated naphthalene plus refrigerant.

Diene-Based Compounds

The diene-based compounds can include C3 to C15 dienes and to compounds formed by reaction of any two or more C3 to C4 dienes. Preferably, the diene-based compounds are selected from the group consisting of allyl ethers, propadiene, butadiene, isoprene, and terpenes. The diene-based compounds are preferably terpenes, which include but are not limited to terebene, retinal, geraniol, terpinene, delta-3 carene, terpinolene, phellandrene, fenchene, myrcene, farnesene, pinene, nerol, citral, camphor, menthol, limonene, nerolidol, phytol, carnosic acid, and vitamin A1. Preferably, the stabilizer is farnesene. Preferred terpene stabilizers are disclosed in U.S. Provisional Patent Application No. 60/638,003 filed on Dec. 12, 2004, published as US 2006/0167044A1, which is incorporated herein by reference. In addition, the diene-based compounds can be provided in the heat transfer composition in an amount greater than 0 and preferably from 0.0001% by weight to about 5% by weight, preferably 0.001% by weight to about 2.5% by weight, and more preferably from 0.01% to about 1% by weight. In each case, percentage by weight refers to the weight of the diene-based compound(s) plus refrigerant in the heat transfer composition.

Phenol-Based Compounds

The phenol-based compound can be one or more compounds selected from 4,4'-methylenebis(2,6-di-tert-butylphenol); 4,4'-bis(2,6-di-tert-butylphenol); 2,2- or 4,4-biphenyldiols, including 4,4'-bis(2-methyl-6-tert-butylphenol); derivatives of 2,2- or 4,4-biphenyldiols; 2,2'-methylenebis(4-ethyl-6-tertbutylphenol); 2,2'-methylenebis(4-methyl-6-tert-butylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol: 2,4-dimethyl-6-tert-butylphenol; 2,6-di-tert-alpha-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis (3,5-di-tert-butyl-4-hydroxybenzyl)sulfide, tocopherol, hydroquinone, 2,2'6,6'-tetra-tert-butyl-4,4'-methylenediphenol and t-butyl hydroquinone, and preferably BHT.

The phenol compounds can be provided in the heat transfer composition in an amount of greater than 0 and preferably from 0.0001% by weight to about 5% by weight, preferably 0.001% by weight to about 2.5% by weight, and more preferably from 0.01% to about 1% by weight. In each case, percentage by weight refers to the weight of the phenol-based compound(s) plus refrigerant in the heat transfer composition.

The Phosphorus-Based Compounds

The phosphorus compound can be a phosphite or a phosphate compound. For the purposes of this invention, the phosphite compound can be a diaryl, dialkyl, triaryl and/or trialkyl phosphite, and/or a mixed aryl/alkyl di- or tri-substituted phosphite, in particular one or more compounds selected from hindered phosphites, tris-(di-tert-butylphenyl) phosphite, di-n-octyl phophite, iso-octyl diphenyl phosphite, iso-decyl diphenyl phosphite, tri-iso-decyl phosphate, triphenyl phosphite and diphenyl phosphite, particularly diphenyl phosphite. The phosphate compounds can be a triaryl phosphate, trialkyl phosphate, alkyl mono acid phosphate, aryl diacid phosphate, amine phosphate, preferably triaryl phosphate and/or a trialkyl phosphate, particularly tri-n-butyl phosphate.

The phosphorus compounds can be provided in the heat transfer composition in an amount of greater than 0 and preferably from 0.0001% by weight to about 5% by weight, preferably 0.001% by weight to about 2.5% by weight, and more preferably from 0.01% to about 1% by weight. In each case, by weight refers to weight of the phosphorous-based compound(s) plus refrigerant in the heat transfer composition.

The Nitrogen Compound

When the stabilizer includes a nitrogen compound, the stabilizer may comprise an amine based compound such as one or more secondary or tertiary amines selected from diphenylamine, p-phenylenediamine, triethylamine, tributylamine, diisopropylamine, triisopropylamine and tri-isobutylamine. The amine based compound can be an amine antioxidant such as a substituted piperidine compound, i.e. a derivative of an alkyl substituted piperidyl, piperidinyl, piperazinone, or alkyoxypiperidinyl, particularly one or more amine antioxidants selected from 2,2,6,6-tetramethyl-4-piperidone, 2,2,6,6-tetramethyl-4-piperidinol; bis-(1,2,2,6,6-pentamethylpiperidyl)sebacate; di(2,2,6,6-tetramethyl-4-piperidyl)sebacate, poly(N-hydroxyethyl-2,2,6,6-tetramethyl-4-hydroxy-piperidyl succinate; alkylated paraphenylenediamines such as N-phenyl-N'-(1,3-dimethyl-butyl)-p-phenylenediamine or N,N'-di-sec-butyl-p-phenylenediamine and hydroxylamines such as tallow amines, methyl bis tallow amine and bis tallow amine, or phenol-alpha-napththylamine or Tinuvin®765 (Ciba), BLS®1944 (Mayzo Inc) and BLS® 1770 (Mayzo Inc). For the purposes of this invention, the amine based compound also can be an alkyldiphenyl amine such as bis (nonylphenyl amine), dialkylamine such as (N-(1-methylethyl)-2-propylamine, or one or more of phenyl-alpha-naphthyl amine (PANA), alkyl-phenyl-alpha-naphthyl-amine (APANA), and bis (nonylphenyl) amine. Preferably the amine based compound is one or more of phenyl-alpha-naphthyl amine (PANA), alkyl-phenyl-alpha-naphthyl-amine (APANA) and bis (nonylphenyl) amine, and more preferably phenyl-alpha-naphthyl amine (PANA).

Alternatively, or in addition to the nitrogen compounds identified above, one or more compounds selected from dinitrobenzene, nitrobenzene, nitromethane, nitrosobenzene, and TEMPO [(2,2,6,6-tetramethylpiperidin-1-yl)oxyl] may be used as the stabilizer. The nitrogen compounds can be provided in the heat transfer composition in an amount of greater than 0 and from 0.0001% by weight to about 5% by weight, preferably 0.001% by weight to about 2.5% by weight, and more preferably from 0.01% to about 1% by weight. In each case, percentage by weight refers to the weight of the nitrogen-based compound(s) plus refrigerant in the heat transfer composition.

Isobutylene

Isobutylene can be provided in the heat transfer composition in an amount of greater than 0 and from 0.0001% by weight to about 5% by weight, preferably from 0.001% by weight to about 2.5% by weight, and more preferably from 0.01% to about 1% by weight. In each case, percentage by weight refers to the weight of the isobutylene plus refrigerant in the heat transfer composition.

Epoxides and Others

Useful epoxides include aromatic epoxides, alkyl epoxides, and alkyenyl epoxides.

Combinations of Stabilizers

Preferably, the heat transfer composition comprises a refrigerant of the present invention, including each of Refrigerants 1-20, and a stabilizer composition comprising a diene-based compound and an alkylated naphthalene. A stabilizer as described in this paragraph is referred to herein as Stabilizer 1.

The heat transfer composition of the invention can preferably comprise Refrigerant 1 and Stabilizer 1.

The heat transfer composition of the invention can preferably comprise Refrigerant 2 and Stabilizer 1.

The heat transfer composition of the invention can preferably comprise Refrigerant 3 and Stabilizer 1.

The heat transfer composition of the invention can preferably comprise Refrigerant 4 and Stabilizer 1.

The heat transfer composition of the invention can preferably comprise Refrigerant 5 and Stabilizer 1.

The heat transfer composition of the invention can preferably comprise Refrigerant 6 and Stabilizer 1.

The heat transfer composition of the invention can preferably comprise Refrigerant 7 and Stabilizer 1.

The heat transfer composition of the invention can preferably comprise Refrigerant 8 and Stabilizer 1.

The heat transfer composition of the invention can preferably comprise Refrigerant 9 and Stabilizer 1.

The heat transfer composition of the invention can preferably comprise Refrigerant 10 and Stabilizer 1.

The heat transfer composition of the invention can preferably comprise Refrigerant 11 and Stabilizer 1.

The heat transfer composition of the invention can preferably comprise Refrigerant 12 and Stabilizer 1.

The heat transfer composition of the invention can preferably comprise Refrigerant 13 and Stabilizer 1.

The heat transfer composition of the invention can preferably comprise Refrigerant 14 and Stabilizer 1.

The heat transfer composition of the invention can preferably comprise Refrigerant 15 and Stabilizer 1.

The heat transfer composition of the invention can preferably comprise Refrigerant 16 and Stabilizer 1.

The heat transfer composition of the invention can preferably comprise Refrigerant 17 and Stabilizer 1.

The heat transfer composition of the invention can preferably comprise Refrigerant 18 and Stabilizer 1.

The heat transfer composition of the invention can preferably comprise Refrigerant 19 and Stabilizer 1.

The heat transfer composition of the invention can preferably comprise Refrigerant 20 and Stabilizer 1.

Preferably, the heat transfer composition comprises a refrigerant of the present invention, including each of Refrigerants 1-20, and a stabilizer composition comprising a diene-based compound, an alkylated naphthalene selected from Alkylated Napthalene 1, and a phenol-based compound. A stabilizer as described in this paragraph is referred to herein as Stabilizer 2.

The heat transfer composition of the invention can preferably comprise Refrigerant 1 and Stabilizer 2.

The heat transfer composition of the invention can preferably comprise Refrigerant 2 and Stabilizer 2.

The heat transfer composition of the invention can preferably comprise Refrigerant 3 and Stabilizer 2.

The heat transfer composition of the invention can preferably comprise Refrigerant 4 and Stabilizer 2.

The heat transfer composition of the invention can preferably comprise Refrigerant 5 and Stabilizer 2.

The heat transfer composition of the invention can preferably comprise Refrigerant 6 and Stabilizer 2.

The heat transfer composition of the invention can preferably comprise Refrigerant 7 and Stabilizer 2.

The heat transfer composition of the invention can preferably comprise Refrigerant 8 and Stabilizer 2.

The heat transfer composition of the invention can preferably comprise Refrigerant 9 and Stabilizer 2.

The heat transfer composition of the invention can preferably comprise Refrigerant 10 and Stabilizer 2.

The heat transfer composition of the invention can preferably comprise Refrigerant 11 and Stabilizer 2.

The heat transfer composition of the invention can preferably comprise Refrigerant 12 and Stabilizer 2.

The heat transfer composition of the invention can preferably comprise Refrigerant 13 and Stabilizer 2.

The heat transfer composition of the invention can preferably comprise Refrigerant 14 and Stabilizer 2.

The heat transfer composition of the invention can preferably comprise Refrigerant 15 and Stabilizer 2.

The heat transfer composition of the invention can preferably comprise Refrigerant 16 and Stabilizer 2.

The heat transfer composition of the invention can preferably comprise Refrigerant 17 and Stabilizer 2.

The heat transfer composition of the invention can preferably comprise Refrigerant 18 and Stabilizer 2.

The heat transfer composition of the invention can preferably comprise Refrigerant 19 and Stabilizer 2.

Preferably, the heat transfer composition comprises a refrigerant of the present invention, including each of Refrigerants 1-20, and a stabilizer composition comprising farnesene, and Alkylated Naphthalene 4 and BHT. A stabilizer as described in this paragraph is referred to herein as Stabilizer 3.

The heat transfer composition of the invention can preferably comprise Refrigerant 1 and Stabilizer 3.

The heat transfer composition of the invention can preferably comprise Refrigerant 2 and Stabilizer 3.

The heat transfer composition of the invention can preferably comprise Refrigerant 3 and Stabilizer 3.

The heat transfer composition of the invention can preferably comprise Refrigerant 4 and Stabilizer 3.

The heat transfer composition of the invention can preferably comprise Refrigerant 5 and Stabilizer 3.

The heat transfer composition of the invention can preferably comprise Refrigerant 6 and Stabilizer 3.

The heat transfer composition of the invention can preferably comprise Refrigerant 7 and Stabilizer 3.

The heat transfer composition of the invention can preferably comprise Refrigerant 8 and Stabilizer 3.

The heat transfer composition of the invention can preferably comprise Refrigerant 9 and Stabilizer 3.

The heat transfer composition of the invention can preferably comprise Refrigerant 10 and Stabilizer 3.

The heat transfer composition of the invention can preferably comprise Refrigerant 11 and Stabilizer 3.

The heat transfer composition of the invention can preferably comprise Refrigerant 12 and Stabilizer 3.

The heat transfer composition of the invention can preferably comprise Refrigerant 13 and Stabilizer 3.

The heat transfer composition of the invention can preferably comprise Refrigerant 14 and Stabilizer 3.

The heat transfer composition of the invention can preferably comprise Refrigerant 15 and Stabilizer 3.

The heat transfer composition of the invention can preferably comprise Refrigerant 16 and Stabilizer 3.

The heat transfer composition of the invention can preferably comprise Refrigerant 17 and Stabilizer 3.

The heat transfer composition of the invention can preferably comprise Refrigerant 18 and Stabilizer 3.

The heat transfer composition of the invention can preferably comprise Refrigerant 19 and Stabilizer 3.

The heat transfer composition of the invention can preferably comprise Refrigerant 20 and Stabilizer 3.

The heat transfer composition can comprises a refrigerant of the present invention, including each of Refrigerants 1-20, and a stabilizer composition comprising farnesene, and alkylated naphthalene selected from Alkylated Naphthalene 1, and BHT. A stabilizer as described in this paragraph is referred to herein as Stabilizer 4.

The heat transfer composition can comprises a refrigerant of the present invention, including each of Refrigerants 1-20, and a stabilizer composition consists essentially of farnesene, Alkylated Naphthalene 5, and BHT. A stabilizer as described in this paragraph is referred to herein as Stabilizer 5.

The heat transfer composition can comprises a refrigerant of the present invention, including each of Refrigerants 1-20, and a stabilizer composition consists of farnesene, Alkylated Naphthalene 5, and BHT. A stabilizer as described in this paragraph is referred to herein as Stabilizer 6.

The heat transfer composition can comprises a refrigerant of the present invention, including each of Refrigerants 1-20, and a stabilizer composition comprising isobutylene and an alkylated naphthalene selected from Alkylated Naphthalenes 1. A stabilizer as described in this paragraph is referred to herein as Stabilizer 7.

The heat transfer composition can comprises a refrigerant of the present invention, including each of Refrigerants 1-20, and a stabilizer composition comprising isobutylene, Alkylated Naphthalene 5 and BHT. A stabilizer as described in this paragraph is referred to herein as Stabilizer 8.

The heat transfer composition can comprises a refrigerant of the present invention, including each of Refrigerants 1-20, and a stabilizer composition consists essentially of isobutylene, Alkylated Naphthalene 5, and BHT. A stabilizer as described in this paragraph is referred to herein as Stabilizer 9.

The heat transfer composition can comprises a refrigerant of the present invention, including each of Refrigerants 1-20, and a stabilizer composition consisting of isobutylene, Alkylated Naphthalene 5 and BHT. A stabilizer as described in this paragraph is referred to herein as Stabilizer 10.

The heat transfer composition of the invention can comprise a refrigerant of the present invention, including each of Refrigerants 1-20, and a stabilizer composition comprising Alkylated Naphthalene 4, wherein the alkylated naphthalene is present in an amount of from 0.0001% by weight to about 5% by weight based on the weight of the heat transfer composition. A stabilizer as described in this paragraph within the indicated amounts in a heat transfer composition is referred to herein as Stabilizer 11.

The heat transfer composition of the invention can preferably comprise a refrigerant of the present invention, including each of Refrigerants 1-20, and a stabilizer composition comprising Alkylated Naphthalene 5, wherein the alkylated naphthalene is present in an amount of from 0.0001% by weight to about 5% by weight based on the weight of the heat transfer composition. A stabilizer as described in this paragraph within the indicated amounts in a heat transfer composition is referred to herein as Stabilizer 12.

The heat transfer composition of the invention can preferably comprise a refrigerant of the present invention, including each of Refrigerants 1-20, and a stabilizer composition comprising BHT, wherein said BHT is present in an amount of from about 0.0001% by weight to about 5% by weight based on the weight of heat transfer composition. A stabilizer as described in this paragraph within the indicated amounts in a heat transfer composition is referred to herein as Stabilizer 13.

The heat transfer composition of the invention can preferably comprise a refrigerant of the present invention, including each of Refrigerants 1-20, and a stabilizer composition comprising farnesene, Alkylated Naphthalene 4 and BHT, wherein the farnesene is provided in an amount of from about 0.0001% by weight to about 5% by weight, the Alkylated Naphthalene 4 is provided in an amount of from about 0.0001% by weight to about 10% by weight, and the BHT is provided in an amount of from about 0.0001% by weight to about 5% by weight, with the percentages being based on the weight of the heat transfer composition. A stabilizer as described in this paragraph within the indicated amounts in a heat transfer composition is referred to herein as Stabilizer 14.

The heat transfer composition of the invention can comprise a refrigerant of the present invention, including each of Refrigerants 1-20, and a stabilizer composition comprising farnesene, Alkylated Naphthalene 4 and BHT, wherein the farnesene is provided in an amount of from 0.001% by weight to about 2.5% by weight, the Alkylated Naphthalene 4 is provided in an amount of from 0.001% by weight to about 10% by weight, and the BHT is provided in an amount of from 0.001% by weight to about 2.5% by weight, with the percentages being based on the weight of the heat transfer composition. A stabilizer as described in this paragraph within the indicated amounts in a heat transfer composition is referred to herein as Stabilizer 15.

The heat transfer composition of the invention can more preferably comprise any refrigerant of the present invention, including each of Refrigerants 1-20, and a stabilizer composition comprising farnesene, Alkylated Naphthalene 4 and BHT, wherein the farnesene is provided in an amount of from 0.001% by weight to about 2.5% by weight, the Alkylated Naphthalene 4 is provided in an amount of from 1.5% by weight to about 4.5% by weight, and the BHT is provided in an amount of from 0.001% by weight to about 2.5% by weight, with the percentages being based on the weight of the heat transfer composition. A stabilizer as described in this paragraph within the indicated amounts in a heat transfer composition is referred to herein as Stabilizer 16.

The heat transfer composition of the invention can more preferably comprise any a refrigerant of the present invention, including each of Refrigerants 1-20, and a stabilizer composition comprising farnesene, Alkylated Naphthalene 5 and BHT, wherein the farnesene is provided in an amount of from 0.001% by weight to about 2.5% by weight, the Alkylated Naphthalene 5 is provided in an amount of from 2.5% by weight to 3.5% by weight, and the BHT is provided in an amount of from 0.001% by weight to about 2.5% by weight, with the percentages being based on the weight of heat transfer composition. A stabilizer as described in this paragraph within the indicated amounts in a heat transfer composition is referred to herein as Stabilizer 17.

Heat Transfer Compositions Comprising Refrigerant, Lubricant and Stabilizer

The heat transfer composition of the invention can comprise any of the refrigerants of the present invention, including each of Refrigerants 1-13, and any lubricant of the invention, including each of Lubricants 1-3, and a stabilizer of the present invention, including each of Stabilizers 1-17.

The heat transfer composition of the invention can comprise any of the refrigerants of the present invention, including each of Refrigerants 1-13, POE lubricant and Stabilizer 1.

The heat transfer composition of the invention can comprise any of the refrigerants of the present invention, including each of Refrigerants 1-13, Lubricant 1 and Stabilizer 1.

The heat transfer composition of the invention can comprise any of the refrigerants of the present invention, including each of Refrigerants 1-13, Lubricant 2 and Stabilizer 1.

The heat transfer composition of the invention can comprise any of the refrigerants of the present invention, including each of Refrigerants 1-13, Lubricant 3 and Stabilizer 1.

The heat transfer composition of the invention can comprise any of the refrigerants of the present invention, including each of Refrigerants 1-13, POE lubricant and Stabilizer 2.

The heat transfer composition of the invention can comprise any of the refrigerants of the present invention, including each of Refrigerants 1-13, Lubricant 1 and Stabilizer 2.

The heat transfer composition of the invention can comprise any of the refrigerants of the present invention, including each of Refrigerants 1-13, Lubricant 2 and Stabilizer 2.

The heat transfer composition of the invention can comprise any of the refrigerants of the present invention, including each of Refrigerants 1-13, Lubricant 3 and Stabilizer 2.

The heat transfer composition of the invention can comprise any of the refrigerants of the present invention, including each of Refrigerants 1-13, POE lubricant and Stabilizer 3.

The heat transfer composition of the invention can comprise any of the refrigerants of the present invention, including each of Refrigerants 1-13, Lubricant 1 and Stabilizer 3.

The heat transfer composition of the invention can comprise any of the refrigerants of the present invention, including each of Refrigerants 1-13, Lubricant 2 and Stabilizer 3.

The heat transfer composition of the invention can comprise any of the refrigerants of the present invention, including each of Refrigerants 1-13, Lubricant 3 and Stabilizer 3.

The heat transfer composition of the invention can comprise any of the refrigerants of the present invention, including each of Refrigerants 1-13, and Lubricant 1, and Stabilizer 14.

The heat transfer composition of the invention can comprise any of the refrigerants of the present invention, including each of Refrigerants 1-13, Lubricant 1 and Stabilizer 14.

The heat transfer composition of the invention can comprise any of the refrigerants of the present invention, including each of Refrigerants 1-13, Lubricant 2 and Stabilizer 14.

The heat transfer composition of the invention can comprise any of the refrigerants of the present invention, including each of Refrigerants 1-13, Lubricant 3 and Stabilizer 14.

The heat transfer composition of the invention can comprise Refrigerant 1, Stabilizer 1, and Lubricant 1.

The heat transfer composition of the invention can comprise Refrigerant 2, Stabilizer 1, and Lubricant 1.

The heat transfer composition of the invention can comprise Refrigerant 3, Stabilizer 1, and Lubricant 1.

The heat transfer composition of the invention can comprise Refrigerant 4, Stabilizer 1, and Lubricant 1.

The heat transfer composition of the invention can comprise Refrigerant 5, Stabilizer 1, and Lubricant 1.

The heat transfer composition of the invention can comprise Refrigerant 6, Stabilizer 1, and Lubricant 1.

The heat transfer composition of the invention can comprise Refrigerant 7, Stabilizer 1, and Lubricant 1.

The heat transfer composition of the invention can comprise Refrigerant 10, Stabilizer 1, and Lubricant 1.

The heat transfer composition of the invention can comprise Refrigerant 9, Stabilizer 1 and Lubricant 1.

The heat transfer composition of the invention can comprise Refrigerant 10, Stabilizer 1, and Lubricant 1.

The heat transfer composition of the invention can comprise Refrigerant 11, Stabilizer 1, and Lubricant 1.

The heat transfer composition of the invention can comprise Refrigerant 12, Stabilizer 1, and Lubricant 1.

The heat transfer composition of the invention can comprise Refrigerant 13, Stabilizer 1, and Lubricant 1. The heat transfer composition of the invention can comprise Refrigerant 1, POE lubricant, and stabilizer selected from Stabilizer 1, Stabilizer 2, Stabilizer 3, Stabilizer 7, and Stabilizer 14.

The heat transfer composition of the invention can comprise Refrigerant 1, Lubricant 1, and stabilizer selected from Stabilizer 1, Stabilizer 2, Stabilizer 3, Stabilizer 7, and Stabilizer 14.

The heat transfer composition of the invention can comprise Refrigerant 1, Lubricant 2, and stabilizer selected from Stabilizer 1, Stabilizer 2, Stabilizer 3, Stabilizer 7, and Stabilizer 14.

The heat transfer composition of the invention can comprise Refrigerant 6, POE lubricant, and stabilizer selected from Stabilizer 1, Stabilizer 2, Stabilizer 3, Stabilizer 7, and Stabilizer 14.

The heat transfer composition of the invention can comprise Refrigerant 6, Lubricant 1, and stabilizer selected from Stabilizer 1, Stabilizer 2, Stabilizer 3, Stabilizer 7, and Stabilizer 14.

The heat transfer composition of the invention can comprise Refrigerant 6, Lubricant 2, and stabilizer selected from Stabilizer 1, Stabilizer 2, Stabilizer 3, Stabilizer 7, and Stabilizer 14.

The heat transfer composition of the invention can comprise Refrigerant 10, POE lubricant, and stabilizer selected from Stabilizer 1, Stabilizer 2, Stabilizer 3, Stabilizer 7, and Stabilizer 14.

The heat transfer composition of the invention can comprise Refrigerant 10, Lubricant 1, and stabilizer selected from Stabilizer 1, Stabilizer 2, Stabilizer 3, Stabilizer 7, and Stabilizer 14.

The heat transfer composition of the invention can comprise Refrigerant 10, Lubricant 2, and stabilizer selected from Stabilizer 1, Stabilizer 2, Stabilizer 3, Stabilizer 7, and Stabilizer 14.

Other additives not mentioned herein can also be included by those skilled in the art in view of the teaching contained herein without departing from the novel and basic features of the present invention.

Combinations of surfactants and solubilizing agents may also be added to the present compositions to aid oil solubility as disclosed in U.S. Pat. No. 6,516,837, the disclosure of which is incorporated by reference in its entirety.

Methods, Uses and Systems

The refrigerants and heat transfer compositions as disclosed herein are provided for use in heat transfer applications, including low temperature refrigeration systems, including low temperature commercial refrigeration systems (including low temperature super market refrigeration systems) and low temperature transportation systems.

The refrigerants and heat transfer compositions as disclosed herein are provided for use in medium temperature refrigeration systems, including medium temperature commercial refrigeration systems (including medium temperature super market refrigeration systems and medium temperature transportation systems).

The compositions of the invention may be employed in systems which are suitable for use with R-404 refrigerant, such as new and existing heat transfer systems.

Any reference to the heat transfer composition of the invention refers to each and any of the heat transfer compositions as described herein. Thus, for the following discussion of the uses or applications of the composition of the invention, the heat transfer composition may comprise or consist essentially of, or consist of any of the refrigerants described herein in combination with the stabilizers and lubricants discussed herein, including: (i) each of Refrigerants 1-20; (ii) any combination of each of Refrigerants 1-20 and each of Stabilizers 1-19; (iii) any combination of each of Refrigerants 1-20 and any lubricant, including POE lubricants and Lubricants 1-2; and (iv) and any combination of each of Refrigerants 1-20 and each of Stabilizers 1-19 and any lubricant, including POE lubricant and Lubricants 1-2.

For heat transfer systems of the present invention that include a compressor and lubricant for the compressor in the system, the system can comprises a loading of refrigerant and lubricant such that the lubricant loading in the system is from about 5% to 60% by weight, or from about 10% to about 60% by weight, or from about 20% to about 50% by weight, or from about 20% to about 40% by weight, or from about 20% to about 30% by weight, or from about 30% to about 50% by weight, or from about 30% to about 40% by weight. As used herein, the term "lubricant loading" refers to the total weight of lubricant contained in the system as a percentage of total of lubricant and refrigerant contained in the system. Such systems may also include a lubricant loading of from about 5% to about 10% by weight, or about 8% by weight of the heat transfer composition.

The present invention provides heat transfer systems that include a refrigerant of the present invention, including each of Refrigerants 1-20, lubricant of the invention and alkylated naphthalene present in an amount of from 0.1% to about 20%, or from about 5% to about a 15%, or from about 8% to about 12%, where amounts are in percent by weight based on the amount of alkylated naphthalene plus lubricant in the system.

The present invention provides heat transfer systems that include a refrigerant of the present invention, including each of Refrigerants 1-20, Lubricant 1 and alkylated naphthalene in an amount of from 0.1% to about 20%, or from about 5% to about a 15%, or from about 8% to about 12%, where amounts are in percent by weight based on the amount of alkylated naphthalene plus lubricant in the system.

The present invention provides heat transfer systems that include a refrigerant of the present invention, including each of Refrigerants 1-20, Lubricant 2 and alkylated naphthalene in an amount of from 0.1% to about 20%, or from about 5% to about a 15%, or from about 8% to about 12%, where amounts are in percent by weight based on the amount of alkylated naphthalene plus lubricant in the system.

Exemplary Heat Transfer Systems

As described in detail below, the preferred systems of the present invention comprise a compressor, a condenser, an expansion device and an evaporator, all connected in fluid communication using piping, valving and control systems such that the refrigerant and associated components of the heat transfer composition can flow through the system in known fashion to complete the refrigeration cycle. An exemplary schematic of such a basic system is illustrated in FIG. 1. In particular, the system schematically illustrated in FIG. 1 shows a compressor 10, which provides compressed refrigerant vapor to condenser 20. The compressed refrigerant vapor is condensed to produce a liquid refrigerant which is then directed to an expansion device 40 that produces refrigerant at reduced temperature pressure, which in turn is then provided to evaporator 50. In evaporator 50 the liquid refrigerant absorbs heat from the body or fluid being cooled, thus producing a refrigerant vapor which is then provided to the suction line of the compressor.

Figure 2:
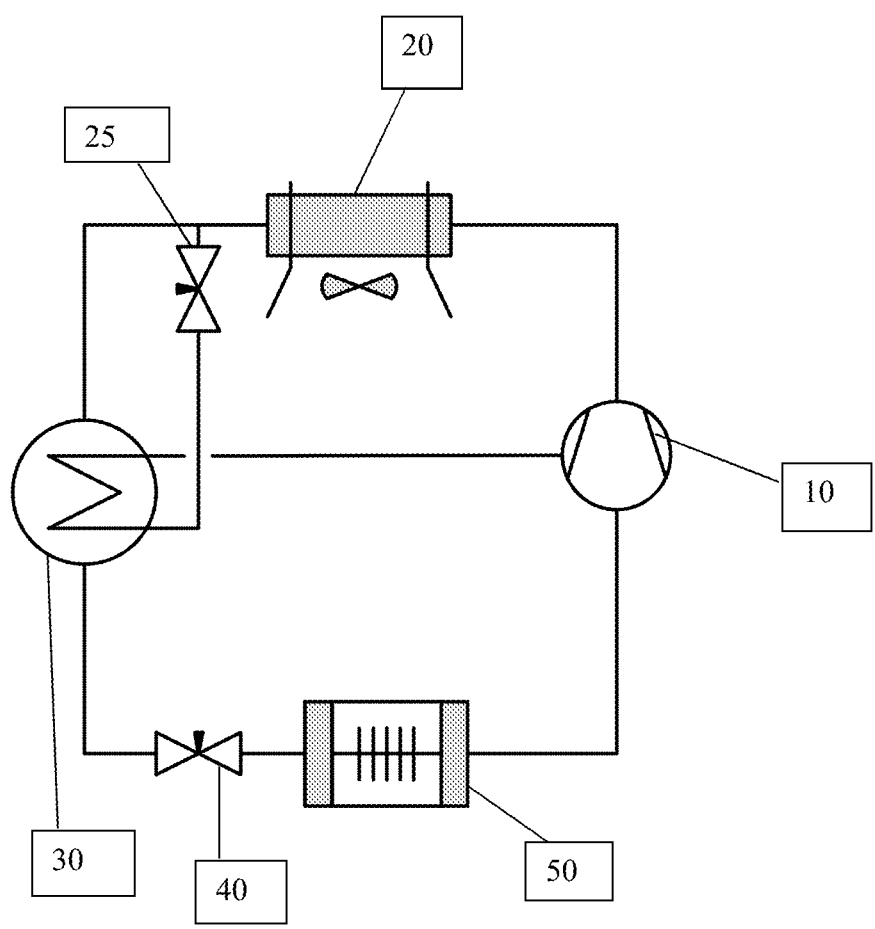
FIG. 2 is a schematic representation of an exemplary heat transfer system useful in low and medium temperature refrigeration and which includes a vapor injector.

The refrigeration system illustrated in FIG. 2 is the same as described above in connection with FIG. 1 except that it includes a vapor injection system including heat exchanger 30 and bypass expansion valve 25. The bypass expansion device 25 diverts a portion of the refrigerant flow at the condenser outlet through the device and thereby provides liquid refrigerant to heat exchanger 30 at a reduced pressure, and hence at a lower temperature, to heat exchanger 30. This relatively cool liquid refrigerant is then exchanges heat with the remaining, relatively high temperature liquid from the condenser. This operation produces a subcooled liquid to the main expansion device 40 and evaporator 50 and returns a relatively cool refrigerant vapor to the compressor 10. In this way the injection of the cooled refrigerant vapor into the suction side of the compressor serves to maintain compressor discharge temperatures in acceptable limits, which can be especially advantageous in low temperature systems that utilize high compression ratios.

Figure 3:
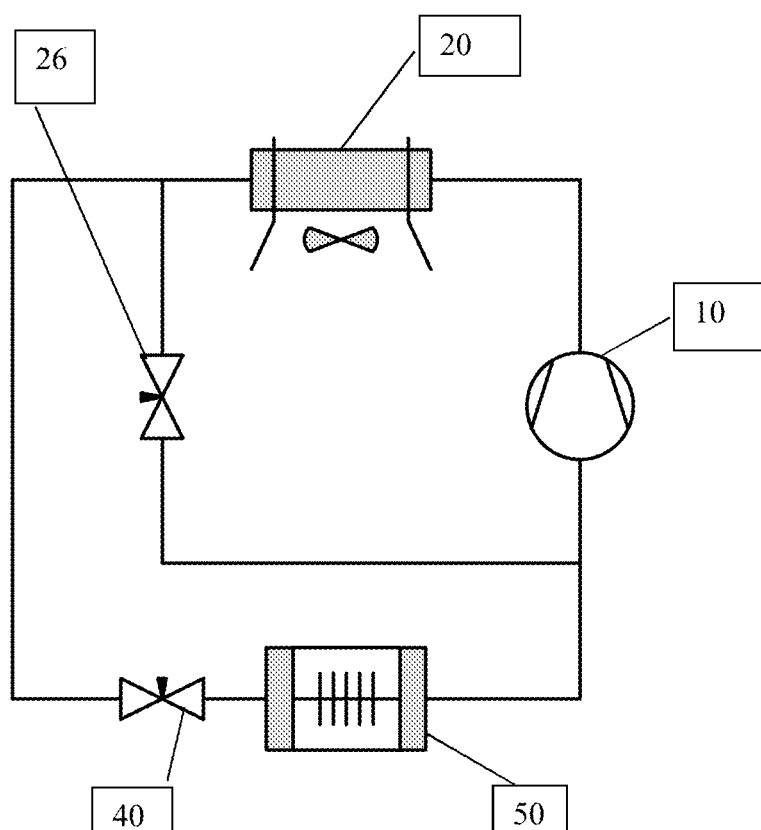
FIG. 3 is a schematic representation of an exemplary heat transfer system useful in low and medium temperature refrigeration and which includes a liquid injector.

The refrigeration system illustrated in FIG. 3 is the same as described above in connection with FIG. 1 except that it includes a liquid injection system including bypass valve 26. The bypass valve 26 diverts a portion of the liquid refrigerant exiting the condenser to the compressor, preferably to a liquid injection port in the compressor 10. In this way the injection of liquid refrigerant into the suction side of the compressor serves to maintain compressor discharge temperatures in acceptable limits, which can be especially advantageous in low temperature systems that utilize high compression ratios.

Figure 4:
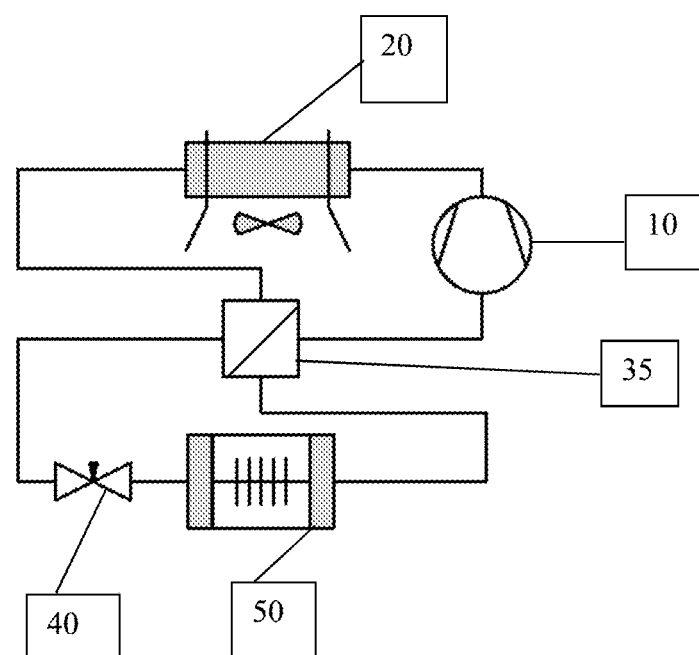
FIG. 4 is a schematic representation of an exemplary heat transfer system useful in low and medium temperature refrigeration and which includes a suction line/liquid line heat exchanger.

The refrigeration system illustrated in FIG. 4 is the same as described above in connection with FIG. 1 except that it includes a liquid line/suction line heat exchanger 35.

The valve 25 diverts a portion of the of the refrigerant flow at the condenser outlet to the liquid line/suction line heat exchanger, where heat is transferred from the liquid refrigerant to the refrigerant vapor leaving evaporator 50.

Figure 5:
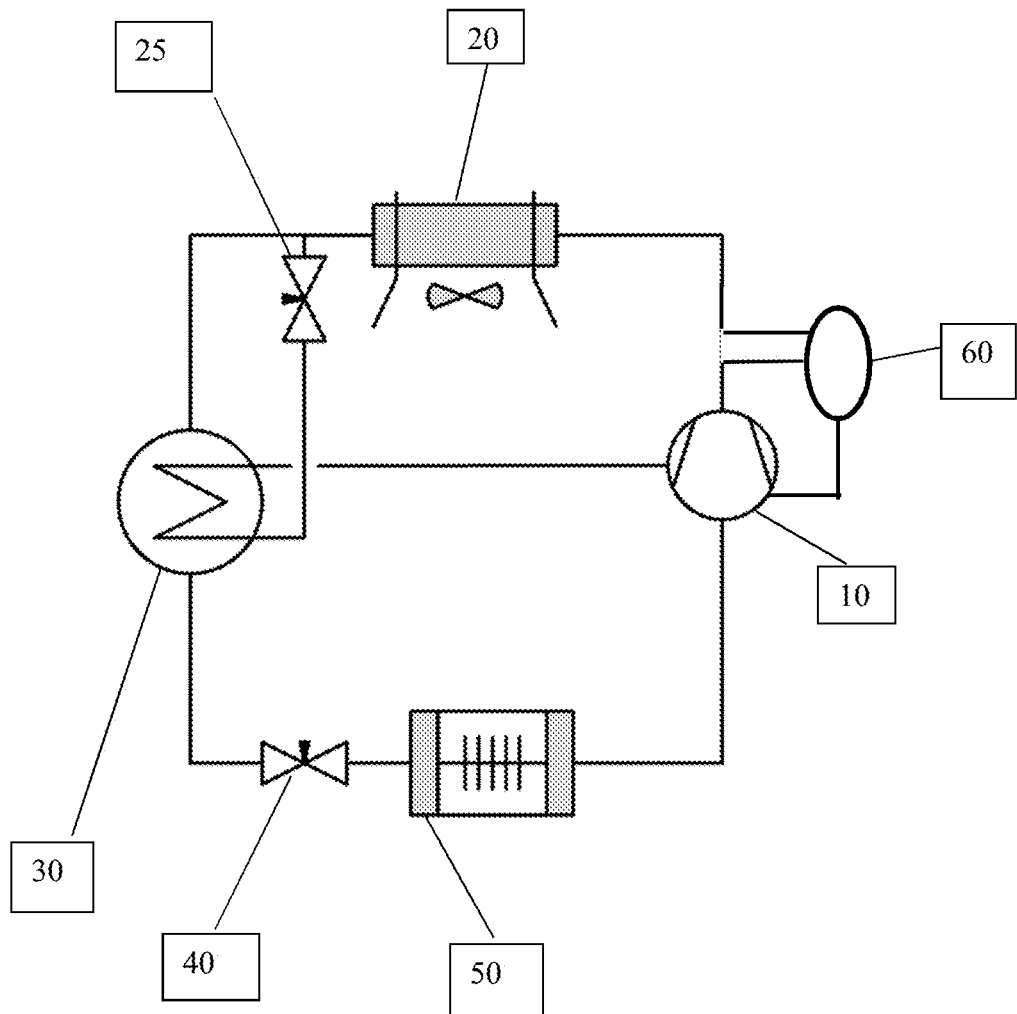
FIG. 5 is a schematic representation of an exemplary heat transfer system useful in low and medium temperature refrigeration and which includes a vapor injector and an oil seperator.

The refrigeration system illustrated in FIG. 5 is the same as described above in connection with FIG. 1 except that it includes an oil separator 60 connected to the outlet of the compressor 10. As is known to those skilled in the art, some amount of compressor lubricant will typically be carried over into the compressor discharge refrigerant vapor, and the oil separator is included to provide means to disengage the lubricant liquid from the refrigerant vapor, and a result refrigerant vapor which has a reduced lubricant oil content, proceeds to the condenser inlet and liquid lubricant is then returned to the lubricant reservoir for use in lubricating the compressor, such as a lubricant receiver. In preferred embodiments, the oil separator includes the sequestration materials described herein, preferably in the form of a filter or solid core.

It will be appreciated by those skilled in the art that the different equipment/configuration options shown separately in each of FIGS. 2-5 can be combined and used together as deemed advantageous for any particular application.

Systems with Sequestration Materials

The heat transfer system according to the present invention can comprise a compressor, an evaporator, a condenser and an expansion device, in communication with each other, a refrigerant of the present invention, including any one of Refrigerants 1-20, a lubricant, including POE Lubricant and Lubricants 1-2, and a sequestration material in the system, wherein said sequestration material preferably comprises:
  i. copper or a copper alloy, or
  ii. activated alumina, or
  iii. a zeolite molecular sieve comprising copper, silver, lead or a combination thereof, or
  iv. an anion exchange resin, or
  v. a moisture-removing material, preferably a moisture-removing molecular sieve, or
  vi. a combination of two or more of the above.

Preferred materials from each of the categories (i)-(v) above is described below.

a. Copper/Copper Alloy Sequestration Material

The sequestration material may be copper, or a copper alloy, preferably copper. The copper alloy may comprise, in addition to copper, one or more further metals, such as tin, aluminum, silicon, nickel or a combination thereof. Alternatively, or in addition, the copper alloy may comprise one or more non-metal elements, e.g. carbon, nitrogen, silicon, oxygen or a combination thereof.

It will be appreciated that the copper alloy may comprise varying amounts of copper. For example, the copper alloy may comprise at least about 5 wt %, at least about 15 wt %, at least about 30 wt %, at least about 50 wt %, at least about 70 wt % or at least about 90 wt % of copper, based on the total weight of the copper alloy. It will also be appreciated that the copper alloy may comprise from about 5 wt % to about 95 wt %, from about 10 wt % to about 90 wt %, from about 15 wt % to about 85 wt %, from about 20 wt % to about 80 wt %, from about 30 wt % to about 70 wt %, or from about 40 wt % to about 60 wt % of copper, based on the total weight of the copper alloy.

Alternatively, copper may be used as a sequestration material. The copper metal may contain impurity levels of other elements or compounds. For example, the copper metal may contain at least about 99 wt %, more preferably at least about 99.5 wt %, more preferably at least about 99.9 wt % of elemental copper.

The copper or copper alloy may be in any form which allows the refrigerant to contact the surface of the copper or copper alloy. Preferably, the form of the copper or copper alloy is selected to maximize the surface area of the copper or copper alloy (i.e. to maximize the area which is in contact with the refrigerant).

For example, the metal may be in the form of a mesh, wool, spheres, cones, cylinders etc. The term "sphere" refers to a three dimensional shape where the difference between the largest diameter and the smallest diameter is about 10% or less of the largest diameter.

The copper or copper alloy may have a BET surface area of at least about 10 $m^2/g$, at least about 20 $m^2/g$, at least about 30 $m^2/g$, at least about 40 $m^2/g$ or at least about 50 $m^2/g$. The BET-surface area may be measured in accordance with ASTM D6556-10.

When the sequestration material comprises copper or a copper alloy, the BET surface area of the copper or copper alloy may be from about 0.01 to about 1.5 $m^2$ per kg of refrigerant, preferably from about 0.02 to about 0.5 $m^2$ per kg of refrigerant. For example, the copper or copper alloy may have a surface area of about 0.08 $m^2$ per kg of refrigerant.

b. Zeolite Molecular Sieve Sequestration Material

The sequestration material may comprise a zeolite molecular sieve. The zeolite molecular sieve can comprise copper, silver, lead or a combination thereof, preferably at least silver.

In preferred embodiments, the zeolite molecular sieve contains an amount of metal, and preferably in certain embodiments silver, of from about 1% to about 30% by weight, or preferably from about 5% to about 20% by weight, based on the total weight of the zeolite.

The metal (i.e. copper, silver and/or lead) may be present in a single oxidation state, or in a variety of oxidation states (e.g. a copper zeolite may comprise both Cu(I) and Cu(II)).

The zeolite molecular sieve may comprise metals other than silver, lead, and/or copper.

The zeolite may have openings which have a size across their largest dimension of from about 5 to 40 Å (Angstroms). For example, the zeolite may have openings which have a size across their largest dimension of about 35 Å (Angstroms) or less. Preferably, the zeolite has openings which have a size across their largest dimension of from about 15 to about 35 Å (Angstroms). Zeolite such as IONSIV D7310-C has activated sites that applicants have found to effectively remove specific decomposition products in accordance with the present invention.

When the sequestration material comprises a zeolite molecular sieve comprising copper, silver, lead or a combination thereof, the molecular sieve (e.g. zeolite) may be present in an amount of from about 1 wt % to about 30 wt %, such as from about 2 wt % to about 25 wt % relative to the total amount of molecular sieve (e.g., zeolite), refrigerant and lubricant (if present) in the heat transfer system.

In preferred embodiments, the sequestration material comprises a zeolite molecular sieve comprising silver, and in such embodiments the molecular sieve may be present in an amount of at least 5% parts by weight (pbw), preferably from about 5 pbw to about 30 pbw, or from about 5 pbw to about 20 pbw, per 100 parts by weight of lubricant (pphl) based on the total amount of molecular sieve (e.g., zeolite) and lubricant in the heat transfer system being treated. The preferred embodiments as described in this paragraph have been found to have exceptional ability to remove fluoride from heat transfer compositions as described herein. Furthermore in such preferred embodiments as described in this paragraph, the amount of the silver present in the molecular sieve is from about 1% to about 30% by weight, or preferably from about 5% to about 20% by weight, based on the total weight of the zeolite.

In preferred embodiments, the sequestration material comprises a zeolite molecular sieve comprising silver, and in such embodiments the molecular sieve (e.g., zeolite) may be present in an amount of at least about 10 pphl, preferably from about 10 pphl to about 30 pphl, or from about 10 pphl to about 20 pphl by weight relative to the total amount of molecular sieve (e.g., zeolite), and lubricant in the heat transfer system being treated. The preferred embodiments as described in this paragraph have been found to have exceptional ability to remove iodide from heat transfer compositions as described herein. Furthermore, in such preferred embodiments as described in this paragraph, the amount of the silver present in the molecular sieve is from about 1% to about 30% by weight, or preferably from about 5% to about 20% by weight, based on the total weight of the zeolite.

In preferred embodiments, the sequestration material comprises a zeolite molecular sieve comprises silver, and in such embodiments the molecular sieve may be present in an amount of at least pphl, preferably from about 15 pphl to about 30 pphl, or from about 15 pphl to about 20 pphl by weight relative to the total amount of molecular sieve, and lubricant in the heat transfer system being treated. The preferred embodiments as described in this paragraph have been found to have exceptional ability to reduce TAN levels in the heat transfer compositions as described herein. Furthermore, in such preferred embodiments as described in this paragraph, the amount of the silver present in the molecular sieve is from about 1% to about 30% by weight, or preferably from about 5% to about 20% by weight, based on the total weight of the zeolite.

Preferably, the zeolite molecular sieve is present in an amount of at least about 15 pphl, or at least about 18 pphl relative to the total amount of molecular sieve and lubricant in the system. Therefore, the molecular sieve may be present in an amount of from about 15 pphl to about 30 pphl, or from about 18 pphl to about 25 pphl relative to the total amount of molecular sieve and lubricant present in the system.

It will be appreciated that the zeolite may be present in an amount of about 5 pphl or about 21 pphl relative to the total amount of molecular sieve, and lubricant in the system.

The amount of zeolite molecular sieve described herein refers to the dry weight of the molecular sieve. As used herein, the term "dry weight" of the sequestration materials means that the material has 50 ppm or less of moisture.

c. Anion Exchange Resins

The sequestration material may comprise an anion exchange resin.

Preferably, the anion exchange resin is a strongly basic anion exchange resin. The strongly basic anion exchange resin may be a type 1 resin or a type 2 resin. Preferably, the anion exchange resin is a type 1 strongly basic anion exchange resin.

The anion exchange resin generally comprises a positively charged matrix and exchangeable anions. The exchangeable anions may be chloride anions ($Cl^-$) and/or hydroxide anions ($OH^-$).

The anion exchange resin may be provided in any form. For example, the anion exchange resin may be provided as beads. The beads may have a size across their largest dimension of from about 0.3 mm to about 1.2 mm, when dry.

When the sequestration material comprises an anion exchange resin, the anion exchange resin may be present in an amount of from about 1 pphl to about 60 pphl, or from about 5 pphl to about 60 pphl, or from about 20 pphl to about 50 pphl, or from about 20 pphl to about 30 pphl, or from about 1 pphl to about 25 pphl, such as from about 2 pphl to about 20 pphl based on the total amount of anion exchange resin and lubricant in the system.

Preferably, the anionic exchange resin is present in an amount of at least about 10 pphl, or at least about 15 pphl relative to the total amount of anionic exchange resin and lubricant in the system. Therefore, the anion exchange resin may be present in an amount of from about 10 pphl to about 25 pphl, or from about 15 pphl to about 20 pphl relative to the total amount of anion exchange resin and lubricant in the system.

It will be appreciated that the anion exchange resin may be present in an amount of about 4 pphl or about 16 pphl based on the total amount of anion exchange resin and lubricant present in the system.

Applicants have found an unexpectedly advantageous ability of industrial grade weakly base anion exchange adsorbent resins, including in particular the material sold under the trade designation Amberlyst A21 (Free Base) to act as a sequestration material. As used herein, the term weak base anion resin refers to resins in the free base form, which are preferably e functionalized with a tertiary amine (uncharged). Tertiary amine contains a free lone pair of electrons on the nitrogen, which results in it being readily protonated in presence of an acid. In preferred embodiments, the ion exchange resin as used according to the present invention is protonated by the acid, then attracts and binds the anionic counter ion for full acid removal, without contributing any additional species back into solution.

Amberlyst A21 is a preferred material in that applicants have found it to be advantageous because it provides a macroporous structure makes it physically very stable and resistant to breakage, and applicants have found that it can withstand high flow rates of the refrigeration system over relatively long periods of time, including preferably over the lifetime of the system.

The amount of anion exchange resin described herein refers to the dry weight of the anion exchange resin. As used herein, the term "dry weight" of the sequestration materials means that the material has 50 ppm or less of moisture.

As used herein, pphl of a particular sequestration material means the parts per hundred of the particular sequestration material by weight based on the total weight of that particular sequestration material and lubricant in the system.

d. Moisture Removing Material

A preferred sequestration material is a moisture removing material. In preferred embodiments the moisture removing material comprises, consists essentially of or consists of a moisture-removing molecular sieve. Preferred moisture-removing molecular sieves include those commonly known as sodium aluminosilicate molecular sieves, and such materials are preferably crystalline metal aluminosilicates having a three dimensional interconnecting network of silica and alumina tetrahedra. Applicants have found that such materials are effective in the systems of the present invention to remove moisture and are most preferably classified according to pore size as types 3A, 4A, 5A and 13X.

The amount that the moisture removing material, and particularly the moisture-removing molecular sieve, and even more preferably sodium aluminosilicate molecular sieve, is preferably from about 15 pphl to about 60 pphl by weight, and even more preferably from about 30 pphl to 45 pphl by weight.

e. Activated Alumina

Examples of activated alumina that applicants have found to be effective according to the present invention and commercially available include those sodium activated aluminas sold under the trade designation F200 by BASF and by Honeywell/UOP under the trade designation CLR-204. Applicants have found that activated alumina in general and the above-mentioned sodium activated aluminas in particular are especially effective for sequestering the types of acidic detrimental materials that are produced in connection with the refrigerant compositions and heat transfer methods and systems of the present invention.

When the sequestration material comprises activated alumina, the activated alumina may be present in an amount of from about 1 pphl to about 60 pphl, or from about 5 pphl to about 60 pphl by weight.

f. Combinations of Sequestration Materials

When a combination of sequestration materials is present, the materials may be provided in any ratio relative to each other.

For example, when the sequestration material comprises an anion exchange resin and a molecular sieve (e.g. a zeolite), the weight ratio (when dry) of anion exchange resin to molecular sieve (e.g. zeolite) is preferably in the range of from about 10:90 to about 90:10, from about 20:80 to about 80:20, from about 25:75 to about 75:25, from about 30:70 to about 70:30, or from about 60:40 to about 40:60. Exemplary weight ratios of anion exchange resin to metal zeolite include about 25:75, about 50:50 and about 75:25.

For the purpose of convenience, a heat transfer system that includes at least one of sequestration materials (i)-(v) is referred to herein for convenience as Sequestration Material 1.

For the purpose of convenience, a heat transfer system that includes sequestration materials from at least two of the (i)-(v) categories, such a material is referred to herein for convenience as Sequestration Material 2.

For the purpose of convenience, a heat transfer system that includes sequestration materials from at least two of the (ii)-(v) categories, such a material is referred to herein for convenience as Sequestration Material 3.

For the purpose of convenience, a heat transfer system that includes sequestration materials from at least three of the (ii)-(v) categories, such a material is referred to herein for convenience as Sequestration Material 4.

For the purpose of convenience, when a heat transfer system includes sequestration material from each of categories (ii)-(v), such a material is referred to herein for convenience as Sequestration Material 5.

For the purpose of convenience, when a heat transfer system includes a sequestration material that includes a material from each of categories (ii)-(v), and wherein the material from category (iii) comprises silver, such a material is referred to herein for convenience as Sequestration Material 6.

The heat transfer systems according to the present invention can comprise a compressor, an evaporator, a condenser and an expansion device, in fluid communication with each other, a refrigerant of the invention, including each of Refrigerants 1-20, a lubricant, and a Sequestration Material 1.

The heat transfer systems according to the present invention can comprise a compressor, an evaporator, a condenser and an expansion device, in fluid communication with each other, a refrigerant of the present invention, including each of Refrigerants 1-20, a lubricant, and a Sequestration Material 2.

The heat transfer systems according to the present invention can comprise a compressor, an evaporator, a condenser and an expansion device, in fluid communication with each other, a refrigerant of the present invention, including each of Refrigerants 1-20, a lubricant, and a Sequestration Material 3.

The heat transfer systems according to the present invention can comprise a compressor, an evaporator, a condenser and an expansion device, in fluid communication with each other, a refrigerant of the present invention, including each of Refrigerants 1-20, a lubricant, and a Sequestration Material 4.

The heat transfer systems according to the present invention can comprise a compressor, an evaporator, a condenser and an expansion device, in fluid communication with each other, a refrigerant of the present invention, including each of Refrigerants 1-20, a lubricant, and a Sequestration Material 5.

The heat transfer systems according to the present invention can comprise a compressor, an evaporator, a condenser and an expansion device, in fluid communication with each other, a refrigerant of the present invention, including each of Refrigerants 1-20, a lubricant, and a Sequestration Material 6.

The heat transfer systems according to the present invention can comprise a compressor, an evaporator, a condenser and an expansion device, in fluid communication with each other, a refrigerant of the present invention, including each of Refrigerants 1-20, a lubricant, including each of POE lubricants, Lubricant 1 and Lubricant 2, a sequestration material, including each of Sequestration Materials 1-6, and a stabilizer, including each of Stabilizers 1-13.

The heat transfer systems according to the present invention can comprise a compressor, an evaporator, a condenser and an expansion device, in fluid communication with each other, Refrigerant 1, POE lubricant, Stabilizer 1 and a sequestration material, including each of Sequestration Materials 1-6.

The heat transfer systems according to the present invention can comprise a compressor, an evaporator, a condenser and an expansion device, in fluid communication with each other, Refrigerant 1, Lubricant 1, Stabilizer 1 and a sequestration material, including each of Sequestration Materials 1-6.

The heat transfer systems according to the present invention can comprise a compressor, an evaporator, a condenser and an expansion device, in fluid communication with each other, Refrigerant 1, Lubricant 2, Stabilizer 1 and a sequestration material, including each of Sequestration Materials 1-6.

The heat transfer systems according to the present invention can comprise a compressor, an evaporator, a condenser and an expansion device, in fluid communication with each other, Refrigerant 6, POE lubricant, Stabilizer 1 and a sequestration material, including each of Sequestration Materials 1-6.

The heat transfer systems according to the present invention can comprise a compressor, an evaporator, a condenser and an expansion device, in fluid communication with each other, Refrigerant 6, Lubricant 1, Stabilizer 1 and a sequestration material, including each of Sequestration Materials 1-6.

The heat transfer systems according to the present invention can comprise a compressor, an evaporator, a condenser and an expansion device, in fluid communication with each other, Refrigerant 6, Lubricant 2, Stabilizer 1 and a sequestration material, including each of Sequestration Materials 1-6.

The heat transfer systems according to the present invention can comprise a compressor, an evaporator, a condenser and an expansion device, in fluid communication with each other, Refrigerant 10, POE lubricant, Stabilizer 1 and a sequestration material, including each of Sequestration Materials 1-6.

The heat transfer systems according to the present invention can comprise a compressor, an evaporator, a condenser and an expansion device, in fluid communication with each other, Refrigerant 10, Lubricant 1, Stabilizer 1 and a sequestration material, including each of Sequestration Materials 1-6.

The heat transfer systems according to the present invention can comprise a compressor, an evaporator, a condenser and an expansion device, in fluid communication with each other, Refrigerant 10, Lubricant 2, Stabilizer 1 and a sequestration material, including each of Sequestration Materials 1-6.

The heat transfer systems according to the present invention can comprise a compressor, an evaporator, a condenser and an expansion device, in fluid communication with each other, Refrigerant 1, POE lubricant, Stabilizer 3 and a sequestration material, including each of Sequestration Materials 1-6.

The heat transfer systems according to the present invention can comprise a compressor, an evaporator, a condenser and an expansion device, in fluid communication with each other, Refrigerant 1, Lubricant 1, Stabilizer 3 and a sequestration material, including each of Sequestration Materials 1-6.

The heat transfer systems according to the present invention can comprise a compressor, an evaporator, a condenser and an expansion device, in fluid communication with each other, Refrigerant 1, Lubricant 2, Stabilizer 3 and a sequestration material, including each of Sequestration Materials 1-6.

The heat transfer systems according to the present invention can comprise a compressor, an evaporator, a condenser and an expansion device, in fluid communication with each other, Refrigerant 6, POE lubricant, Stabilizer 3 and a sequestration material, including each of Sequestration Materials 1-6.

The heat transfer systems according to the present invention can comprise a compressor, an evaporator, a condenser and an expansion device, in fluid communication with each other, Refrigerant 6, Lubricant 1, Stabilizer 3 and a sequestration material, including each of Sequestration Materials 1-6.

The heat transfer systems according to the present invention can comprise a compressor, an evaporator, a condenser and an expansion device, in fluid communication with each other, Refrigerant 6, Lubricant 2, Stabilizer 3 and a sequestration material, including each of Sequestration Materials 1-6.

The heat transfer systems according to the present invention can comprise a compressor, an evaporator, a condenser and an expansion device, in fluid communication with each other, Refrigerant 10, POE lubricant, Stabilizer 3 and a sequestration material, including each of Sequestration Materials 1-6.

The heat transfer systems according to the present invention can comprise a compressor, an evaporator, a condenser and an expansion device, in fluid communication with each other, Refrigerant 10, Lubricant 1, Stabilizer 3 and a sequestration material, including each of Sequestration Materials 1-6.

The heat transfer systems according to the present invention can comprise a compressor, an evaporator, a condenser and an expansion device, in fluid communication with each other, Refrigerant 10, Lubricant 2, Stabilizer 3 and a sequestration material, including each of Sequestration Materials 1-6.

The heat transfer systems of the present invention include systems which include an oil separator downstream of the compressor, and such systems preferably include one or more sequestration materials of the present invention, including each of Sequestration Materials 1-6, wherein said sequestration materials are located inside the oil separator, or in some cases outside but downstream of the oil separator, such that the liquid lubricant is in contact with the sequestration material(s).

The present invention also includes one or more of the sequestration materials, including Sequestration Materials 1-6, being located in the refrigerant liquid that exits the condenser.

The present invention also includes methods for transferring heat of the type comprising evaporating refrigerant liquid to produce a refrigerant vapor, compressing in a compressor at least a portion of the refrigerant vapor and condensing refrigerant vapor, said method comprising:

(a) providing a refrigerant according to the present invention, including each of Refrigerants 1-20;

(b) optionally but preferably providing lubricant for said compressor; and (c) exposing at least a portion of said refrigerant and/or at least a portion of said lubricant to Sequestration Material 1.

The present invention also includes methods for transferring heat of the type comprising evaporating refrigerant liquid to produce a refrigerant vapor, compressing in a compressor at least a portion of the refrigerant vapor and condensing refrigerant vapor, said method comprising:

(a) providing a refrigerant according to the present invention, including each of Refrigerants 1-20;

(b) optionally but preferably providing lubricant for said compressor; and (c) exposing at least a portion of said refrigerant and/or at least a portion of said lubricant to Sequestration Material 3.

The present invention also includes methods for transferring heat of the type comprising evaporating refrigerant liquid to produce a refrigerant vapor, compressing in a compressor at least a portion of the refrigerant vapor and condensing refrigerant vapor, said method comprising:

(a) providing a refrigerant according to the present invention, including each of Refrigerants 1-20;

(b) optionally but preferably providing lubricant for said compressor; and (c) exposing at least a portion of said refrigerant and/or at least a portion of said lubricant to Sequestration Material 5.

The present invention also includes heat transfer methods according to any of the preceding four paragraphs wherein said exposing temperature is preferably above about 10° C.

In other aspects of the present invention, at least two materials are included together in a filter element. As the term is used herein, "filter element" refers to any device, system, article or container in which each of the sequestration materials are located in close physical proximity, and preferably at essentially the same location within the system.

In other aspects of the present invention, Sequestration Material 2 is used in the present heat transfer systems and the present heat transfer methods is configured such that each of the at least two materials are included together in a solid core. As the term is used herein, "solid core" refers to relatively porous solid which contains and/or has embedded therein two or more of sequestration materials such that such materials are accessible to fluids passing through said any solid core. In preferred embodiments the one or more sequestration materials are substantially homogeneously distributed throughout the solid core.

In preferred embodiments, the solid core of the present invention is included in or comprises a filter element.

In preferred embodiments, Sequestration Material 2 is configured such that each of the at least two materials are included in a solid core.

In preferred embodiments, Sequestration Material 3 is configured such that each of the at least two materials are included together in a filter element.

In preferred embodiments, Sequestration Material 3 is configured such that all of materials are included in a solid core.

In preferred embodiments, Sequestration Material 5 is configured such that each of the at least two materials are included together in a filter element.

In preferred embodiments, Sequestration Material 5 is configured such that all of materials are included in a solid core.

In preferred embodiments, Sequestration Material 6 is configured such that each of the at least two materials are included together in a filter element.

In preferred embodiments, Sequestration Material 6 is configured such that all of materials are included in a solid core.

With respect to sequestration materials, the systems of the present invention preferably include a sequestration material, including each of Sequestration Materials 1-6, in contact with at least a portion of a refrigerant according to the present invention, including each of Refrigerants 1-20, and/or with at least a portion of the lubricant, including each of POE lubricant and Lubricants 1-2, wherein the temperature of said sequestration material and/or the temperature of said refrigerant and/or the temperature of the lubricant when in said contact are at a temperature that is preferably at least about 10° C. Any and all of the refrigerants and any and all of the sequestration materials as described herein can be used in the systems of the present invention.

As used in this application, the term "in contact with at least a portion" is intended in its broad sense to include each of said sequestration materials and any combination of sequestration materials as described herein being in contact with the same or separate portions of the refrigerant and/or the lubricant in the system and is intended to include but not necessarily limited to embodiments in which each type or specific sequestration material is: (i) located physically together with each other type or specific material, if present; (ii) is located physically separate from each other type or specific material, if present, and (iii) combinations in which two or more materials are physically together and at least one sequestration material is physically separate from at least one other sequestration material.

Low Temperature Systems

The heat transfer systems according to the present invention include low temperature heat transfer systems that comprise a compressor, an evaporator, a condenser and an expansion device, in fluid communication with each other, a refrigerant of the invention, including each of Refrigerants 1-20 and a lubricant, including each of POE lubricant and Lubricant 1-2.

The heat transfer systems according to the present invention include low temperature heat transfer systems that comprise a compressor, an evaporator, a condenser and an expansion device, in fluid communication with each other, a refrigerant of the invention, including each of Refrigerants 1-20, a lubricant, including each of POE lubricant and Lubricant 1-2 and a sequestration material, including each of Sequestration Materials 1-6.

The heat transfer systems according to the present invention include low temperature heat transfer systems that comprise a compressor, an evaporator, a condenser and an expansion device, in fluid communication with each other, a refrigerant of the invention, including each of Refrigerants 1-20, a lubricant, including each of POE lubricant and Lubricant 1-2, and a stabilizer, including each of Stabilizers 1-17.

The heat transfer systems according to the present invention include low temperature heat transfer systems that comprise a compressor, an evaporator, a condenser and an expansion device, in fluid communication with each other, a refrigerant of the invention, including each of Refrigerants 1-20, a lubricant, including each of POE lubricant and Lubricant 1-2, and a stabilizer, including each of Stabilizers 1-17 and a sequestration material, including each of Sequestration Materials 1-6.

The heat transfer systems according to the present invention include low temperature heat transfer systems that comprise a compressor, an evaporator, a condenser and an expansion device, in fluid communication with each other, Refrigerant 1, POE lubricant, and stabilizer, including each of Stabilizers 1-17.

The heat transfer systems according to the present invention include low temperature heat transfer systems that comprise a compressor, an evaporator, a condenser and an expansion device, in fluid communication with each other, Refrigerant 1, POE lubricant, Stabilizer 1, and sequestration material selected from Sequestration Materials 1-6.

The heat transfer systems according to the present invention include low temperature transport refrigeration systems that comprise a compressor, an evaporator, a condenser and an expansion device, Refrigerant 1, a POE lubricant and Stabilizer 1.

The heat transfer systems according to the present invention include low temperature transport refrigeration systems that comprise a compressor, an evaporator having an evaporator operating temperature of −35° C. to about −25° C., a condenser and an expansion device, Refrigerant 1, a POE lubricant and Stabilizer 1.

The heat transfer systems according to the present invention include low temperature transport refrigeration systems that comprise a compressor, an evaporator having an evaporator operating temperature of about −35° C. to about −25° C., a condenser and an expansion device, Refrigerant 1, a POE lubricant, Stabilizer 1 and sequestration material selected from Sequestration Materials 1-6.

The heat transfer systems according to the present invention include low temperature chiller systems that comprise a compressor, an evaporator, a condenser and an expansion device, Refrigerant 1, a POE lubricant and Stabilizer 1.

The heat transfer systems according to the present invention include low temperature chiller systems that comprise a compressor, an evaporator having an evaporator operating temperature of about −25° C. to about −12° C., a condenser and an expansion device, Refrigerant 1, a POE lubricant and Stabilizer 1.

The heat transfer systems according to the present invention include low temperature chiller systems that comprise a compressor, an evaporator having an evaporator operating temperature of about −25° C. to about −12° C., a condenser and an expansion device, Refrigerant 1, a POE lubricant and Stabilizer 1 and sequestration material selected from Sequestration Materials 1-6.

The heat transfer systems according to the present invention include low temperature supermarket refrigeration systems that comprise a compressor, an evaporator, a condenser and an expansion device, Refrigerant 1, a POE lubricant and Stabilizer 1.

The heat transfer systems according to the present invention include low temperature supermarket refrigeration systems that comprise a compressor, an evaporator having an evaporator operating temperature of about −35° C. to about −12° C., a condenser and an expansion device, Refrigerant 1, a POE lubricant and Stabilizer 1.

The heat transfer systems according to the present invention include low temperature supermarket refrigeration systems that comprise a compressor, an evaporator having an evaporator operating temperature of about −35° C. to about −12° C., a condenser and an expansion device, Refrigerant 1, a POE lubricant, Stabilizer 1 and sequestration material selected from Sequestration Materials 1-6.

The heat transfer systems according to the present invention include low temperature supermarket refrigeration systems that comprise a compressor, an evaporator having an evaporator operating temperature of about −35° C. to about −25° C., a condenser and an expansion device, Refrigerant 1, a POE lubricant and Stabilizer 1.

The heat transfer systems according to the present invention include low temperature supermarket refrigeration systems that comprise a compressor, an evaporator having an evaporator operating temperature of about −35° C. to about −25° C., a condenser and an expansion device, Refrigerant 1, a POE lubricant, Stabilizer 1 and sequestration material selected from Sequestration Materials 1-6.

The heat transfer systems according to the present invention include low temperature transport refrigeration systems that comprise a compressor, an evaporator, a condenser and an expansion device, in fluid communication with each other, Refrigerant 6, POE lubricant, Stabilizer 1, and sequestration material selected from Sequestration Materials 1-6.

The heat transfer systems according to the present invention include low temperature transport refrigeration systems that comprise a compressor, an evaporator having an evaporator operating temperature of about −35° C. to about −25° C., a condenser and an expansion device, in fluid communication with each other, Refrigerant 6, POE lubricant, and stabilizer, including each of Stabilizers 1-17.

The heat transfer systems according to the present invention include low temperature chiller systems that comprise a compressor, an evaporator, a condenser and an expansion device, Refrigerant 6, a POE lubricant and Stabilizer 1.

The heat transfer systems according to the present invention include low temperature chiller systems that comprise a compressor, an evaporator having an evaporator operating temperature of about −25° C. to −12° C., a condenser and an expansion device, Refrigerant 6, a POE lubricant and Stabilizer 1.

The heat transfer systems according to the present invention include low temperature chiller systems that comprise a compressor, an evaporator having an evaporator operating temperature of about −25° C. to −12° C., a condenser and an expansion device, Refrigerant 6, a POE lubricant and Stabilizer 1 and sequestration material selected from Sequestration Materials 1-6.

The heat transfer systems according to the present invention include low temperature supermarket refrigeration systems that comprise a compressor, an evaporator, a condenser and an expansion device, Refrigerant 6, a POE lubricant and Stabilizer 1.

The heat transfer systems according to the present invention include low temperature supermarket refrigeration systems that comprise a compressor, an evaporator having an evaporator operating temperature of about −35° C. to −12° C., a condenser and an expansion device, Refrigerant 6, a POE lubricant and Stabilizer 1.

The heat transfer systems according to the present invention include low temperature supermarket refrigeration systems that comprise a compressor, an evaporator having an evaporator operating temperature of about −35° C. to −12° C., a condenser and an expansion device, Refrigerant 6, a POE lubricant, Stabilizer 1 and sequestration material selected from Sequestration Materials 1-6.

The heat transfer systems according to the present invention include low temperature supermarket refrigeration systems that comprise a compressor, an evaporator having an evaporator operating temperature of about −35° C. to about −25° C., a condenser and an expansion device, Refrigerant 6, a POE lubricant and Stabilizer 1.

The heat transfer systems according to the present invention include low temperature supermarket refrigeration systems that comprise a compressor, an evaporator having an evaporator operating temperature of about −35° C. to about −25° C., a condenser and an expansion device, Refrigerant 6, a POE lubricant, Stabilizer 11 and sequestration material selected from Sequestration Materials 1-6.

The heat transfer systems according to the present invention include low temperature transport refrigeration systems that comprise a compressor, an evaporator having an evaporator operating temperature of about −35° C. to about −25° C., a condenser and an expansion device, in fluid communication with each other, Refrigerant 10, POE lubricant, and stabilizer, including each of Stabilizers 1-17.

The heat transfer systems according to the present invention include low temperature chiller systems that comprise a compressor, an evaporator, a condenser and an expansion device, Refrigerant 10, a POE lubricant and Stabilizer 1.

The heat transfer systems according to the present invention include low temperature chiller systems that comprise a compressor, an evaporator having an evaporator operating temperature of about −25° C. to about −12° C., a condenser and an expansion device, Refrigerant 10, a POE lubricant and Stabilizer 1.

The heat transfer systems according to the present invention include low temperature chiller systems that comprise a compressor, an evaporator having an evaporator operating temperature of about −25° C. to about −12° C., a condenser and an expansion device, Refrigerant 10, a POE lubricant and Stabilizer 1 and sequestration material selected from Sequestration Materials 1-6.

The heat transfer systems according to the present invention include low temperature supermarket refrigeration systems that comprise a compressor, an evaporator, a condenser and an expansion device, Refrigerant 10, a POE lubricant and Stabilizer 1.

The heat transfer systems according to the present invention include low temperature supermarket refrigeration systems that comprise a compressor, an evaporator having an evaporator operating temperature of about −35° C. to −12° C., a condenser and an expansion device, Refrigerant 10, a POE lubricant and Stabilizer 1.

The heat transfer systems according to the present invention include low temperature supermarket refrigeration systems that comprise a compressor, an evaporator having an evaporator operating temperature of about −35° C. to −12° C., a condenser and an expansion device, Refrigerant 10, a POE lubricant, Stabilizer 1 and sequestration material selected from Sequestration Materials 1-6.

The heat transfer systems according to the present invention include low temperature supermarket refrigeration systems that comprise a compressor, an evaporator having an evaporator operating temperature of about −35° C. to about −25° C., a condenser and an expansion device, Refrigerant 10, a POE lubricant and Stabilizer 1.

The heat transfer systems according to the present invention include low temperature supermarket refrigeration systems that comprise a compressor, an evaporator having an evaporator operating temperature of about −35° C. to about −25° C., a condenser and an expansion device, Refrigerant 10, a POE lubricant, Stabilizer 11 and sequestration material selected from Sequestration Materials 1-6.

The heat transfer systems according to the present invention include low temperature heat transfer systems that comprise a compressor, a vapor injector, an evaporator, a condenser, and an expansion device, in fluid communication with each other, a refrigerant of the invention, including each of Refrigerants 1-20, a lubricant, including each of POE lubricant and Lubricant 1-2, and a stabilizer, including each of Stabilizers 1-17 and a sequestration material, including each of Sequestration Materials 1-6.

The heat transfer systems according to the present invention include low temperature heat transfer systems that comprise a compressor, a liquid injector, an evaporator, a condenser, and an expansion device, in fluid communication with each other, a refrigerant of the invention, including each of Refrigerants 1-20, a lubricant, including each of POE lubricant and Lubricant 1-2, and a stabilizer, including each of Stabilizers 1-17 and a sequestration material, including each of Sequestration Materials 1-6.

The heat transfer systems according to the present invention include low temperature transport refrigeration systems that comprise a compressor, a vapor injector, a liquid injector, an evaporator, a condenser, and an expansion device, in fluid communication with each other, a refrigerant of the invention, including each of Refrigerants 1-20, a lubricant, including each of POE lubricant and Lubricant 1-2, and a stabilizer, including each of Stabilizers 1-17 and a sequestration material, including each of Sequestration Materials 1-6.

The heat transfer systems according to the present invention include low temperature transport refrigeration systems that comprise a compressor, a liquid injector, an evaporator, a condenser, and an expansion device, in fluid communication with each other, a refrigerant of the invention, including each of Refrigerants 1-20, a lubricant, including each of POE lubricant and Lubricant 1-2, and a stabilizer, including each of Stabilizers 1-17 and a sequestration material, including each of Sequestration Materials 1-6.

The heat transfer systems according to the present invention include low temperature transport refrigeration systems that comprise a compressor, a vapor injector, a liquid injector, an evaporator, a condenser, and an expansion device, in fluid communication with each other, a refrigerant of the invention, including each of Refrigerants 1-20, a lubricant, including each of POE lubricant and Lubricant 1-2, and a stabilizer, including each of Stabilizers 1-17 and a sequestration material, including each of Sequestration Materials 1-6.

The heat transfer systems according to the present invention include low temperature supermarket refrigeration systems that comprise a compressor, a vapor injector, a liquid injector, an evaporator, a condenser, and an expansion device, in fluid communication with each other, a refrigerant of the invention, including each of Refrigerants 1-20, a lubricant, including each of POE lubricant and Lubricant 1-2, and a stabilizer, including each of Stabilizers 1-17 and a sequestration material, including each of Sequestration Materials 1-6.

The heat transfer systems according to the present invention include low temperature supermarket refrigeration systems that comprise a compressor, a liquid injector, an evaporator, a condenser, and an expansion device, in fluid communication with each other, a refrigerant of the invention, including each of Refrigerants 1-20, a lubricant, including each of POE lubricant and Lubricant 1-2, and a stabilizer, including each of Stabilizers 1-17 and a sequestration material, including each of Sequestration Materials 1-6.

The heat transfer systems according to the present invention include low temperature supermarket refrigeration systems that comprise a compressor, a vapor injector, a liquid injector, an evaporator, a condenser, and an expansion device, in fluid communication with each other, a refrigerant of the invention, including each of Refrigerants 1-20, a lubricant, including each of POE lubricant and Lubricant 1-2, and a stabilizer, including each of Stabilizers 1-17 and a sequestration material, including each of Sequestration Materials 1-6.

Medium Temperature Systems

The heat transfer systems according to the present invention include medium temperature heat transfer systems that comprise a compressor, an evaporator, a condenser and an expansion device, in fluid communication with each other, a refrigerant of the invention, including each of Refrigerants 1-20 and a lubricant, including each of POE lubricant and Lubricant 1-2.

The heat transfer systems according to the present invention include medium temperature heat transfer systems that comprise a compressor, an evaporator, a condenser and an expansion device, in fluid communication with each other, a refrigerant of the invention, including each of Refrigerants 1-20, a lubricant, including each of POE lubricant and Lubricant 1-2 and a sequestration material, including each of Sequestration Materials 1-6.

The heat transfer systems according to the present invention include medium temperature heat transfer systems that comprise a compressor, an evaporator, a condenser and an expansion device, in fluid communication with each other, a refrigerant of the invention, including each of Refrigerants 1-20, a lubricant, including each of POE lubricant and Lubricant 1-2, and a stabilizer, including each of Stabilizers 1-17.

The heat transfer systems according to the present invention include medium temperature heat transfer systems that comprise a compressor, an evaporator, a condenser and an expansion device, in fluid communication with each other, a refrigerant of the invention, including each of Refrigerants 1-20, a lubricant, including each of POE lubricant and Lubricant 1-2, and a stabilizer, including each of Stabilizers 1-17 and a sequestration material, including each of Sequestration Materials 1-6.

The heat transfer systems according to the present invention include medium temperature heat transfer systems that comprise a compressor, an evaporator, a condenser and an expansion device, in fluid communication with each other, Refrigerant 1, POE lubricant, and stabilizer, including each of Stabilizers 1-17.

The heat transfer systems according to the present invention include medium temperature heat transfer systems that comprise a compressor, an evaporator, a condenser and an expansion device, in fluid communication with each other, Refrigerant 1, POE lubricant, Stabilizer 1, and sequestration material selected from Sequestration Materials 1-6.

The heat transfer systems according to the present invention include medium temperature transport refrigeration systems that comprise a compressor, an evaporator, a condenser and an expansion device, Refrigerant 1, a POE lubricant and Stabilizer 1.

The heat transfer systems according to the present invention include medium temperature transport refrigeration systems that comprise a compressor, an evaporator having an evaporator operating temperature of $-12°$ C. to about $0°$ C., a condenser and an expansion device, Refrigerant 1, a POE lubricant and Stabilizer 1.

The heat transfer systems according to the present invention include medium temperature transport refrigeration systems that comprise a compressor, an evaporator having an evaporator operating temperature of $-12°$ C. to about $-0°$ C., a condenser and an expansion device, Refrigerant 1, a POE lubricant, Stabilizer 1 and sequestration material selected from Sequestration Materials 1-6.

The heat transfer systems according to the present invention include medium temperature chiller systems that comprise a compressor, an evaporator, a condenser and an expansion device, Refrigerant 1, a POE lubricant and Stabilizer 1.

The heat transfer systems according to the present invention include medium temperature chiller systems that comprise a compressor, an evaporator having an evaporator operating temperature of $-12°$ C. to about $0°$ C., a condenser and an expansion device, Refrigerant 1, a POE lubricant and Stabilizer 1.

The heat transfer systems according to the present invention include medium temperature chiller systems that comprise a compressor, an evaporator having an evaporator operating temperature of $-12°$ C. to about $0°$ C., a condenser and an expansion device, Refrigerant 1, a POE lubricant and Stabilizer 1 and sequestration material selected from Sequestration Materials 1-6.

The heat transfer systems according to the present invention include medium temperature supermarket refrigeration systems that comprise a compressor, an evaporator, a condenser and an expansion device, Refrigerant 1, a POE lubricant and Stabilizer 1.

The heat transfer systems according to the present invention include medium temperature supermarket refrigeration systems that comprise a compressor, an evaporator having an evaporator operating temperature of $-12°$ C. to about $0°$ C., a condenser and an expansion device, Refrigerant 1, a POE lubricant and Stabilizer 1.

The heat transfer systems according to the present invention include medium temperature supermarket refrigeration systems that comprise a compressor, an evaporator having an evaporator operating temperature of $-12°$ C. to about $0°$ C., a condenser and an expansion device, Refrigerant 1, a POE lubricant, Stabilizer 1 and sequestration material selected from Sequestration Materials 1-6.

The heat transfer systems according to the present invention include medium temperature supermarket refrigeration systems that comprise a compressor, an evaporator having an evaporator operating temperature of $-10°$ C. to about $-6.7°$ C., a condenser and an expansion device, Refrigerant 1, a POE lubricant and Stabilizer 1.

The heat transfer systems according to the present invention include medium temperature supermarket refrigeration systems that comprise a compressor, an evaporator having an evaporator operating temperature of $-10°$ C. to about $-6.7°$ C., a condenser and an expansion device, Refrigerant 1, a POE lubricant, Stabilizer 1 and sequestration material selected from Sequestration Materials 1-6.

The heat transfer systems according to the present invention include medium temperature transport refrigeration systems that comprise a compressor, an evaporator, a condenser and an expansion device, in fluid communication with each other, Refrigerant 6, POE lubricant, Stabilizer 1.

The heat transfer systems according to the present invention include medium temperature transport refrigeration systems that comprise a compressor, an evaporator, a condenser and an expansion device, in fluid communication with each other, Refrigerant 6, POE lubricant, Stabilizer 1, and sequestration material selected from Sequestration Materials 1-6.

The heat transfer systems according to the present invention include medium temperature transport refrigeration systems that comprise a compressor, an evaporator having an evaporator operating temperature of $-12°$ C. to about $0°$ C., a condenser and an expansion device, in fluid communication with each other, Refrigerant 6, POE lubricant, and stabilizer, including each of Stabilizers 1-17.

The heat transfer systems according to the present invention include medium temperature chiller systems that comprise a compressor, an evaporator having an evaporator operating temperature of $-12°$ C. to about $0°$ C., a condenser and an expansion device, Refrigerant 6, a POE lubricant and Stabilizer 1.

The heat transfer systems according to the present invention include medium temperature chiller systems that comprise a compressor, an evaporator, a condenser and an expansion device, Refrigerant 6, a POE lubricant and Stabilizer 1.

The heat transfer systems according to the present invention include medium temperature chiller systems that comprise a compressor, an evaporator having an evaporator operating temperature of −10° C. to about −6.7° C., a condenser and an expansion device, Refrigerant 6, a POE lubricant and Stabilizer 1.

The heat transfer systems according to the present invention include medium temperature chiller systems that comprise a compressor, an evaporator having an evaporator operating temperature of −10° C. to about −6.7° C., a condenser and an expansion device, Refrigerant 6, a POE lubricant and Stabilizer 1 and sequestration material selected from Sequestration Materials 1-6.

The heat transfer systems according to the present invention include medium temperature chiller systems that comprise a compressor, an evaporator having an evaporator operating temperature of −12° C. to about 0° C., a condenser and an expansion device, in fluid communication with each other, Refrigerant 6, POE lubricant, and stabilizer, including each of Stabilizers 1-17.

The heat transfer systems according to the present invention include medium temperature supermarket refrigeration systems that comprise a compressor, an evaporator, a condenser and an expansion device, Refrigerant 6, a POE lubricant and Stabilizer 1.

The heat transfer systems according to the present invention include medium temperature supermarket refrigeration systems that comprise a compressor, an evaporator having an evaporator operating temperature of −35° C. to about −12° C., a condenser and an expansion device, Refrigerant 6, a POE lubricant and Stabilizer 1.

The heat transfer systems according to the present invention include medium temperature supermarket refrigeration systems that comprise a compressor, an evaporator having an evaporator operating temperature of about −35° C. to −12° C., a condenser and an expansion device, Refrigerant 6, a POE lubricant, Stabilizer 1 and sequestration material selected from Sequestration Materials 1-6.

The heat transfer systems according to the present invention include medium temperature supermarket refrigeration systems that comprise a compressor, an evaporator having an evaporator operating temperature of −12° C. to about 0° C., a condenser and an expansion device, in fluid communication with each other, Refrigerant 6, POE lubricant, and stabilizer, including each of Stabilizers 1-17.

The heat transfer systems according to the present invention include medium temperature supermarket refrigeration systems that comprise a compressor, an evaporator having an evaporator operating temperature of −10° C. to about −6.7° C., a condenser and an expansion device, Refrigerant 6, a POE lubricant and Stabilizer 1.

The heat transfer systems according to the present invention include medium temperature supermarket refrigeration systems that comprise a compressor, an evaporator having an evaporator operating temperature of −10° C. to about −6.7° C., a condenser and an expansion device, Refrigerant 6, a POE lubricant, Stabilizer 1 and sequestration material selected from Sequestration Materials 1-6.

The heat transfer systems according to the present invention include medium temperature transport refrigeration systems that comprise a compressor, an evaporator, a condenser and an expansion device, in fluid communication with each other, Refrigerant 10, POE lubricant, Stabilizer 1.

The heat transfer systems according to the present invention include medium temperature transport refrigeration systems that comprise a compressor, an evaporator, a condenser and an expansion device, in fluid communication with each other, Refrigerant 10, POE lubricant, Stabilizer 1, and sequestration material selected from Sequestration Materials 1-6.

The heat transfer systems according to the present invention include medium temperature transport refrigeration systems that comprise a compressor, an evaporator having an evaporator operating temperature of −12° C. to about 0° C., a condenser and an expansion device, in fluid communication with each other, Refrigerant 10, POE lubricant, and stabilizer, including each of Stabilizers 1-17.

The heat transfer systems according to the present invention include medium temperature chiller systems that comprise a compressor, an evaporator, a condenser and an expansion device, Refrigerant 10, a POE lubricant and Stabilizer 1.

The heat transfer systems according to the present invention include medium temperature chiller systems that comprise a compressor, an evaporator having an evaporator operating temperature of −12° C. to about 0° C., a condenser and an expansion device, Refrigerant 10, a POE lubricant and Stabilizer 1.

The heat transfer systems according to the present invention include medium temperature chiller systems that comprise a compressor, an evaporator having an evaporator operating temperature of −12° C. to about 0° C., a condenser and an expansion device, Refrigerant 10, a POE lubricant, Stabilizer 1 and sequestration material selected from Sequestration Materials 1-6.

The heat transfer systems according to the present invention include medium temperature chiller systems that comprise a compressor, an evaporator having an evaporator operating temperature of −10° C. to about −6.7° C., a condenser and an expansion device, Refrigerant 10, a POE lubricant and Stabilizer 1 and sequestration material selected from Sequestration Materials 1-6.

The heat transfer systems according to the present invention include medium temperature chiller systems that comprise a compressor, an evaporator having an evaporator operating temperature of −12° C. to about 0° C., a condenser and an expansion device, in fluid communication with each other, Refrigerant 10, POE lubricant, and stabilizer, including each of Stabilizers 1-17.

The heat transfer systems according to the present invention include medium temperature supermarket refrigeration systems that comprise a compressor, an evaporator, a condenser and an expansion device, Refrigerant 10, a POE lubricant and Stabilizer 1.

The heat transfer systems according to the present invention include medium temperature supermarket refrigeration systems that comprise a compressor, an evaporator having an evaporator operating temperature of −12° C. to about 0° C., a condenser and an expansion device, Refrigerant 10, a POE lubricant and Stabilizer 1.

The heat transfer systems according to the present invention include medium temperature supermarket refrigeration systems that comprise a compressor, an evaporator having an evaporator operating temperature of −12° C. to about −0° C., a condenser and an expansion device, Refrigerant 10, a POE lubricant, Stabilizer 1 and sequestration material selected from Sequestration Materials 1-6.

The heat transfer systems according to the present invention include medium temperature supermarket refrigeration systems that comprise a compressor, an evaporator having an evaporator operating temperature of −12° C. to about 0° C., a condenser and an expansion device, in fluid communication with each other, Refrigerant 10, POE lubricant, and stabilizer, including each of Stabilizers 1-17.

The heat transfer systems according to the present invention include medium temperature supermarket refrigeration systems that comprise a compressor, an evaporator having an evaporator operating temperature of −10° C. to about −6.7° C., a condenser and an expansion device, Refrigerant 10, a POE lubricant and Stabilizer 1.

The heat transfer systems according to the present invention include medium temperature supermarket refrigeration systems that comprise a compressor, an evaporator having an evaporator operating temperature of −10° C. to about −6.7° C., a condenser and an expansion device, Refrigerant 6, a POE lubricant, Stabilizer 1 and sequestration material selected from Sequestration Materials 1-6.

The heat transfer systems according to the present invention include medium temperature heat transfer systems that comprise a compressor, a vapor injector, an evaporator, a condenser, and an expansion device, in fluid communication with each other, a refrigerant of the invention, including each of Refrigerants 1-20, a lubricant, including each of POE lubricant and Lubricant 1-2, and a stabilizer, including each of Stabilizers 1-17 and a sequestration material, including each of Sequestration Materials 1-6.

The heat transfer systems according to the present invention include medium temperature heat transfer systems that comprise a compressor, a liquid injector, an evaporator, a condenser, and an expansion device, in fluid communication with each other, a refrigerant of the invention, including each of Refrigerants 1-20, a lubricant, including each of POE lubricant and Lubricant 1-2, and a stabilizer, including each of Stabilizers 1-17 and a sequestration material, including each of Sequestration Materials 1-6.

The heat transfer systems according to the present invention include medium temperature transport refrigeration systems that comprise a compressor, a vapor injector, a liquid injector, an evaporator, a condenser, and an expansion device, in fluid communication with each other, a refrigerant of the invention, including each of Refrigerants 1-20, a lubricant, including each of POE lubricant and Lubricant 1-2, and a stabilizer, including each of Stabilizers 1-17 and a sequestration material, including each of Sequestration Materials 1-6.

The heat transfer systems according to the present invention include medium temperature transport refrigeration systems that comprise a compressor, a liquid injector, an evaporator, a condenser, and an expansion device, in fluid communication with each other, a refrigerant of the invention, including each of Refrigerants 1-20, a lubricant, including each of POE lubricant and Lubricant 1-2, and a stabilizer, including each of Stabilizers 1-17 and a sequestration material, including each of Sequestration Materials 1-6.

The heat transfer systems according to the present invention include medium temperature transport refrigeration systems that comprise a compressor, a vapor injector, a liquid injector, an evaporator, a condenser, and an expansion device, in fluid communication with each other, a refrigerant of the invention, including each of Refrigerants 1-20, a lubricant, including each of POE lubricant and Lubricant 1-2, and a stabilizer, including each of Stabilizers 1-17 and a sequestration material, including each of Sequestration Materials 1-6.

The heat transfer systems according to the present invention include medium temperature supermarket refrigeration systems that comprise a compressor, a vapor injector, a liquid injector, an evaporator, a condenser, and an expansion device, in fluid communication with each other, a refrigerant of the invention, including each of Refrigerants 1-20, a lubricant, including each of POE lubricant and Lubricant 1-2, and a stabilizer, including each of Stabilizers 1-17 and a sequestration material, including each of Sequestration Materials 1-6.

The heat transfer systems according to the present invention include medium temperature supermarket refrigeration systems that comprise a compressor, a liquid injector, an evaporator, a condenser, and an expansion device, in fluid communication with each other, a refrigerant of the invention, including each of Refrigerants 1-20, a lubricant, including each of POE lubricant and Lubricant 1-2, and a stabilizer, including each of Stabilizers 1-17 and a sequestration material, including each of Sequestration Materials 1-6.

The heat transfer systems according to the present invention include medium temperature supermarket refrigeration systems that comprise a compressor, a vapor injector, a liquid injector, an evaporator, a condenser, and an expansion device, in fluid communication with each other, a refrigerant of the invention, including each of Refrigerants 1-20, a lubricant, including each of POE lubricant and Lubricant 1-2, and a stabilizer, including each of Stabilizers 1-17 and a sequestration material, including each of Sequestration Materials 1-6.

Low Temperature Methods

The present invention also includes low temperature refrigeration methods for transferring heat, said method comprising:

(a) evaporating a refrigerant according to the present invention (including any refrigerant selected from each of Refrigerants 1-20), at a temperature of from about −40° C. to about −12° C. to produce a refrigerant vapor;

(b) compressing said refrigerant vapor to produce a refrigerant at discharge temperature of less than about 135° C.; and (c) condensing the refrigerant from said compressor at a temperature of from about 20° C. to about 60° C. to produce a refrigerant vapor.

The present invention also includes low temperature refrigeration methods for transferring heat, said method comprising:

(a) evaporating a refrigerant according to the present invention (including any refrigerant selected from each of Refrigerants 1-20), at a temperature of from about −40° C. to about −12° C. to produce a refrigerant vapor;

(b) compressing said refrigerant vapor to produce a refrigerant at discharge temperature of less than about 135° C.; and (c) condensing the refrigerant from said compressor at a temperature of from about 25° C. to about 45° C. to produce a refrigerant vapor.

The present invention also includes low temperature refrigeration methods for transferring heat, said method comprising:

(a) evaporating a refrigerant according to the present invention, including each of Refrigerants 1-20, at a temperature in the range of from about −35° C. to about −25° C. to produce a refrigerant vapor;

(b) compressing said refrigerant vapor to produce a refrigerant at discharge temperature of less than about 135° C.; and (c) condensing the refrigerant from said compressor at a temperature of from about 25° C. to about 45° C. to produce a refrigerant vapor.

The present invention also includes low temperature refrigeration methods for transferring heat, said method comprising:

(a) evaporating a refrigerant according to the present invention, including each of Refrigerants 1-20, at a temperature in the range of from about −25° C. to about −12° C. to produce a refrigerant vapor;

(b) compressing said refrigerant vapor to produce a refrigerant at discharge temperature of less than about 135° C.; and (c) condensing the refrigerant from said compressor at a temperature of from about 25° C. to about 45° C. to produce a refrigerant liquid.

The present invention also includes low temperature refrigeration methods for transferring heat, said method comprising:

(a) evaporating a refrigerant according to the present invention, including each of Refrigerants 1-20, at a temperature in the range of from about −25° C. to about −12° C. to produce a refrigerant vapor;

(b) compressing said refrigerant vapor to produce a refrigerant at discharge temperature of less than about 135° C.; and (c) condensing the refrigerant from said compressor at a temperature in the range of from about 20° C. to about 60° C. to produce a refrigerant liquid.

The present invention also includes low temperature refrigeration methods for transferring heat, said method comprising:

(a) evaporating a refrigerant according to the present invention (including any refrigerant selected from each of Refrigerants 1-20), at a temperature of from about −40° C. to about −12° C. to produce a refrigerant vapor;

(b) compressing said refrigerant vapor in a compressor lubricated with a POE lubricant to produce a refrigerant at a discharge temperature of less than about 135° C.;

(c) condensing the refrigerant from said compressor at a temperature of from about 20° C. to about 60° C. to produce a refrigerant vapor; and (d) exposing at least a portion of said refrigerant and/or at least a portion of said lubricant to a sequestration material of the present invention, including any of Sequestration Materials 1-6.

The present invention also includes low temperature refrigeration methods for transferring heat, said method comprising:

(a) evaporating a refrigerant according to the present invention (including any refrigerant selected from each of Refrigerants 1-20), at a temperature of from about −40° C. to −12° C. to produce a refrigerant vapor;

(b) compressing said refrigerant vapor in a compressor lubricated with a POE lubricant to produce a refrigerant at discharge temperature of less than about 135° C.;

(c) condensing the refrigerant from said compressor at a temperature of from about 25° C. to about 45° C. to produce a refrigerant vapor; and (d) exposing at least a portion of said refrigerant and/or at least a portion of said lubricant to a sequestration material of the present invention, including any of Sequestration Materials 1-6.

The present invention also includes low temperature refrigeration methods for transferring heat, said method comprising:

(a) evaporating a refrigerant according to the present invention, including each of Refrigerants 1-20, at a temperature in the range of from about −35° C. to about −25° C. to produce a refrigerant vapor;

(b) compressing said refrigerant vapor to in a compressor lubricated with a POE lubricant produce a refrigerant at discharge temperature of less than about 135° C.;

(c) condensing the refrigerant from said compressor at a temperature of from about 25° C. to about 45° C. to produce a refrigerant vapor; and (d) exposing at least a portion of said refrigerant and/or at least a portion of said lubricant to a sequestration material of the present invention, including any of Sequestration Materials 1-6.

The present invention also includes low temperature refrigeration methods for transferring heat, said method comprising:

(a) evaporating a refrigerant according to the present invention, including each of Refrigerants 1-20, at a temperature in the range of from about −25° C. to −12° C. to produce a refrigerant vapor;

(b) compressing said refrigerant vapor in a compressor lubricated with a POE lubricant to produce a refrigerant at discharge temperature of less than about 135° C.;

(c) condensing the refrigerant from said compressor at a temperature of from about 25° C. to about 45° C. to produce a refrigerant liquid; and (d) exposing at least a portion of said refrigerant and/or at least a portion of said lubricant to a sequestration material of the present invention, including any of Sequestration Materials 1-6.

The present invention also includes low temperature refrigeration methods for transferring heat, said method comprising:

(a) evaporating a refrigerant according to the present invention, including each of Refrigerants 1-20, at a temperature in the range of from about −25° C. to −12° C. to produce a refrigerant vapor;

(b) compressing said refrigerant vapor in a compressor lubricated with a POE lubricant to produce a refrigerant at discharge temperature of less than about 135° C.;

(c) condensing the refrigerant from said compressor at a temperature in the range of from about 20° C. to about 60° C. to produce a refrigerant liquid; and (d) exposing at least a portion of said refrigerant and/or at least a portion of said lubricant to a sequestration material of the present invention, including any of Sequestration Materials 1-6.

The present invention also includes low temperature refrigeration methods for transferring heat in a low temperature refrigeration system, said method comprising:

(a) evaporating a refrigerant according to the present invention (including any refrigerant selected from each of Refrigerants 1-20), at a temperature of from about −40° C. to about −12° C. to produce a refrigerant vapor;

(b) compressing said refrigerant vapor to produce a refrigerant at discharge temperature of less than about 135° C.; and (c) condensing the refrigerant from said compressor at a temperature of from about 20° C. to about 60° C. to produce a refrigerant vapor, wherein said method produces a capacity of from 97% to 93% in said system compared to the capacity of R-404A and an efficiency (COP) in said system greater than the efficiency of R-404A in said system.

The present invention also includes low temperature refrigeration methods for transferring heat in a low temperature refrigeration system, said method comprising:

(a) evaporating Refrigerant 18 at a temperature of from about −40° C. to about −12° C. to produce a refrigerant vapor;

(b) compressing said refrigerant vapor to produce a refrigerant at discharge temperature of less than about 135° C.; and (c) condensing the refrigerant from said compressor at a temperature of from about 20° C. to about 60° C. to produce a refrigerant vapor, wherein said method produces a capacity of from 97% to 93% in said system compared to the capacity of R-404A and an efficiency (COP) in said system greater than the efficiency of R-404A in said system.

The present invention also includes low temperature refrigeration methods for transferring heat in a low temperature refrigeration system, said method comprising:

(a) evaporating Refrigerant 19 at a temperature of from about −40° C. to about −12° C. to produce a refrigerant vapor;

(b) compressing said refrigerant vapor to produce a refrigerant at discharge temperature of less than about 135° C.; and (c) condensing the refrigerant from said compressor at a temperature of from about 20° C. to about 60° C. to produce a refrigerant vapor, wherein said method produces a capacity of from 97% to 93% in said system compared to the capacity of R-404A and an efficiency (COP) in said system greater than the efficiency of R-404A in said system.

The present invention also includes low temperature refrigeration methods for transferring heat in a low temperature refrigeration system, said method comprising:

(a) evaporating Refrigerant 20 at a temperature of from about −40° C. to about −12° C. to produce a refrigerant vapor;

(b) compressing said refrigerant vapor to produce a refrigerant at discharge temperature of less than about 135° C.; and (c) condensing the refrigerant from said compressor at a temperature of from about 20° C. to about 60° C. to produce a refrigerant vapor, wherein said method produces a capacity of from 97% to 93% in said system compared to the capacity of R-404A and an efficiency (COP) in said system greater than the efficiency of R-404A in said system.

The present invention also includes low temperature refrigeration methods for transferring heat, said method comprising:

(a) evaporating a refrigerant according to the present invention (including any refrigerant selected from each of Refrigerants 1-20), at a temperature of from about −40° C. to about −12° C. to produce a refrigerant vapor;

(b) compressing said refrigerant vapor to produce a refrigerant at discharge temperature of less than about 135° C.; and (c) condensing the refrigerant from said compressor at a temperature of from about 25° C. to about 45° C. to produce a refrigerant vapor, wherein said method produces a capacity of from 97% to 93% in said system compared to the capacity of R-404A and an efficiency (COP) in said system greater than the efficiency of R-404A in said system.

The present invention also includes low temperature refrigeration methods for transferring heat, said method comprising:

(a) evaporating Refrigerants 18 at a temperature of from about −40° C. to about −12° C. to produce a refrigerant vapor;

(b) compressing said refrigerant vapor to produce a refrigerant at discharge temperature of less than about 135° C.; and (c) condensing the refrigerant from said compressor at a temperature of from about 25° C. to about 45° C. to produce a refrigerant vapor, wherein said method produces a capacity of from 97% to 93% in said system compared to the capacity of R-404A and an efficiency (COP) in said system greater than the efficiency of R-404A in said system.

The present invention also includes low temperature refrigeration methods for transferring heat, said method comprising:

(a) evaporating Refrigerants 19 at a temperature of from about −40° C. to about −12° C. to produce a refrigerant vapor;

(b) compressing said refrigerant vapor to produce a refrigerant at discharge temperature of less than about 135° C.; and (c) condensing the refrigerant from said compressor at a temperature of from about 25° C. to about 45° C. to produce a refrigerant vapor, wherein said method produces a capacity of from 97% to 93% in said system compared to the capacity of R-404A and an efficiency (COP) in said system greater than the efficiency of R-404A in said system.

The present invention also includes low temperature refrigeration methods for transferring heat, said method comprising:

(a) evaporating Refrigerant 20 at a temperature of from about −40° C. to about −12° C. to produce a refrigerant vapor;

(b) compressing said refrigerant vapor to produce a refrigerant at discharge temperature of less than about 135° C.; and (c) condensing the refrigerant from said compressor at a temperature of from about 25° C. to about 45° C. to produce a refrigerant vapor, wherein said method produces a capacity of from 97% to 93% in said system compared to the capacity of R-404A and an efficiency (COP) in said system greater than the efficiency of R-404A in said system.

The present invention also includes low temperature refrigeration methods for transferring heat, said method comprising:

(a) evaporating a refrigerant according to the present invention, including each of Refrigerants 1-20, at a temperature in the range of from about −35° C. to about −25° C. to produce a refrigerant vapor;

(b) compressing said refrigerant vapor to produce a refrigerant at discharge temperature of less than about 135° C.; and (c) condensing the refrigerant from said compressor at a temperature of from about 25° C. to about 45° C. to produce a refrigerant vapor, wherein said method produces a capacity of from 97% to 93% in said system compared to the capacity of R-404A and an efficiency (COP) in said system greater than the efficiency of R-404A in said system.

The present invention also includes low temperature refrigeration methods for transferring heat, said method comprising:

(a) evaporating Refrigerants 18 at a temperature in the range of from about −35° C. to about −25° C. to produce a refrigerant vapor;

(b) compressing said refrigerant vapor to produce a refrigerant at discharge temperature of less than about 135° C.; and (c) condensing the refrigerant from said compressor at a temperature of from about 25° C. to about 45° C. to produce a refrigerant vapor, wherein said method produces a capacity of from 97% to 93% in said system compared to the capacity of R-404A and an efficiency (COP) in said system greater than the efficiency of R-404A in said system.

The present invention also includes low temperature refrigeration methods for transferring heat, said method comprising:

(a) evaporating Refrigerants 19 at a temperature in the range of from about −35° C. to about −25° C. to produce a refrigerant vapor;

(b) compressing said refrigerant vapor to produce a refrigerant at discharge temperature of less than about 135° C.; and (c) condensing the refrigerant from said compressor at a temperature of from about 25° C. to about 45° C. to produce a refrigerant vapor, wherein said method produces a capacity of from 97% to 93% in said system compared to the capacity of R-404A and an efficiency (COP) in said system greater than the efficiency of R-404A in said system.

The present invention also includes low temperature refrigeration methods for transferring heat, said method comprising:
(a) evaporating Refrigerant 20, at a temperature in the range of from about −35° C. to about −25° C. to produce a refrigerant vapor;
(b) compressing said refrigerant vapor to produce a refrigerant at discharge temperature of less than about 135° C.; and
(c) condensing the refrigerant from said compressor at a temperature of from about 25° C. to about 45° C. to produce a refrigerant vapor, wherein said method produces a capacity of from 97% to 93% in said system compared to the capacity of R-404A and an efficiency (COP) in said system greater than the efficiency of R-404A in said system.

The present invention also includes low temperature refrigeration methods for transferring heat, said method comprising:
(a) evaporating a refrigerant according to the present invention, including each of Refrigerants 1-20, at a temperature in the range of from about −25° C. to about −12° C. to produce a refrigerant vapor;
(b) compressing said refrigerant vapor to produce a refrigerant at discharge temperature of less than about 135° C.; and
(c) condensing the refrigerant from said compressor at a temperature of from about 25° C. to about 45° C. to produce a refrigerant liquid, wherein said method produces a capacity of from 97% to 93% in said system compared to the capacity of R-404A and an efficiency (COP) in said system greater than the efficiency of R-404A in said system.

The present invention also includes low temperature refrigeration methods for transferring heat, said method comprising:
(a) evaporating Refrigerants 18 at a temperature in the range of from about −25° C. to about −12° C. to produce a refrigerant vapor;
(b) compressing said refrigerant vapor to produce a refrigerant at discharge temperature of less than about 135° C.; and
(c) condensing the refrigerant from said compressor at a temperature of from about 25° C. to about 45° C. to produce a refrigerant liquid, wherein said method produces a capacity of from 97% to 93% in said system compared to the capacity of R-404A and an efficiency (COP) in said system greater than the efficiency of R-404A in said system.

The present invention also includes low temperature refrigeration methods for transferring heat, said method comprising:
(a) evaporating Refrigerant 19 at a temperature in the range of from about −25° C. to about −12° C. to produce a refrigerant vapor;
(b) compressing said refrigerant vapor to produce a refrigerant at discharge temperature of less than about 135° C.; and
(c) condensing the refrigerant from said compressor at a temperature of from about 25° C. to about 45° C. to produce a refrigerant liquid, wherein said method produces a capacity of from 97% to 93% in said system compared to the capacity of R-404A and an efficiency (COP) in said system greater than the efficiency of R-404A in said system.

The present invention also includes low temperature refrigeration methods for transferring heat, said method comprising:
(a) evaporating Refrigerant 20 at a temperature in the range of from about −25° C. to about −12° C. to produce a refrigerant vapor;
(b) compressing said refrigerant vapor to produce a refrigerant at discharge temperature of less than about 135° C.; and
(c) condensing the refrigerant from said compressor at a temperature of from about 25° C. to about 45° C. to produce a refrigerant liquid, wherein said method produces a capacity of from 97% to 93% in said system compared to the capacity of R-404A and an efficiency (COP) in said system greater than the efficiency of R-404A in said system.

The present invention also includes low temperature refrigeration methods for transferring heat, said method comprising:
(a) evaporating a refrigerant according to the present invention, including each of Refrigerants 1-20 at a temperature in the range of from about −25° C. to about −12° C. to produce a refrigerant vapor;
(b) compressing said refrigerant vapor to produce a refrigerant at discharge temperature of less than about 135° C.; and
(c) condensing the refrigerant from said compressor at a temperature in the range of from about 20° C. to about 60° C. to produce a refrigerant liquid, wherein said method produces a capacity of from 97% to 93% in said system compared to the capacity of R-404A and an efficiency (COP) in said system greater than the efficiency of R-404A in said system.

The present invention also includes low temperature refrigeration methods for transferring heat, said method comprising:
(a) evaporating Refrigerant 18 at a temperature in the range of from about −25° C. to about −12° C. to produce a refrigerant vapor;
(b) compressing said refrigerant vapor to produce a refrigerant at discharge temperature of less than about 135° C.; and
(c) condensing the refrigerant from said compressor at a temperature in the range of from about 20° C. to about 60° C. to produce a refrigerant liquid, wherein said method produces a capacity of from 97% to 93% in said system compared to the capacity of R-404A and an efficiency (COP) in said system greater than the efficiency of R-404A in said system.

The present invention also includes low temperature refrigeration methods for transferring heat, said method comprising:
(a) evaporating Refrigerant 19 at a temperature in the range of from about −25° C. to about −12° C. to produce a refrigerant vapor;
(b) compressing said refrigerant vapor to produce a refrigerant at discharge temperature of less than about 135° C.; and
(c) condensing the refrigerant from said compressor at a temperature in the range of from about 20° C. to about 60° C. to produce a refrigerant liquid, wherein said method produces a capacity of from 97% to 93% in said system compared to the capacity of R-404A and an efficiency (COP) in said system greater than the efficiency of R-404A in said system.

The present invention also includes low temperature refrigeration methods for transferring heat, said method comprising:

(a) evaporating Refrigerant 20 at a temperature in the range of from about −25° C. to about −12° C. to produce a refrigerant vapor;

(b) compressing said refrigerant vapor to produce a refrigerant at discharge temperature of less than about 135° C.; and (c) condensing the refrigerant from said compressor at a temperature in the range of from about 20° C. to about 60° C. to produce a refrigerant liquid, wherein said method produces a capacity of from 97% to 93% in said system compared to the capacity of R-404A and an efficiency (COP) in said system greater than the efficiency of R-404A in said system.

The present invention provides low temperature refrigeration methods, including each of the low temperature methods as described in this section, where the refrigerant vapor has a degree of superheat at the evaporator outlet of from about 0° C. to about 10° C. and a degree of superheat in the suction line of from about 15° C. to about 50° C.

Medium Temperature Methods

The present invention also includes medium temperature refrigeration methods for transferring heat, said method comprising:

(a) evaporating a refrigerant according to the present invention (including any refrigerant selected from each of Refrigerants 1-20), at a temperature of from −12° C. to about 0° C. to produce a refrigerant vapor;

(b) compressing said refrigerant vapor to produce a refrigerant at discharge temperature of less than about 135° C.; and (c) condensing the refrigerant from said compressor at a temperature of from about 20° C. to about 60° C. to produce a refrigerant vapor.

The present invention also includes medium temperature refrigeration methods for transferring heat, said method comprising:

(a) evaporating a refrigerant according to the present invention (including any refrigerant selected from each of Refrigerants 1-20), at a temperature of from about −10° C. to about −6.7° C. to produce a refrigerant vapor;

(b) compressing said refrigerant vapor to produce a refrigerant at discharge temperature of less than about 135° C.; and (c) condensing the refrigerant from said compressor at a temperature of from about 25° C. to about 45° C. to produce a refrigerant vapor.

The present invention also includes medium temperature refrigeration methods for transferring heat, said method comprising:

(a) evaporating a refrigerant according to the present invention, including each of Refrigerants 1-20, at a temperature in the range of to from about −12° C. to about 0° C. to produce a refrigerant vapor;

(b) compressing said refrigerant vapor to produce a refrigerant at discharge temperature of less than about 135° C.; and (c) condensing the refrigerant from said compressor at a temperature of from about 25° C. to about 45° C. to produce a refrigerant vapor.

The present invention also includes medium temperature refrigeration methods for transferring heat, said method comprising:

(a) evaporating a refrigerant according to the present invention (including any refrigerant selected from each of Refrigerants 1-20), at a temperature of from about −12° C. to about 0° C. to produce a refrigerant vapor;

(b) compressing said refrigerant vapor in a compressor lubricated with a POE lubricant to produce a refrigerant at a discharge temperature of less than about 135° C.;

(c) condensing the refrigerant from said compressor at a temperature of from about 20° C. to about 60° C. to produce a refrigerant vapor; and (d) exposing at least a portion of said refrigerant and/or at least a portion of said lubricant to a sequestration material of the present invention, including any of Sequestration Materials 1-6.

The present invention also includes medium temperature refrigeration methods for transferring heat, said method comprising:

(a) evaporating a refrigerant according to the present invention (including any refrigerant selected from each of Refrigerants 1-20), at a temperature of from about −12° C. to about 0° C. to produce a refrigerant vapor;

(b) compressing said refrigerant vapor in a compressor lubricated with a POE lubricant to produce a refrigerant at discharge temperature of less than about 135° C.;

(c) condensing the refrigerant from said compressor at a temperature of from about 25° C. to about 45° C. to produce a refrigerant vapor; and (d) exposing at least a portion of said refrigerant and/or at least a portion of said lubricant to a sequestration material of the present invention, including any of Sequestration Materials 1-6.

The present invention also includes medium temperature refrigeration methods for transferring heat, said method comprising:

(a) evaporating a refrigerant according to the present invention, including each of Refrigerants 1-20, at a temperature in the range of to from about −10° C. to about −6.7° C. to produce a refrigerant vapor;

(b) compressing said refrigerant vapor to in a compressor lubricated with a POE lubricant produce a refrigerant at discharge temperature of less than about 13500;

(c) condensing the refrigerant from said compressor at a temperature of from about 25° C. to about 45° C. to produce a refrigerant vapor; and (d) exposing at least a portion of said refrigerant and/or at least a portion of said lubricant to a sequestration material of the present invention, including any of Sequestration Materials 1-6.

The present invention provides low temperature refrigeration methods, including each of the low temperature methods as described in this section, where the refrigerant vapor has a degree of superheat at evaporator outlet of from about 0° C. to about 10° C. and a degree of superheat in the suction line of from about 15° C. to about 50° C.

The present invention provides low temperature refrigeration methods, including each of the low temperature methods as described in this section, where the refrigerant vapor has and a degree of superheat at evaporator outlet of from about 4° C. to about 6° C. and a degree of superheat in the suction line of from about 25° C. to about 30° C.

Uses

The present invention includes the use of a heat transfer composition comprising Refrigerant 1, in a low temperature refrigeration system.

The present invention therefore includes the use of a heat transfer composition comprising Refrigerant 2, in a low temperature refrigeration system.

The present invention therefore includes the use of a heat transfer composition comprising Refrigerant 3, in a low temperature refrigeration system.

The present invention therefore includes the use of a heat transfer composition comprising Refrigerant 4, in a low temperature refrigeration system.

The present invention therefore includes the use of a heat transfer composition comprising Refrigerant 5, in a low temperature refrigeration system.

The present invention therefore includes the use of a heat transfer composition comprising Refrigerant 6, in a low temperature refrigeration system.

The present invention therefore includes the use of a heat transfer composition comprising Refrigerant 7, in a low temperature refrigeration system.

The present invention therefore includes the use of a heat transfer composition comprising Refrigerant 8, in a low temperature refrigeration system.

The present invention therefore includes the use of a heat transfer composition comprising Refrigerant 9, in a low temperature refrigeration system.

The present invention therefore includes the use of a heat transfer composition comprising Refrigerant 10, in a low temperature refrigeration system.

The present invention therefore includes the use of a heat transfer composition comprising Refrigerant 11, in a low temperature refrigeration system.

The present invention therefore includes the use of a heat transfer composition comprising Refrigerant 12, in a low temperature refrigeration system.

The present invention therefore includes the use of a heat transfer composition comprising Refrigerant 13, in a low temperature refrigeration system.

The present invention therefore includes the use of a heat transfer composition comprising Refrigerant 14, in a low temperature refrigeration system.

The present invention therefore includes the use of a heat transfer composition comprising Refrigerant 15, in a low temperature refrigeration system.

The present invention therefore includes the use of a heat transfer composition comprising Refrigerant 16, in a low temperature refrigeration system.

The present invention therefore includes the use of a heat transfer composition comprising Refrigerant 17, in a low temperature refrigeration system.

The present invention therefore includes the use of a heat transfer composition comprising Refrigerant 18, in a low temperature refrigeration system.

The present invention therefore includes the use of a heat transfer composition comprising Refrigerant 19, in a low temperature refrigeration system.

The present invention therefore includes the use of a heat transfer composition comprising Refrigerant 20, in a low temperature refrigeration system.

The present invention includes the use of a heat transfer composition comprising Refrigerant 1, in a medium temperature refrigeration system.

The present invention therefore includes the use of a heat transfer composition comprising Refrigerant 2, in a medium temperature refrigeration system.

The present invention therefore includes the use of a heat transfer composition comprising Refrigerant 3, in a medium temperature refrigeration system.

The present invention therefore includes the use of a heat transfer composition comprising Refrigerant 4, in a medium temperature refrigeration system.

The present invention therefore includes the use of a heat transfer composition comprising Refrigerant 5, in a medium temperature refrigeration system.

The present invention therefore includes the use of a heat transfer composition comprising Refrigerant 6, in a medium temperature refrigeration system.

The present invention therefore includes the use of a heat transfer composition comprising Refrigerant 7, in a medium temperature refrigeration system.

The present invention therefore includes the use of a heat transfer composition comprising Refrigerant 8, in a medium temperature refrigeration system.

The present invention therefore includes the use of a heat transfer composition comprising Refrigerant 9, in a medium temperature refrigeration system.

The present invention therefore includes the use of a heat transfer composition comprising Refrigerant 10, in a medium temperature refrigeration system.

The present invention therefore includes the use of a heat transfer composition comprising Refrigerant 11, in a medium temperature refrigeration system.

The present invention therefore includes the use of a heat transfer composition comprising Refrigerant 12, in a medium temperature refrigeration system.

The present invention therefore includes the use of a heat transfer composition comprising Refrigerant 13, in a medium temperature refrigeration system.

The present invention therefore includes the use of a heat transfer composition comprising Refrigerant 14, in a medium temperature refrigeration system.

The present invention therefore includes the use of a heat transfer composition comprising Refrigerant 15, in a medium temperature refrigeration system.

The present invention therefore includes the use of a heat transfer composition comprising Refrigerant 16, in a medium temperature refrigeration system.

The present invention therefore includes the use of a heat transfer composition comprising Refrigerant 17, in a medium temperature refrigeration system.

The present invention therefore includes the use of a heat transfer composition comprising Refrigerant 18, in a medium temperature refrigeration system.

The present invention therefore includes the use of a heat transfer composition comprising Refrigerant 19, in a medium temperature refrigeration system.

The present invention therefore includes the use of a heat transfer composition comprising Refrigerant 20, in a medium temperature refrigeration system.

The present invention includes the use of a heat transfer composition comprising Refrigerant 1, in a low temperature transport refrigeration system.

The present invention includes the use of a heat transfer composition comprising Refrigerant 2, in a low temperature transport refrigeration system.

The present invention therefore includes the use of a heat transfer composition comprising Refrigerant 3, in a low temperature transport refrigeration system.

The present invention therefore includes the use of a heat transfer composition comprising Refrigerant 4, in a low temperature transport refrigeration system.

The present invention therefore includes the use of a heat transfer composition comprising Refrigerant 5, in a low temperature transport refrigeration system.

The present invention therefore includes the use of a heat transfer composition comprising Refrigerant 6, in a low temperature transport refrigeration system.

The present invention therefore includes the use of a heat transfer composition comprising Refrigerant 7, in a low temperature transport refrigeration system.

The present invention therefore includes the use of a heat transfer composition comprising Refrigerant 8, in a low temperature transport refrigeration system.

The present invention therefore includes the use of a heat transfer composition comprising Refrigerant 9, in a low temperature transport refrigeration system.

The present invention therefore includes the use of a heat transfer composition comprising Refrigerant 10, in a low temperature transport refrigeration system.

The present invention therefore includes the use of a heat transfer composition comprising Refrigerant 11, in a low temperature transport refrigeration system.

The present invention therefore includes the use of a heat transfer composition comprising Refrigerant 12, in a low temperature transport refrigeration system.

The present invention therefore includes the use of a heat transfer composition comprising Refrigerant 13, in a low temperature transport refrigeration system.

The present invention therefore includes the use of a heat transfer composition comprising Refrigerant 14, in a low temperature transport refrigeration system.

The present invention therefore includes the use of a heat transfer composition comprising Refrigerant 15, in a low temperature transport refrigeration system.

The present invention therefore includes the use of a heat transfer composition comprising Refrigerant 16, in a low temperature transport refrigeration system.

The present invention therefore includes the use of a heat transfer composition comprising Refrigerant 17, in a low temperature transport refrigeration system.

The present invention therefore includes the use of a heat transfer composition comprising Refrigerant 18, in a low temperature transport refrigeration system.

The present invention therefore includes the use of a heat transfer composition comprising Refrigerant 19, in a low temperature transport refrigeration system.

The present invention therefore includes the use of a heat transfer composition comprising Refrigerant 20, in a low temperature transport refrigeration system.

The present invention includes the use of a heat transfer composition comprising Refrigerant 1, in a medium temperature transport refrigeration system.

The present invention therefore includes the use of a heat transfer composition comprising Refrigerant 2, in a medium temperature transport refrigeration system.

The present invention therefore includes the use of a heat transfer composition comprising Refrigerant 3, in a medium temperature transport refrigeration system.

The present invention therefore includes the use of a heat transfer composition comprising Refrigerant 4, in a medium temperature transport refrigeration system.

The present invention therefore includes the use of a heat transfer composition comprising Refrigerant 5, in a medium temperature transport refrigeration system.

The present invention therefore includes the use of a heat transfer composition comprising Refrigerant 6, in a medium temperature transport refrigeration system.

The present invention therefore includes the use of a heat transfer composition comprising Refrigerant 7, in a medium temperature transport refrigeration system.

The present invention therefore includes the use of a heat transfer composition comprising Refrigerant 8, in a medium temperature transport refrigeration system.

The present invention therefore includes the use of a heat transfer composition comprising Refrigerant 9, in a medium temperature transport refrigeration system.

The present invention therefore includes the use of a heat transfer composition comprising Refrigerant 10, in a medium temperature transport refrigeration system.

The present invention therefore includes the use of a heat transfer composition comprising Refrigerant 11, in a medium temperature transport refrigeration system.

The present invention therefore includes the use of a heat transfer composition comprising Refrigerant 12, in a medium temperature transport refrigeration system.

The present invention therefore includes the use of a heat transfer composition comprising Refrigerant 13, in a medium temperature transport refrigeration system.

The present invention therefore includes the use of a heat transfer composition comprising Refrigerant 14, in a medium temperature transport refrigeration system.

The present invention therefore includes the use of a heat transfer composition comprising Refrigerant 15, in a medium temperature transport refrigeration system.

The present invention therefore includes the use of a heat transfer composition comprising Refrigerant 16, in a medium temperature transport refrigeration system.

The present invention therefore includes the use of a heat transfer composition comprising Refrigerant 17, in a medium temperature transport refrigeration system.

The present invention therefore includes the use of a heat transfer composition comprising Refrigerant 18, in a medium temperature transport refrigeration system.

The present invention therefore includes the use of a heat transfer composition comprising Refrigerant 19, in a medium temperature transport refrigeration system.

The present invention therefore includes the use of a heat transfer composition comprising Refrigerant 20, in a medium temperature transport refrigeration system.

The heat transfer compositions and the refrigerants of the present invention (including each of Refrigerants 1-20 and all heat transfer compositions containing Refrigerants 1-20) therefore can be used as a retrofit refrigerant/heat transfer composition or as a replacement refrigerant/heat transfer composition.

The present invention thus includes methods of retrofitting existing heat transfer system designed for and containing R-404A refrigerant, without requiring substantial engineering modification of the existing system, particularly without modification of the condenser, the evaporator and/or the expansion valve.

The present invention thus also includes methods of using a refrigerant or heat transfer composition of the present invention (including each of Refrigerants 1-20 and all heat transfer compositions containing Refrigerants 1-20) as a replacement for R-404A, and in particular as a replacement for R-404A in a low temperature refrigeration system, without requiring substantial engineering modification of the existing system, particularly without modification of the condenser, the evaporator and/or the expansion valve.

The present invention thus also includes methods of using a refrigerant or heat transfer composition of the present invention (including each of Refrigerants 1-20 and all heat transfer compositions containing Refrigerants 1-20) as a replacement for R-404A, and in particular as a replacement for R-404A in a medium temperature refrigeration system, without requiring substantial engineering modification of the existing system, particularly without modification of the condenser, the evaporator and/or the expansion valve.

Equipment for the Systems, Methods and Uses

Examples of commonly used compressors, for the purposes of this invention include reciprocating, rotary (including rolling piston and rotary vane), scroll, screw, and centrifugal compressors. Thus, the present invention provides each and any of the refrigerants, including each of Refrigerants 1-20, and/or heat transfer compositions as described herein, including those containing any one of Refrigerants 1-20, for use in a heat transfer system comprising a reciprocating, rotary (including rolling piston and rotary vane), scroll, screw, or centrifugal compressor.

Examples of commonly used expansion devices, for the purposes of this invention include a capillary tube, a fixed orifice, a thermal expansion valve and an electronic expansion valve. Thus, the present invention provides each and any of the refrigerants, including each of Refrigerants 1-20, and/or heat transfer compositions, including those containing any one of Refrigerants 1-20, as described herein for use in a heat transfer system comprising a capillary tube, a fixed orifice, a thermal expansion valve or an electronic expansion valve.

For the purposes of this invention, the evaporator and the condenser can each independently be selected from a finned tube heat exchanger, a microchannel heat exchanger, a shell and tube, a plate heat exchanger, and a tube-in-tube heat exchanger. Thus, the present invention provides each and any of the refrigerants and/or heat transfer compositions as described herein for use in a heat transfer system wherein the evaporator and condenser together form a finned tube heat exchanger, a microchannel heat exchanger, a shell and tube, a plate heat exchanger, or a tube-in-tube heat exchanger.

The heat transfer composition of the invention can be used in heating and cooling applications. In a particular feature of the invention, the heat transfer composition can be used in a method of cooling comprising condensing a heat transfer composition and subsequently evaporating said composition in the vicinity of an article or body to be cooled.

The heat transfer composition of the invention is provided for use in a low temperature refrigeration systems, including use in each of the following:
low temperature commercial refrigerator,
a low temperature commercial freezer,
an ice making machine,
a vending machine,
a low temperature transport refrigeration system,
an industrial freezer,
an industrial refrigerator and
a low temperature chiller.

The heat transfer composition of the invention is provided for use in a medium temperature refrigeration system, wherein the medium temperature refrigeration system is preferably used to chill food or beverages such as in a refrigerator or a bottle cooler. The system usually has an air-to-refrigerant evaporator to chill the food or beverage, a reciprocating, scroll or screw or rotary compressor, an air-to-refrigerant condenser to exchange heat with the ambient air, and a thermal or electronic expansion valve.

The heat transfer composition of the invention is provided for use in a low temperature refrigeration system, wherein said low temperature refrigeration system is preferably used in a freezer or an ice making machine. The system usually has an air-to-refrigerant evaporator to chill the food or beverage, a reciprocating, scroll or rotary compressor, an air-to-refrigerant condenser to exchange heat with the ambient air, and a thermal or electronic expansion valve.

Each of the heat transfer compositions described herein, including heat transfer compositions containing any one of Refrigerants 1-20, is particularly provided for use in a low temperature system with a reciprocating, rotary (rolling-piston or rotary vane) or scroll compressor.

Each of the heat transfer compositions described herein, including heat transfer compositions containing any one of Refrigerants 1-20, is particularly provided for use in a medium temperature system with a reciprocating, rotary (rolling-piston or rotary vane) or scroll compressor.

The present invention further provides the use of a heat transfer composition comprising Refrigerant 1 in commercial refrigeration, particularly in a commercial refrigerator, commercial freezer, an ice machine, or a vending machine.

The present invention further provides the use of a heat transfer composition comprising Refrigerant 2 in commercial refrigeration, particularly in a commercial refrigerator, commercial freezer, an ice machine, or a vending machine.

The present invention further provides the use of a heat transfer composition comprising Refrigerant 3 in commercial refrigeration, particularly in a commercial refrigerator, commercial freezer, an ice machine, or a vending machine.

The present invention further provides the use of a heat transfer composition comprising Refrigerant 4 in commercial refrigeration, particularly in a commercial refrigerator, commercial freezer, an ice machine, or a vending machine.

The present invention further provides the use of a heat transfer composition comprising Refrigerant 5 in commercial refrigeration, particularly in a commercial refrigerator, commercial freezer, an ice machine, or a vending machine.

The present invention further provides the use of a heat transfer composition comprising Refrigerant 6 in commercial refrigeration, particularly in a commercial refrigerator, commercial freezer, an ice machine, or a vending machine.

The present invention further provides the use of a heat transfer composition comprising Refrigerant 7 in commercial refrigeration, particularly in a commercial refrigerator, commercial freezer, an ice machine, or a vending machine.

The present invention further provides the use of a heat transfer composition comprising Refrigerant 8 in commercial refrigeration, particularly in a commercial refrigerator, commercial freezer, an ice machine, or a vending machine.

The present invention further provides the use of a heat transfer composition comprising Refrigerant 9 in commercial refrigeration, particularly in a commercial refrigerator, commercial freezer, an ice machine, or a vending machine.

The present invention further provides the use of a heat transfer composition comprising Refrigerant 10 in commercial refrigeration, particularly in a commercial refrigerator, commercial freezer, an ice machine, or a vending machine.

The present invention further provides the use of a heat transfer composition comprising Refrigerant 11 in commercial refrigeration, particularly in a commercial refrigerator, commercial freezer, an ice machine, or a vending machine.

The present invention further provides the use of a heat transfer composition comprising Refrigerant 12 in commercial refrigeration, particularly in a commercial refrigerator, commercial freezer, an ice machine, or a vending machine.

The present invention further provides the use of a heat transfer composition comprising Refrigerant 13 in commercial refrigeration, particularly in a commercial refrigerator, commercial freezer, an ice machine, or a vending machine.

The present invention further provides the use of a heat transfer composition comprising Refrigerant 14 in commercial refrigeration, particularly in a commercial refrigerator, commercial freezer, an ice machine, or a vending machine.

The present invention further provides the use of a heat transfer composition comprising Refrigerant 15 in commercial refrigeration, particularly in a commercial refrigerator, commercial freezer, an ice machine, or a vending machine.

The present invention further provides the use of a heat transfer composition comprising Refrigerant 16 in commercial refrigeration, particularly in a commercial refrigerator, commercial freezer, an ice machine, or a vending machine.

The present invention further provides the use of a heat transfer composition comprising Refrigerant 17 in commercial refrigeration, particularly in a commercial refrigerator, commercial freezer, an ice machine, or a vending machine.

The present invention further provides the use of a heat transfer composition comprising Refrigerant 18 in commercial refrigeration, particularly in a commercial refrigerator, commercial freezer, an ice machine, or a vending machine.

The present invention further provides the use of a heat transfer composition comprising Refrigerant 19 in commercial refrigeration, particularly in a commercial refrigerator, commercial freezer, an ice machine, or a vending machine.

The present invention further provides the use of a heat transfer composition comprising Refrigerant 20 in commercial refrigeration, particularly in a commercial refrigerator, commercial freezer, an ice machine, or a vending machine.

The present invention thus provides a medium temperature refrigeration system used to chill food or beverages, such as in a refrigerator or a bottle cooler, wherein the refrigerant has an evaporating temperature preferably in the range of about −12 to about 0° C., and in such systems the refrigerant has a condensing temperature preferably in the range of about 40 to about 70° C., or about 20 to about 70° C.

The medium temperature systems of the present invention, including the systems as described in the immediately preceding paragraphs, preferably have an air-to-refrigerant evaporator to provide chilling, for example to the food or beverage contained therein, a reciprocating, scroll or screw or rotary compressor, an air-to-refrigerant condenser to exchange heat with the ambient air, and a thermal or electronic expansion valve.

The heat transfer composition of the invention, including heat transfer compositions containing any one of Refrigerants 1-20, is provided for use in a low temperature refrigeration system, wherein the refrigerant has an evaporating temperature that is preferably in the range of about −40 to about −12° C. and the refrigerant has a condensing temperature that is preferably in the range of about 40 to about 70° C., or about 20 to about 70° C.

The present invention thus provides a low temperature refrigeration system used to provide cooling in a freezer wherein the refrigerant, including any one of Refrigerants 1-20, has an evaporating temperature that is preferably in the range of about −40 to about −12° C. and the refrigerant has a condensing temperature that is preferably in the range of about 40 to about 70° C., or about 20 to about 70° C.

The present invention thus also provides a low temperature refrigeration system used to provide cooling in an cream machine wherein the refrigerant, including any one of Refrigerants 1-20, has an evaporating temperature that is preferably in the range of about −40 to about −12° C. and the refrigerant has a condensing temperature that is preferably in the range of about 40 to about 70° C., or about 20 to about 70° C.

The low temperature systems of the present invention, including the systems as described in the immediately preceding paragraphs, preferably have an air-to-refrigerant evaporator to chill the food or beverage, a reciprocating, scroll or rotary compressor, an air-to-refrigerant condenser to exchange heat with the ambient air, and a thermal or electronic expansion valve.

The heat transfer composition disclosed herein is provided as a low GWP replacement for the refrigerant R-404A. The heat transfer compositions and the refrigerants of the present invention (including each of Refrigerants 1-20 and all heat transfer compositions containing Refrigerants 1-20) therefore can be used as a replacement refrigerant/heat transfer composition.

The present invention thus includes methods of replacing the refrigerant in a heat transfer system designed for or suitable for use with R-404A refrigerant.

The present invention also includes methods of retrofitting an existing heat transfer system containing R-404A, including particularly low and medium temperature refrigeration systems, by removing at least a portion of the R-404A from the system and then adding to the system a the refrigerant of the present invention, including each of Refrigerants 1-20.

It will be appreciated that when the heat transfer composition is used as a low GWP replacement for R-404A, stem, or is used in a heat transfer system, which is suitable for use with designed to contain or containing R-404A refrigerant, or is used in a heat transfer system which is suitable for use with R-404A refrigerant, the heat transfer composition may consist essentially of the refrigerant of the invention. Alternatively, the invention encompasses the use of the refrigerant of the invention as a low GWP replacement for R-404A, in a heat transfer system suitable for use with R-404A refrigerant as described herein.

The compositions of the present invention exhibit many of the desirable characteristics of R-404A but have a GWP that is substantially lower than that of R-404A while at the same time having operating characteristics i.e. capacity and efficiency (COP) that are substantially similar to or substantially match R-404A. This allows the claimed compositions to replace R-404A in existing heat transfer systems without requiring any significant system modification for example of the condenser, the evaporator and/or the expansion valve. The composition can therefore be used as a direct replacement in retrofitting heat exchange systems which have been used with or are suitable for use with R-404A.

The refrigerants of the invention, including each of Refrigerants 1-20, therefore preferably exhibit operating characteristics compared with R-404A wherein the efficiency (COP) of the composition is from 95 to 105% of the efficiency of R-404A in heat transfer systems, in which the compositions of the invention are to replace the R-404A refrigerant.

The refrigerants of the invention, including each of Refrigerants 1-20, therefore preferably exhibits operating characteristics compared with R-404A wherein the capacity of the composition is from 97 to 103% of the capacity of R-404A in heat transfer systems, in which the compositions of the invention are to replace the R-404A refrigerant.

The refrigerants of the invention, including each of Refrigerants 1-20, therefore preferably exhibits operating characteristics compared with R-404A wherein the capacity of the composition is from 97 to 103% of the capacity of R-404A in heat transfer systems and wherein the efficiency (COP) is equal to or greater than the efficiency of R-404A in the heat transfer system, in which the compositions of the invention are to replace the R-404A refrigerant.

Preferably, the refrigerants of the invention, including each of Refrigerants 1-20, preferably exhibit operating characteristics compared with R-404A wherein the efficiency (COP) of the composition is from 100 to 105% of the efficiency of R-404A in heat transfer systems, in which the compositions of the invention are to replace the R-404A refrigerant.

In order to maintain reliability of the heat transfer system, it is preferred that the composition of the invention further exhibits the following characteristics compared with R-404A:

the discharge temperature is not greater than 10° C. higher than that of R-404A; and the compressor pressure ratio is from 95 to 105% of the compressor pressure ratio of R-404A in heat transfer systems, in which the composition of the invention is used to replace the R-404A refrigerant.

There is therefore provided a method of retrofitting an existing heat transfer system designed to contain or containing R-404A refrigerant or which is suitable for use with R-404 refrigerant, said method comprising replacing at least a portion of the existing R-404A refrigerant with a heat transfer composition comprising Refrigerant 1.

There is therefore provided a method of retrofitting an existing heat transfer system designed to contain or containing R-404A refrigerant or which is suitable for use with R-404 refrigerant, said method comprising replacing at least a portion of the existing R-404A refrigerant with a heat transfer composition comprising Refrigerant 2.

There is therefore provided a method of retrofitting an existing heat transfer system designed to contain or containing R-404A refrigerant or which is suitable for use with R-404 refrigerant, said method comprising replacing at least a portion of the existing R-404A refrigerant with a heat transfer composition comprising Refrigerant 3.

There is therefore provided a method of retrofitting an existing heat transfer system designed to contain or containing R-404A refrigerant or which is suitable for use with R-404 refrigerant, said method comprising replacing at least a portion of the existing R-404A refrigerant with a heat transfer composition comprising Refrigerant 4.

There is therefore provided a method of retrofitting an existing heat transfer system designed to contain or containing R-404A refrigerant or which is suitable for use with R-404 refrigerant, said method comprising replacing at least a portion of the existing R-404A refrigerant with a heat transfer composition comprising Refrigerant 5.

There is therefore provided a method of retrofitting an existing heat transfer system designed to contain or containing R-404A refrigerant or which is suitable for use with R-404 refrigerant, said method comprising replacing at least a portion of the existing R-404A refrigerant with a heat transfer composition comprising Refrigerant 6.

There is therefore provided a method of retrofitting an existing heat transfer system designed to contain or containing R-404A refrigerant or which is suitable for use with R-404 refrigerant, said method comprising replacing at least a portion of the existing R-404A refrigerant with a heat transfer composition comprising Refrigerant 7.

There is therefore provided a method of retrofitting an existing heat transfer system designed to contain or containing R-404A refrigerant or which is suitable for use with R-404 refrigerant, said method comprising replacing at least a portion of the existing R-404A refrigerant with a heat transfer composition comprising Refrigerant 8.

There is therefore provided a method of retrofitting an existing heat transfer system designed to contain or containing R-404A refrigerant or which is suitable for use with R-404 refrigerant, said method comprising replacing at least a portion of the existing R-404A refrigerant with a heat transfer composition comprising Refrigerant 9.

There is therefore provided a method of retrofitting an existing heat transfer system designed to contain or containing R-404A refrigerant or which is suitable for use with R-404 refrigerant, said method comprising replacing at least a portion of the existing R-404A refrigerant with a heat transfer composition comprising Refrigerant 10.

There is therefore provided a method of retrofitting an existing heat transfer system designed to contain or containing R-404A refrigerant or which is suitable for use with R-404 refrigerant, said method comprising replacing at least a portion of the existing R-404A refrigerant with a heat transfer composition comprising Refrigerant 11.

There is therefore provided a method of retrofitting an existing heat transfer system designed to contain or containing R-404A refrigerant or which is suitable for use with R-404 refrigerant, said method comprising replacing at least a portion of the existing R-404A refrigerant with a heat transfer composition comprising Refrigerant 12.

There is therefore provided a method of retrofitting an existing heat transfer system designed to contain or containing R-404A refrigerant or which is suitable for use with R-404 refrigerant, said method comprising replacing at least a portion of the existing R-404A refrigerant with a heat transfer composition comprising Refrigerant 13.

There is therefore provided a method of retrofitting an existing heat transfer system designed to contain or containing R-404A refrigerant or which is suitable for use with R-404 refrigerant, said method comprising replacing at least a portion of the existing R-404A refrigerant with a heat transfer composition comprising Refrigerant 14.

There is therefore provided a method of retrofitting an existing heat transfer system designed to contain or containing R-404A refrigerant or which is suitable for use with R-404 refrigerant, said method comprising replacing at least a portion of the existing R-404A refrigerant with a heat transfer composition comprising Refrigerant 15.

There is therefore provided a method of retrofitting an existing heat transfer system designed to contain or containing R-404A refrigerant or which is suitable for use with R-404 refrigerant, said method comprising replacing at least a portion of the existing R-404A refrigerant with a heat transfer composition comprising Refrigerant 16.

There is therefore provided a method of retrofitting an existing heat transfer system designed to contain or containing R-404A refrigerant or which is suitable for use with R-404 refrigerant, said method comprising replacing at least a portion of the existing R-404A refrigerant with a heat transfer composition comprising Refrigerant 17.

There is therefore provided a method of retrofitting an existing heat transfer system designed to contain or containing R-404A refrigerant or which is suitable for use with R-404 refrigerant, said method comprising replacing at least a portion of the existing R-404A refrigerant with a heat transfer composition comprising Refrigerant 18.

There is therefore provided a method of retrofitting an existing heat transfer system designed to contain or containing R-404A refrigerant or which is suitable for use with R-404 refrigerant, said method comprising replacing at least a portion of the existing R-404A refrigerant with a heat transfer composition comprising Refrigerant 19.

There is therefore provided a method of retrofitting an existing heat transfer system designed to contain or containing R-404A refrigerant or which is suitable for use with R-404 refrigerant, said method comprising replacing at least a portion of the existing R-404A refrigerant with a heat transfer composition comprising Refrigerant 20.

The step of replacing, including as recited in each of the preceding paragraphs, preferably comprises removing at least a substantial portion of, and preferably substantially all of, the existing refrigerant (which can be but is not limited to R-404A) and introducing a heat transfer composition or a refrigerant of the present invention, including each of Refrigerants 1-20, without any substantial modification of the system to accommodate the refrigerant of the present invention.

In preferred retrofitting embodiments, including those embodiments described above, the removing step comprises removing at least about 5%, about 10%, about 25%, about 50% or about 75% by weight of the R-404A from the existing system and replacing it with the heat transfer compositions of the invention The composition of the invention is alternatively provided to replace R404A in refrigeration systems. Thus, each of the heat transfer compositions as described herein, including heat transfer compositions that include any one of Refrigerants 1-20 can be used to replace R404A in any one of the systems disclosed herein.

There is therefore provided a method of using Refrigerant 1 to replace R-404A as a replacement in a heat transfer system designed to contain or suitable for use with R-404A refrigerant.

There is therefore provided a method of using Refrigerant 6 to replace R-404A as a replacement in a heat transfer system designed to contain or suitable for use with R-404A refrigerant.

There is therefore provided a method of using Refrigerant 10 to replace R-404A as a replacemnt in a heat transfer system designed to contain or suitable for use with R-404A refrigerant.

The present invention relates to the use in a medium or low temperature refrigeration system of Refrigerant 1, wherein the Refrigerant 1
(a) has an efficiency (COP) from about 95% to about 105% of the efficiency of R404A in said system; and
(b) is non-flammable as determined in accordance with the Non-Flammability Test.

The present invention relates to the use of in a medium or low temperature refrigeration system of Refrigerant 6 wherein the Refrigerant 6
(a) has an efficiency (COP) from about 95% to about 105% of the efficiency of R404A in said system and/or used in said method; and
(b) is non-flammable as determined in accordance with the Non-Flammability Test.

The present invention relates to the use of in a medium or low temperature refrigeration system of Refrigerant 10 wherein the Refrigerant 10
(a) has an efficiency (COP) from about 95% to about 105% of the efficiency of R404A in said system and/or used in said method; and
(b) is non-flammable as determined in accordance with the Non-Flammability Test.

EXAMPLES

The refrigerant compositions identified in Table 1 below were determined as described herein. Each composition was subjected to thermodynamic analysis to determine its ability to match the operating characteristics of R-404A in various refrigeration systems. The analysis was performed using experimental data collected for properties of various binary pairs of components used in the composition. The vapor/liquid equilibrium behavior of $CF_3I$ was determined and studied in a series of binary pairs with each of HFC-32, $CO_2$, and R1234-yf. The composition of each binary pair was varied over a series of relative percentages in the experimental evaluation and the mixture parameters for each binary pair were regressed to the experimentally obtained data. Other properties were already available in the National Institute of Science and Technology (NIST) Reference Fluid Thermodynamic and Transport Properties Database software (Refprop 9,1 NIST Standard Database 2013). The assumptions used to conduct the analysis were the following: same compressor displacement for all refrigerants, same operating conditions for all refrigerants, same compressor isentropic and volumetric efficiency for all refrigerants. In each Example, simulations were conducted using the measured vapor liquid equilibrium data. The simulation results are reported for each Example.

TABLE 1

| | Refrigerants Compositions | | | | |
|---|---|---|---|---|---|
| Refrigerant | R32 (wt %) | $CO_2$ (wt %) | $CF_3I$ (wt %) | R1234yf (wt %) | GWP |
| A1 | 12% | 1.5% | 46.5% | 40% | 82 |
| A2 | 13% | 2% | 45% | 40% | 89 |
| A3 | 14% | 3% | 43% | 40% | 95 |

Example 1

Vapor Injection Refrigeration System

The thermal stability of Refrigerant A2 was evaluated based on standard sealed tube testing according to ANSI/ASHRAE Standard 97-2007. Experimental results showed that the preferred discharge temperature is 135° C. or lower.

Variation of condensing temperatures due to changing ambient conditions affect the system performance and compressor discharge temperature. A refrigeration system containing a vapor injection and having a suction line heat exchanger was operated using a refrigerant consisting of composition A2 and with three different condensing temperatures, namely: 10° C., 32.2° C., 54.4° C. For each of these condenser temperatures, the system was run with substantially the same operating conditions/parameters as indicated below:

The vapor injection refrigeration system of the type illustrated generally in FIG. 2 hereof removes the vapor from a flash tank expansion device downsteam of the condenser. This vapor flow is injected into a first compression stage of the compression process and reduces the compressor discharge temperature.

Operating conditions were:

Evaporating temperature=−28.9° C.;

Evaporator Superheat=5.5° C.;

Isentropic Efficiency=65%;

Volumetric Efficiency=100%;

Temperature Rise suction-line Compressor inlet=20° C.

The results of operation with each condenser temperature is reported in Table 2 below:

TABLE 2

Vapor injection refrigeration system

| Condensing Temperature (° C.) | Efficiency of system without vapor injection [%] | Efficiency [% of system without Vapor Injection] [%] | Compressor discharge temperature of system without vapor injection [C.] | Compressor discharge temperature of system with vapor injection [C.] |
|---|---|---|---|---|
| 10.0 | 100% | 106.1% | 74.6 | 72.2 |
| 32.2 | 100% | 117.1% | 108.8 | 101.6 |
| 54.4 | 100% | 135.3% | 140.1 | 125.3 |

As can be seen from the results reported in Table 2, efficiency improved compared with R404A. The use of vapor injection with Refrigerant A2 resulted in a discharge temperature of less than 135° C.

Example 2

Liquid Injection Refrigeration System

Refrigerant A2 was used for this Example. Variation of condensing temperatures due to changing ambient conditions affect the system performance and compressor discharge temperature. A liquid injection refrigeration system of the type illustrated generally in FIG. 3 injects liquid refrigerant after the condenser into a first compression stage of the compression process and reduces the compressor discharge temperature. For this example, different maximum compressor discharge temperatures were specified that require different amounts of injected refrigerant to maintain the maximum allowable discharge temperature. The target is efficiency within 5% of system without liquid injection.

Operating conditions were:

Condensing temperature=10 C, 32.2 C, 54.4 C;

Condenser sub-cooling=5.5° C.;

Evaporating temperature=−28.9° C.;

Evaporator Superheat=5.5° C.;

Isentropic Efficiency=65%;

Volumetric Efficiency=100%; Refrigerant

Temperature Rise in suction line =20° C.

The results of operation with each condenser temperature is reported in Table 2 below:

TABLE 3

Liquid Injection Refrigeration System for Maximum Compressor Discharge Temperature of 135° C.

| Condensing Temperature (° C.) | Efficiency of system without liquid injection [%] | Efficiency [% of system without liquid Injection] [%] | Compressor discharge temperature of system without liquid injection [C.] | Compressor discharge temperature of system with liquid injection [C.] |
|---|---|---|---|---|
| 10.0 | 100% | 100% | 75.5 | 75.5 |
| 32.2 | 100% | 100% | 109.9 | 109.9 |
| 54.4 | 100% | 99.2% | 140.1 | 135.0 |

As can be seen from the results reported in Table 3, discharge temperature can be managed for the maximum compressor discharge temperature of 135° C. with an efficiency of 99.2% compared to the system without liquid injection.

Example 3

Refrigeration System with Suction Line Heat Exchanger

Refrigerant A2 was used for this Example. A suction line heat exchanger (hereinafter "SLHX") used to transfer heat from the liquid line after the condenser to the vapor line after the evaporator as disclosed generally in FIG. 4 hereof. The use of a SLHX as per this example has several effects on the system performance. On the one hand, the temperature of the liquid after the condenser is reduced. Due to this, the inlet quality to the evaporator after the expansion process is reduced which at the same time leads to an increase in evaporator enthalpy difference effectively increasing the cooling capacity. On the other hand, the temperature of the vapor leaving the evaporator is increased which reduces the suction density and leads to an increase in compressor power consumption. Both effects need to be compared to determine if the overall effect is beneficial. This can vary based on the properties of each refrigerant tested. As a result, certain refrigerants may benefit from the use of an SLHX in a give system while other refrigerants will not produce an advantageous result when an SLHX is used. For this example the effect on the system efficiency and compressor discharge temperature is determined. The target is compressor discharge temperature below 135° C.

Operating conditions are: Condensing temperature=10 C, 32.2 C, 54.4 C; Condenser sub-cooling=5.5° C.; Evaporating temperature=−28.9° C.; Evaporator Superheat=5.5° C.; Isentropic Efficiency=65%; Volumetric Efficiency=100%; and Suction line heat exchanger effectiveness: 30%, 50%, 70%, 90%.

The results of operation with each condenser temperature is reported in Table 4 below:

TABLE 4

| Refrigerant A2 | | | | | | | | | | |
|---|---|---|---|---|---|---|---|---|---|---|
| Condensing | 0% | | 30% | | 50% | | 70% | | 90% | |
| Temperature [C.] | COP [—] | Tdis [C.] | COP [—] | Tdis [C.] | COP [—] | Tdis [C.] | COP [—] | Tdis [C.] | COP [—] | Tdis [C.] |
| 10.0 | 3.58 | 52.3 | 3.592 | 57.5 | 3.597 | 60.9 | 3.603 | 64.2 | 3.61 | 67.5 |
| 32.2 | 1.98 | 85.6 | 2.008 | 99.1 | 2.026 | 107.9 | 2.046 | 116.5 | 2.066 | 124.9 |
| 54.4 | 1.17 | 116.3 | 1.226 | 138.9 | 1.262 | 153.5 | 1.298 | 167.7 | 1.334 | 181.4 |

Results using R404A in the system are reported in Table 5 below:

TABLE 5

| | R404A | | | | | | | | | |
|---|---|---|---|---|---|---|---|---|---|---|
| Condensing | 0% | | 30% | | 50% | | 70% | | 90% | |
| Temperature [C.] | COP [—] | Tdis [C.] | COP [—] | Tdis [C.] | COP [—] | Tdis [C.] | COP [—] | Tdis [C.] | COP [—] | Tdis [C.] |
| 10.0 | 3.50 | 36.3 | 3.506 | 45.1 | 3.514 | 51.0 | 3.525 | 56.8 | 3.536 | 62.6 |
| 32.2 | 1.87 | 64.8 | 1.915 | 81.2 | 1.948 | 92.1 | 1.981 | 102.8 | 2.014 | 113.4 |
| 54.4 | 1.02 | 91.2 | 1.112 | 115.3 | 1.172 | 131.3 | 1.229 | 147.0 | 1.283 | 162.5 |

The use of the SLHX has a positive effect on the system efficiency. However it also increases the compressor discharge temperature. For high condensing conditions temperatures, compressor discharge temperature above 135° C. are reached. Therefore the effectiveness of the heat exchanger has to be considered at higher condensing conditions to maintain reasonable discharge temperatures. At a condensing temperature of 54.4° C., the use of suction line heat exchanger leads to compressor discharge temperatures above 135° C., and thus use of a SLHX in such cases is not preferred.

Example 4

Low Temperature Commercial Refrigeration System

Commercial refrigeration systems, such as supermarket refrigeration systems, are used to maintain chilled or frozen food in both product display cases and storage refrigerators. Refrigerants A1, A2, and A3 were operated in a low temperature commercial refrigeration system under the following conditions.

Operating conditions are: Condensing temperature=40.6° C.; Condenser sub-cooling=0° C. (system with receiver); Evaporating temperature=−31.6° C.; Degree of superheat at evaporator outlet=5.5° C.; Isentropic Efficiency=65%; Volumetric Efficiency=100%; and Degree of superheat in the suction line =44.4° C.

TABLE 6

Performance in Low Temperature Commercial Refrigeration System

| Refrigerant | Capacity (% R404A) (±3%) | Efficiency (% R404A) | Discharge Temperature (° C.) | Evaporative Glide (° C.) |
|---|---|---|---|---|
| R404A | 100% | 100% | 125 | 0.4 |
| A1 | 93% | 116% | 135 | 6.4 |
| A2 | 97% | 115% | 135 | 6.8 |
| A3 | 103% | 115% | 135 | 7.5 |

6 shows the thermodynamic performance of a low temperature supermarket refrigeration system using refrigerants A1-A3 of the present invention compared to R404A system. Refrigerants A1 to A3 show higher efficiency compared to R404A. Refrigerants A1-A3 show a discharge temperature equal to or lower than 135° C. indicating good thermal stability.

Example 5

Medium Temperature Supermarket Refrigeration System

Supermarket refrigeration systems are used to maintain chilled or frozen food in both product display cases and storage refrigerators. Refrigerants A1, A2, and A3 were operated in a low temperature supermarket refrigeration system under the following conditions: Condensing temperature=40.6° C.; Condenser sub-cooling=0° C. (system with receiver); Evaporating temperature=−6.7° C.; Evaporator Superheat=5.5° C.; Isentropic Efficiency=70%; Volumetric Efficiency=100%; and Degree of superheat in the suction line=19.5° C. The results of operation with each condenser temperature are reported in Table 7 below:

TABLE 7

Performance in Medium Temperature Supermarket Refrigeration System

| Refrigerant | Capacity (% R404A) (±3) | Efficiency (% R404A) | Discharge Temperature (° C.) | Evap Glide (° C.) |
|---|---|---|---|---|
| R404A | 100% | 100% | 80 | 0.4 |
| A1 | 93% | 111% | 96 | 8.2 |
| A2 | 97% | 110% | 97 | 8.7 |
| A3 | 102% | 110% | 99 | 9.4 |

Table 7 shows the thermodynamic performance of a medium temperature refrigeration system compared to R404A system. Refrigerants A1 to A3 show higher efficiency compared to R404A. Refrigerants A1 to A3 show discharge temperature equal to or lower than 135° C. indicating good thermal stability.

Example 6

Low Temperature Self-Contained Refrigeration System

A self-contained or "plug-in" type refrigerator or freezer or "reach-in" type of refrigerator or freezer is used for storage of frozen or refrigerated goods. Non-limiting examples of such systems include those typically used for indoors or outdoors in places such as restaurants, convenience stores, gas stations, grocery stores, and the like. The superheat along the suction line may also or alternatively be generated by a heat exchanger between the liquid-line (refrigerant line between condenser and expansion device) and the suction-line (refrigerant line between compressor and evaporator), typically known as suction-line/liquid-line heat exchanger, in order to improve system performance as illustrated generally herein in FIG. 4. The suction-line/liquid line heat exchanger provides substantial degree of subcooling at the inlet of the expansion device and degree of superheat at the compressor inlet.

Operating conditions are: Condensing temperature=35° C.; Condenser sub-cooling=5° C.; Evaporating temperature=−28.9° C.; Evaporator Superheat=5° C.; Isentropic Efficiency=65%; Volumetric Efficiency=100%; and Suction Line/Liquid Line Heat Exchanger Effectiveness: 50%.

The results of operation with each condenser temperature are reported in Table 8 below:

TABLE 8

Performance in Low Temperature Self-Contained Refrigeration System

| Refrigerant | Capacity (% R404A) (±3) | Efficiency (% R404A) | Discharge Temperature (° C.) | Evap Glide (° C.) |
|---|---|---|---|---|
| R404A | 100% | 100% | 97 | 0.5 |
| A1 | 86% | 105% | 113 | 8.8 |
| A2 | 90% | 105% | 115 | 9.2 |
| A3 | 96% | 104% | 117 | 10.0 |

Table 8 shows the thermodynamic performance of a low temperature refrigeration system compared to R404A system. Refrigerants A1 to A3 show higher efficiency compared to R404A. Refrigerants A1 to A3 show a discharge temperature equal to or lower than 135° C. indicating good thermal stability.

Example 7

Medium Temperature Self-Contained Refrigeration System

A self-contained or "plug-in" type refrigerator or freezer or "reach-in" type of refrigerator or freezer is used for storage of frozen or refrigerated goods. Non-limiting examples of such systems include those typically used for indoors or outdoors in places such as restaurants, convenience stores, gas stations, grocery stores, and the like. The superheat along the suction line may also (or alternatively be generated by a heat exchanger between the liquid-line (refrigerant line between condenser and expansion device) and the suction-line (refrigerant line between compressor and evaporator), typically known as suction-line/liquid-line heat exchanger, in order to improve system performance as generally illustrated in FIG. 4. The suction-line/liquid line heat exchanger provides substantial degree of subcooling at the inlet of the expansion device and degree of superheat at the compressor inlet.

Operating conditions are: Condensing temperature=35° C.; Condenser sub-cooling=5° C.; Evaporating temperature=−6.7° C.; Evaporator Superheat=5° C.; Isentropic Efficiency=70%; Volumetric Efficiency=100%; and Suction Line/Liquid Line Heat Exchanger Effectiveness: 50%.

The results of operation with each condenser temperature are reported in Table 9 below:

TABLE 9

Performance in Medium Temperature Self-Contained Refrigeration System

| Refrigerant | Capacity (% R404A) (±3) | Efficiency (% R404A) | Discharge Temperature (° C.) | Evaporative Glide (° C.) |
|---|---|---|---|---|
| R404A | 100% | 100% | 69 | 0.5 |
| A1 | 88% | 104% | 77 | 10.0 |
| A2 | 92% | 104% | 78 | 10.5 |
| A3 | 97% | 103% | 80 | 11.3 |

Table 9 shows the thermodynamic performance of a medium temperature refrigeration system compared to R404A system. Refrigerants A1 to A3 show higher efficiency compared to R404A. Refrigerants A1 to A3 show a discharge temperature equal to or lower than 135° C. indicating good thermal stability.

Example 8

Low Temperature Transport Refrigeration System

A transport refrigeration system is typically used for refrigeration of food, pharmaceuticals, medical supplies, etc., during transportation, such as those used with trucks, trailers, reefer ships, containers and railcars. The superheat along the suction line may also (or alternatively be generated by a heat exchanger between the liquid-line (refrigerant line between condenser and expansion device) and the suction-line (refrigerant line between compressor and evaporator), typically known as suction-line/liquid-line heat exchanger, in order to improve system performance as generally illustrated in FIG. 4. The suction-line/liquid line heat exchanger provides substantial degree of subcooling at the inlet of the expansion device and degree of superheat at the compressor inlet.

Operating conditions were: Condensing temperature=40.6° C.; Condenser sub-cooling=0.0° C. (system with receiver); Evaporating temperature=−28.9° C.; Evaporator Superheat=5.5° C.; Isentropic Efficiency=65%; Volumetric Efficiency=100%; and Suction line heat exchanger effectiveness: 50%.

The results of operation with each condenser temperature are reported in Table 10 below:

TABLE 10

Performance in Low Temperature Transport Refrigeration System

| Refrigerant | Capacity (% R404A) (±3) | Efficiency (% R404A) | Discharge Temperature (° C.) | Evap Glide (° C.) |
|---|---|---|---|---|
| R404A | 100% | 100% | 110 | 0.5 |
| A1 | 88% | 108% | 128 | 8.0 |
| A2 | 91% | 107% | 130 | 8.4 |
| A3 | 97% | 106% | 132 | 9.1 |

Table 10 shows the thermodynamic performance of a low temperature refrigeration system compared to R404A system. Refrigerants A1 to A3 show higher efficiency compared to R404A. Refrigerants A1 to A3 show a discharge temperature equal to or lower than 135° C. indicating good thermal stability.

Example 9

Medium Temperature Transport Refrigeration System

A transport refrigeration system is typically used for refrigeration of food, pharmaceuticals, medical supplies, etc., during transportation, such as those used with trucks, trailers, reefer ships, containers and railcars. The superheat along the suction line may also (or alternatively be generated by a heat exchanger between the liquid-line (refrigerant line between condenser and expansion device) and the suction-line (refrigerant line between compressor and evaporator), typically known as suction-line/liquid-line heat exchanger, in order to improve system performance as generally illustrated in FIG. 4. The suction-line/liquid line heat exchanger provides substantial degree of subcooling at the inlet of the expansion device and degree of superheat at the compressor inlet.

Operating conditions are: Condensing temperature=40.6° C.; Condenser sub-cooling=0° C. (system with receiver); Evaporating temperature=−6.7° C.; Evaporator Superheat=5.5° C.; Isentropic Efficiency=70%; Volumetric Efficiency=100%; and Suction line heat exchanger effectiveness: 50%.

The results of operation with each condenser temperature are reported in Table 11 below:

TABLE 11

Performance in Medium Temperature Transport Refrigeration System

| Refrigerant | Capacity (% R404A) (±3) | Efficiency (% R404A) | Discharge Temperature (° C.) | Evap Glide (° C.) |
|---|---|---|---|---|
| R404A | 100% | 100% | 81 | 0.4 |
| A1 | 89% | 106% | 91 | 9.2 |
| A2 | 93% | 106% | 92 | 9.6 |
| A3 | 98% | 105% | 94 | 10.3 |

Table 11 shows the thermodynamic performance of a medium temperature refrigeration system compared to R404A system. Refrigerants A1 to A3 show higher efficiency compared to R404A. Refrigerants A1 to A3 show a discharge temperature equal to or lower than 135° C. indicating a good thermal stability.

In Examples 4-9, capacity can be recovered by using a larger compressor.

NUMBERED EMBODIMENTS

Numbered Embodiments

Numbered Embodiment 1

A refrigerant comprising at least about 97% by weight of the following four compounds in the relative amounts set forth below:
about 41 to about 49% by weight trifluoroiodomethane ($CF_3I$);
about 36 to about 44% by weight 1,1,1,2-tetrafluoropropene (HFO-1234yf);
about 12 to about 15% by weight difluoromethane (HFC-32); and
1 to 3.5±0.2% by weight carbon dioxide ($CO_2$)
with the percentages being based on the total weight of the four compounds.

Numbered Embodiment 2

The refrigerant of numbered embodiment 1 wherein the refrigerant of four compounds is:
about 43 to about 47% by weight trifluoroiodomethane ($CF_3I$);
about 38 to about 42% by weight 1,1,1,2-tetrafluoropropene (HFO-1234yf);
about 12 to about 15% by weight difluoromethane (HFC-32); and
1±0.2 to 3.5±0.2% by weight carbon dioxide ($CO_2$)
with the percentages being based on the total weight of the four compounds.

Numbered Embodiment 2a

The refrigerant of numbered embodiment 1 wherein the refrigerant of four compounds is
43±0.2% to 45±0.2% by weight trifluoroiodomethane ($CF_3I$);
40±0.5% by weight 1,1,1,2-tetrafluoropropene (HFO-1234yf);
13±0.2 to 14±0.2% by weight difluoromethane (HFC-32); and
2±0.2% to 3±0.2% by weight carbon dioxide ($CO_2$)
with the percentages being based on the total weight of the four compounds.

Numbered Embodiment 3

The refrigerant of numbered embodiment 1 or 2 wherein the refrigerant of four compounds is:
45±1% by weight trifluoroiodomethane ($CF_3I$);
40±1% by weight 1,1,1,2-tetrafluoropropene (HFO-1234yf);
13±1% by weight difluoromethane (HFC-32); and
2±0.2% by weight carbon dioxide ($CO_2$)
with the percentages being based on the total weight of the four compounds.

Numbered Embodiment 4

The refrigerant according to any one of numbered embodiments 1 to 3 wherein the refrigerant comprises at least about 98.5% by weight of said four compound blend.

Numbered Embodiment 5

The refrigerant according to any one of numbered embodiments 1 to 3 wherein the refrigerant comprises at least about 99.5% by weight of said four compound blend.

Numbered Embodiment 6

A refrigerant consisting essentially of:
about 41 to about 49% by weight trifluoroiodomethane ($CF_3I$);
about 36 to about 44% by weight 1,1,1,2-tetrafluoropropene (HFO-1234yf);
about 12 to about 15% by weight difluoromethane (HFC-32); and
1 to 3.5±0.2% by weight carbon dioxide ($CO_2$)
with the percentages being based on the total weight of the four compounds.

Numbered Embodiment 7

The refrigerant of numbered embodiment 6, consisting essentially of
about 43 to about 47% by weight trifluoroiodomethane ($CF_3I$);
about 38 to about 42% by weight 1,1,1,2-tetrafluoropropene (HFO-1234yf);

about 12 to about 15% by weight difluoromethane (HFC-32); and 1 to 3.5±0.2% by weight carbon dioxide ($CO_2$)

with the percentages being based on the total weight of the four compounds.

Numbered Embodiment 7a

The refrigerant of numbered embodiment 6, consisting essentially of

43±0.2% to 45±0.2% by weight trifluoroiodomethane ($CF_3I$);

40±0.5% by weight 1,1,1,2-tetrafluoropropene (HFO-1234yf);

13±0.2 to 14±0.2% by weight difluoromethane (HFC-32); and

2±0.2% to 3±0.2% by weight carbon dioxide ($CO_2$)

with the percentages being based on the total weight of the four compounds.

Numbered Embodiment 8

The refrigerant of numbered embodiment 6 or numbered embodiment 7 consisting essentially of 45±1% by weight trifluoroiodomethane ($CF_3I$);

40±1% by weight 1,1,1,2-tetrafluoropropene (HFO-1234yf);

13±1% by weight difluoromethane (HFC-32); and

2±0.2% by weight carbon dioxide ($CO_2$)

with the percentages being based on the total weight of the four compounds

Numbered Embodiment 9

A refrigerant consisting of:

about 41 to about 49% by weight trifluoroiodomethane ($CF_3I$);

about 36 to about 44% by weight 1,1,1,2-tetrafluoropropene (HFO-1234yf);

about 12 to about 15% by weight difluoromethane (HFC-32); and 1 to 3.5±0.2% by weight carbon dioxide ($CO_2$)

with the percentages being based on the total weight of the four compounds

Numbered Embodiment 10

The refrigerant of numbered embodiment 9, consisting of about 43 to about 47% by weight trifluoroiodomethane ($CF_3I$);

about 38 to about 42% by weight 1,1,1,2-tetrafluoropropene (HFO-1234yf);

about 12 to about 15% by weight difluoromethane (HFC-32); and 1 to 3.5±0.2% by weight carbon dioxide ($CO_2$)

with the percentages being based on the total weight of the four compounds.

Numbered Embodiment 10a

The refrigerant of numbered embodiment 9, consisting of

43±0.2% to 45±0.2% by weight trifluoroiodomethane ($CF_3I$);

40±0.5% by weight 1,1,1,2-tetrafluoropropene (HFO-1234yf);

13±0.2 to 14±0.2% by weight difluoromethane (HFC-32); and

2±0.2% to 3±0.2% by weight carbon dioxide ($CO_2$)

with the percentages being based on the total weight of the four compounds.

Numbered Embodiment 11

The refrigerant of numbered embodiment 9 or 10 consisting of

45±1% by weight trifluoroiodomethane ($CF_3I$);

40±1% by weight 1,1,1,2-tetrafluoropropene (HFO-1234yf);

13±1% by weight difluoromethane (HFC-32); and

2±0.2% by weight carbon dioxide ($CO_2$)

with the percentages being based on the total weight of the four compounds.

Numbered Embodiment 12

The refrigerant of any one of numbered embodiments 1 to 11 wherein the refrigerant is non-flammable as determined in accordance with the Non-Flammability Test.

Numbered Embodiment 13

The refrigerant of any one of numbered embodiments 1 to 12 wherein the refrigerant has a GWP of less than 150, preferably less than 100.

Numbered Embodiment 14

The refrigerant of any one of numbered embodiments 1 to 13 wherein the refrigerant has an ODP of not greater than not greater than 0.05, preferably 0.02, more preferably about zero.

Numbered Embodiment 14a

The refrigerant of any one of numbered embodiments 1 to 14 wherein the refrigerant has acceptable toxicity.

Numbered Embodiment 14b

The refrigerant of any one of numbered embodiments 1 to 14a wherein the refrigerant has a capacity and COP that matches R-404A.

Numbered Embodiment 15

The refrigerant of any one of numbered embodiments 1 to 14a wherein the refrigerant has an OEL of greater than about 400.

Numbered Embodiment 16

A heat transfer composition comprising a refrigerant of any one of numbered embodiments 1 to 15.

Numbered Embodiment 17

A heat transfer composition consisting essentially of a refrigerant of any one of numbered embodiments 1 to 15.

Numbered Embodiment 18

A heat transfer composition consisting of a refrigerant of any one of numbered embodiments 1 to 15.

Numbered Embodiment 19

The heat transfer composition according to numbered embodiment 16, wherein the refrigerant comprises greater than 40% by weight of the composition.

Numbered Embodiment 20

The heat transfer composition according to numbered embodiment 16, wherein the refrigerant comprises greater than 50% by weight of the composition.

Numbered Embodiment 21

The heat transfer composition according to numbered embodiment 16, wherein the refrigerant comprises greater than 60% by weight of the composition.

Numbered Embodiment 22

The heat transfer composition according to numbered embodiment 16, wherein the refrigerant comprises greater than 70% by weight of the composition.

Numbered Embodiment 23

The heat transfer composition according to numbered embodiment 16, wherein the refrigerant comprises greater than 80% by weight of the composition.

Numbered Embodiment 24

The heat transfer composition according to numbered embodiment 16, wherein the refrigerant comprises greater than 90% by weight of the composition.

Numbered Embodiment 25

The heat transfer composition of any one of numbered embodiments 16 or 19 to 24 wherein said heat transfer composition further comprises one or more lubricants, dyes, solubilizing agents, compatibilizers, stabilizers, antioxidants, corrosion inhibitors, extreme pressure additives and anti-wear additives.

Numbered Embodiment 26

The heat transfer composition of numbered embodiment 25 wherein said heat transfer composition further comprises a stabilizer.

Numbered Embodiment 27

The heat transfer composition of numbered embodiment 20 wherein said stabilizer comprises one or more of alkylated naphthalene compounds, diene-based compounds, phenol-based compounds, and isobutylene.

Numbered Embodiment 28

The heat transfer composition of numbered embodiment 20 wherein said stabilizer comprises one or more of phosphorous-based compounds, nitrogen-based compounds and epoxide compounds.

Numbered Embodiment 29

The heat transfer composition of numbered embodiment 20 wherein stabilizer comprises at least one alkylated naphthalene compounds and at least one diene-based compounds, phenol-based compounds and isobutylene.

Numbered Embodiment 30

The heat transfer composition of numbered embodiment 20 wherein said stabilizer comprises at least one alkylated naphthalene compounds and at least one diene-based compounds and at least one phenol-based compound.

Numbered Embodiment 31

The heat transfer composition of numbered embodiments 27, 29 or 30 wherein the diene based compound is present and includes C3 to C15 dienes and/or compounds formed by reaction of any two or more C3 to C4 dienes.

Numbered Embodiment 32

The heat transfer composition of numbered embodiments 27, 29 or 30 wherein the diene based compound is present and is selected from the group consisting of allyl ethers, propadiene, butadiene, isoprene, and terpenes.

Numbered Embodiment 33

The heat transfer composition of numbered embodiments 31 or 32 wherein the diene based compound is a terpene selected from the group consisting of terebene, retinal, geranoil, terpinene, delta-3 carene, terpinolene, phellandrene, fenchene, myrcene, farnesene, pinene, nerol, citral, camphor, menthol, limonene, nerolidol, phytol, carnosic acid and vitamin $A_1$, preferably, farnesene.

Numbered Embodiment 34

The heat transfer composition of numbered embodiment 27 or 29 to 33 wherein the diene based compound is provided in the heat transfer composition in an amount of from greater than 0, preferably from 0.0001% by weight to about 5% by weight, more preferably 0.001% by weight to about 2.5% by weight, most preferably from 0.01% to about 1% by weight, based on the weight of the diene-based compound(s) plus refrigerant.

Numbered Embodiment 35

The heat transfer composition of any one of numbered embodiments 27 or 29 to 34 further comprising a stabilizer comprising one or more phenol-based compounds selected from 4,4'-methylenebis(2,6-di-tert-butylphenol); 4,4'-bis(2,6-di-tert-butylphenol); 2,2- or 4,4-biphenyldiols, including 4,4'-bis(2-methyl-6-tert-butylphenol); derivatives of 2,2- or 4,4-biphenyldiols; 2,2'-methylenebis(4-ethyl-6-tert-butylphenol); 2,2'-methylenebis(4-methyl-6-tert-butylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol: 2,4-dimethyl-6-tert-butylphenol; 2,6-di-tert-alpha-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis (3,5-di-tert-butyl-4- hydroxybenzyl)sulfide, tocopherol, hydroquinone, 2,2'6,6'-tetra-tert-butyl-4,4'-methylenediphenol and t-butyl hydroquinone.

Numbered Embodiment 36

The heat transfer composition of numbered embodiment 35 wherein the phenol-based compound is BHT.

Numbered Embodiment 37

The heat transfer composition of any one of numbered embodiments 27 or 29 to 36 wherein the phenol-based compound is provided in the heat transfer composition in an amount of greater than 0, preferably from 0.0001% by weight to 5% by weight, more preferably from 0.001% by weight to 2.5% by weight, most preferably from 0.01% to 1% by weight, based on the weight of the phenol-based compound(s) plus refrigerant.

Numbered Embodiment 38

The heat transfer composition of any one of numbered embodiments 27 or 29 to 37 further comprising a stabilizer comprising one or more alkylated naphthalene compounds having the following structure:

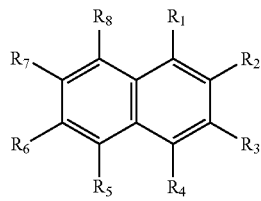

where each $R_1$-$R_8$ is independently selected from linear alkyl group, a branched alkyl group and hydrogen.

Numbered Embodiment 39

The heat transfer composition of any one of numbered embodiments 27 or 29 to 38 wherein the alkylated naphthalene compound is present and comprises AN1.

Numbered Embodiment 40

The heat transfer composition of any one of numbered embodiments 27 or 29 to 39 wherein the alkylated naphthalene compound is present and comprises AN2.

Numbered Embodiment 41

The heat transfer composition of any one of numbered embodiments 27 or 29 to 40 wherein the alkylated naphthalene compound is present and comprises AN3.

Numbered Embodiment 42

The heat transfer composition of any one of numbered embodiments 27 or 29 to 41 wherein the alkylated naphthalene compound is present and comprises AN4.

Numbered Embodiment 43

The heat transfer composition of any one of numbered embodiments 27 or 29 to 42 wherein the alkylated naphthalene compound is present and comprises AN5.

Numbered Embodiment 44

The heat transfer composition of any one of numbered embodiments 27 or 29 to 43 wherein the alkylated naphthalene compound is present and comprises AN6.

Numbered Embodiment 45

The heat transfer composition of any one of numbered embodiments 27 or 29 to 44 wherein the alkylated naphthalene compound is present and comprises AN7.

Numbered Embodiment 46

The heat transfer composition of any one of numbered embodiments 27 or 29 to 45 wherein the alkylated naphthalene compound is present and comprises AN8.

Numbered Embodiment 47

The heat transfer composition of any one of numbered embodiments 27 or 29 to 46 wherein the alkylated naphthalene compound is present and comprises AN9.

Numbered Embodiment 48

The heat transfer composition of any one of numbered embodiments 27 or 29 to 47 wherein the alkylated naphthalene compound is present and comprises AN10.

Numbered Embodiment 49

The heat transfer composition of any one of numbered embodiments 27 or 29 to 48 wherein the alkylated naphthalene is present in an amount of from 0.01% to 10% where amounts are in percent by weight based on the amount of alkylated naphthalene plus refrigerant.

Numbered Embodiment 50

The heat transfer composition of numbered embodiment 49 wherein the alkylated naphthalene is present in an amount of from 1.5% to 4.5%, where amounts are in percent by weight based on the amount of alkylated naphthalene plus refrigerant.

Numbered Embodiment 51

The heat transfer composition of numbered embodiment 50 wherein the alkylated naphthalene is present in an amount of from 2.5% to 3.5%, where amounts are in percent by weight based on the amount of alkylated naphthalene plus refrigerant.

Numbered Embodiment 52

The heat transfer composition of any one of numbered embodiments 28 or 31 to 51 wherein said heat transfer composition further comprises a stabilizer comprising one or more phosphorus-based compounds.

Numbered Embodiment 52a

The heat transfer composition of numbered embodiment 52 wherein said phosphorus-based compound is a phosphite or phosphate.

Numbered Embodiment 53

The heat transfer composition of numbered embodiment 52a wherein said phosphorus-based compound is a phosphite, preferably wherein the phosphite compound is a diaryl, dialkyl, triaryl and/or trialkyl phosphite, and/or a mixed aryl/alkyl di- or tri-substituted phosphite, more preferably wherein the phosphite is one or more compounds selected from hindered phosphites, tris-(di-tert-butylphenyl) phosphite, di-n-octyl phophite, iso-octyl diphenyl phosphite, iso-decyl diphenyl phosphite, tri-iso-decyl phosphate, triphenyl phosphite and diphenyl phosphite, particularly diphenyl phosphite.

Numbered Embodiment 54

The heat transfer composition of numbered embodiment 52a wherein said phosphorus-based compound is a phosphate, preferably wherein the phosphate compound is triaryl phosphate, trialkyl phosphate, alkyl mono acid phosphate, aryl diacid phosphate, amine phosphate, preferably triaryl phosphate and/or a trialkyl phosphate, particularly tri-n-butyl phosphate.

Numbered Embodiment 55

The heat transfer composition of any one of numbered embodiments 52 to 54 wherein or more phosphorus-based compounds are provided in the heat transfer composition in an amount of greater than 0 and preferably from 0.0001% by weight to 5% by weight, preferably from 0.001% by weight to 2.5% by weight, and more preferably from 0.01% to 1% by weight, wherein by weight refers to weight of the phosphorous-based compound(s) plus refrigerant in the heat transfer composition.

Numbered Embodiment 56

The heat transfer composition of any one of numbered embodiments 28 or 31 to 55 wherein said heat transfer composition further comprises a stabilizer comprising one or more nitrogen-based compounds.

Numbered Embodiment 57

The heat transfer composition of numbered embodiment 56 wherein said nitrogen-based compound is an amine based compound such as one or more secondary or tertiary amines selected from diphenylamine, p-phenylenediamine, triethylamine, tributylamine, diisopropylamine, triisopropylamine and triisobutylamine, preferably wherein the amine based compound is an amine antioxidant such as a substituted piperidine compound, i.e. a derivative of an alkyl substituted piperidyl, piperidinyl, piperazinone, or alkyoxypiperidinyl, particularly one or more amine antioxidants selected from 2,2,6,6-tetramethyl-4-piperidone, 2,2,6,6-tetramethyl-4-piperidinol; bis-(1,2,2,6,6-pentamethylpiperidyl)sebacate; di(2,2,6,6-tetramethyl-4-piperidyl)sebacate, poly(N-hydroxyethyl-2,2,6,6-tetramethyl-4-hydroxy-piperidyl succinate; alkylated paraphenylenediamines such as N-phenyl-N'-(1,3-dimethyl-butyl)-p-phenylenediamine or N,N'-di-sec-butyl-p-phenylenediamine and hydroxylamines such as tallow amines, methyl bis tallow amine and bis tallow amine, phenol-alpha-napththylamine, an alkyldiphenyl amine such as bis (nonylphenyl amine), dialkylamine such as (N-(1-methylethyl)-2-propylamine, phenyl-alpha-naphthyl amine (PANA), alkyl-phenyl-alpha-naphthyl-amine (APANA), and bis (nonylphenyl) amine, preferably the amine based compound is one or more of phenyl-alpha-naphthyl amine (PANA), alkyl-phenyl-alpha-naphthyl-amine (APANA) and bis (nonylphenyl) amine, and more preferably phenyl-alpha-naphthyl amine (PANA).

Numbered Embodiment 58

The heat transfer composition of numbered embodiment 56 or 57 wherein said nitrogen-based compound is one or more compounds selected from dinitrobenzene, nitrobenzene, nitromethane, nitrosobenzene, and TEMPO [(2,2,6,6-tetramethylpiperidin-1-yl)oxyl].

Numbered Embodiment 59

The heat transfer composition of any one of numbered embodiments 56 to 58 wherein the nitrogen compounds are provided in the heat transfer composition in an amount of greater than 0 and from 0.0001% by weight to 5% by weight, preferably from 0.001% by weight to 2.5% by weight, and more preferably from 0.01% to 1% by weight, wherein percentage by weight refers to the weight of the nitrogen-based compound(s) plus refrigerant in the heat transfer composition.

Numbered Embodiment 60

The heat transfer composition of any one of numbered embodiments 27 or 29 to 59 wherein said heat transfer composition further comprises a stabilizer comprising isobutylene.

Numbered Embodiment 61

The heat transfer composition of numbered embodiment 60 wherein said isobutylene is provided in the heat transfer composition in an amount of greater than 0 and from 0.0001% by weight to 5% by weight, preferably from 0.001% by weight to 2.5% by weight, and more preferably from 0.01% to 1% by weight, wherein percentage by weight refers to the weight of the isobutylene plus refrigerant in the heat transfer composition.

Numbered Embodiment 62

The heat transfer composition of any one of numbered embodiments 28 or 30 to 61 wherein said heat transfer composition further comprises a stabilizer comprising one or more epoxide compounds.

Numbered Embodiment 63

The heat transfer composition of numbered embodiment 56 wherein said epoxide compounds are selected from aromatic epoxides, alkyl epoxides, and alkyenyl epoxides.

Numbered Embodiment 63a

A heat transfer composition comprising a refrigerant according to any one of numbered embodiments 1 to 15, and a stabilizer composition comprising a diene-based compound and an alkylated naphthalene.

Numbered Embodiment 63b

A heat transfer composition comprising a refrigerant according to any one of numbered embodiments 1 to 15, and a stabilizer composition comprising a diene-based compound, an alkylated naphthalene selected from Alkylated Napthalene 1, and a phenol-based compound.

Numbered Embodiment 63c

A heat transfer composition comprising a refrigerant according to any one of numbered embodiments 1 to 15, and a stabilizer composition comprising farnesene, and Alkylated Napthalene 4 and BHT.

Numbered Embodiment 63d

A heat transfer composition comprising a refrigerant according to any one of numbered embodiments 1 to 15, and a stabilizer composition comprising farnesene, and alkylated naphthalene selected from Alkylated Naphthalene 1, and BHT.

Numbered Embodiment 63e

A heat transfer composition comprising a refrigerant according to any one of numbered embodiments 1 to 15, and a stabilizer composition consists essentially of farnesene, Alkylated Naphthalene 5, and BHT.

Numbered Embodiment 63f

A heat transfer composition comprising a refrigerant according to any one of numbered embodiments 1 to 15, and a stabilizer composition consists of farnesene, Alkylated Naphthalene 5, and BHT.

Numbered Embodiment 63g

A heat transfer composition comprising a refrigerant according to any one of numbered embodiments 1 to 15, and a stabilizer composition comprising isobutylene and an alkylated naphthalene selected from Alkylated Napthalenes 1.

Numbered Embodiment 63h

A heat transfer composition comprising a refrigerant according to any one of numbered embodiments 1 to 15, and a stabilizer composition comprising isobutylene, Alkylated Naphthalene 5 and BHT.

Numbered Embodiment 63i

A heat transfer composition comprising a refrigerant according to any one of numbered embodiments 1 to 15, and a stabilizer composition consists essentially of isobutylene, Alkylated Naphthalene 5, and BHT.

Numbered Embodiment 63j

A heat transfer composition comprising a refrigerant according to any one of numbered embodiments 1 to 15, and a stabilizer composition consisting of isobutylene, Alkylated Naphthalene 5 and BHT.

Numbered Embodiment 63k

A heat transfer composition comprising a refrigerant according to any one of numbered embodiments 1 to 15, and a stabilizer composition comprising Alkylated Naphthalene 4, wherein the alkylated naphthalene is present in an amount of from about 0.0001% by weight to about 5% by weight based on the weight of the heat transfer composition.

Numbered Embodiment 63l

A heat transfer composition comprising a refrigerant according to any one of numbered embodiments 1 to 15, and a stabilizer composition comprising Alkylated Naphthalene 5, wherein the alkylated naphthalene is present in an amount of from about 0.0001% by weight to about 5% by weight based on the weight of the heat transfer composition.

Numbered Embodiment 63m

A heat transfer composition comprising a refrigerant according to any one of numbered embodiments 1 to 15, and a stabilizer composition comprising BHT, wherein said BHT is present in an amount of from about 0.0001% by weight to about 5% by weight based on the weight of heat transfer composition.

Numbered Embodiment 63n

A heat transfer composition comprising a refrigerant according to any one of numbered embodiments 1 to 15, and a stabilizer composition comprising farnesene, Alkylated Napthalene 4 and BHT, wherein the farnesene is provided in an amount of from about 0.0001% by weight to about 5% by weight, the Alkylated Napthalene 4 is provided in an amount of from about 0.0001% by weight to about 10% by weight, and the BHT is provided in an amount of from about 0.0001% by weight to about 5% by weight, with the percentages being based on the weight of the heat transfer composition.

Numbered Embodiment 63o

A heat transfer composition comprising a refrigerant according to any one of numbered embodiments 1 to 15, and a stabilizer composition comprising farnesene, Alkylated Napthalene 4 and BHT, wherein the farnesene is provided in an amount of from about 0.001% by weight to about 2.5% by weight, the Alkylated Napthalene 4 is provided in an amount of from about 0.001% by weight to about 10% by weight, and the BHT is provided in an amount of from about 0.001% by weight to about 2.5% by weight, with the percentages being based on the weight of the heat transfer composition.

Numbered Embodiment 63p

A heat transfer composition comprising a refrigerant according to any one of numbered embodiments 1 to 15, and a stabilizer composition comprising farnesene, Alkylated Napthalene 4 and BHT, wherein the farnesene is provided in an amount of from about 0.001% by weight to about 2.5% by weight, the Alkylated Napthalene 4 is provided in an amount of from about 1.5% by weight to about 4.5% by weight, and the BHT is provided in an amount of from about 0.001% by weight to about 2.5% by weight, with the percentages being based on the weight of the heat transfer composition.

Numbered Embodiment 63q

A heat transfer composition comprising a refrigerant according to any one of numbered embodiments 1 to 15, and a stabilizer composition comprising farnesene, Alkylated Napthalene 5 and BHT, wherein the farnesene is provided in an amount of from about 0.001% by weight to about 2.5% by weight, the Alkylated Napthalene 5 is provided in an amount of from about 2.5% by weight to about 3.5% by weight, and the BHT is provided in an amount of from about 0.001% by weight to about 2.5% by weight, with the percentages being based on the weight of heat transfer composition.

Numbered Embodiment 64

The heat transfer composition of any one of numbered embodiments 16 and 19 to 63q further comprising a lubricant.

Numbered Embodiment 64a

The heat transfer composition of numbered embodiment 64 wherein said lubricant is selected from the group consisting of polyol esters (POEs), polyalkylene glycols (PAGs), silicone oils, mineral oil, alkylbenzenes (ABs), polyvinyl ethers (PVE), polyethers (PEs) and poly(alpha-olefins) (PAOs).

Numbered Embodiment 65

The heat transfer composition of numbered embodiment 64 wherein the lubricant is selected from polyol esters (POEs), mineral oil, alkylbenzenes (ABs), polyvinyl ethers (PVE) and polyethers (PEs).

Numbered Embodiment 66

The heat transfer composition of numbered embodiment 65 wherein the lubricant is selected from polyol esters (POEs), mineral oil, alkylbenzenes (ABs) and polyvinyl ethers (PVE).

Numbered Embodiment 67

The heat transfer composition of numbered embodiment 66 wherein the lubricant is selected from polyol esters (POEs), mineral oil and alkylbenzenes (ABs).

Numbered Embodiment 68

The heat transfer composition of numbered embodiment 67 wherein the lubricant is a polyol ester (POE).

Numbered Embodiment 68a

The heat transfer composition of numbered embodiment 68 wherein the polyol ester (POE) has a viscosity at 40° C. measured in accordance with ASTM D445 of from about 30 to about 70.

Numbered Embodiment 69

The heat transfer composition of any one of numbered embodiments 64 to 68a wherein the lubricant is present in the heat transfer composition in an amount of from 0.1% by weight to 5% based on the weight of the heat transfer composition.

Numbered Embodiment 70

The heat transfer composition of numbered embodiment 69 wherein the lubricant is present in the heat transfer composition in an amount of from 0.1% by weight to 1% by weight based on the weight of the heat transfer composition.

Numbered Embodiment 71

The heat transfer composition of numbered embodiment 70 wherein the lubricant is present in the heat transfer composition in an amount of from 0.1% by weight to 0.5% by weight, based on the weight of the heat transfer composition.

Numbered Embodiment 72

The heat transfer composition of any one of numbered embodiments 16 and 19 to 24 wherein the heat transfer composition consists essentially of the refrigerant according to any one of numbered embodiments 1 to 15 and the stabilizer composition according to any one of numbered embodiments 27 to 63.

Numbered Embodiment 73

The heat transfer composition of any one of numbered embodiments 16 and 19 to 24 wherein the heat transfer composition consists essentially of the refrigerant according to any one of numbered embodiments 1 to 15, the stabilizer according to any one of numbered embodiments 27 to 63 and the lubricant according to any one of numbered embodiments 64 to 71.

Numbered Embodiment 74

The heat transfer composition of any one of numbered embodiments 16 and 19 to 24 wherein the heat transfer composition consists of the refrigerant according to any one of numbered embodiments 1 to 15 and the stabilizer composition according to any one of numbered embodiments 27 to 63.

Numbered Embodiment 75

The heat transfer composition of any one of numbered embodiments 16 and 19 to 24 wherein the heat transfer composition consists of the refrigerant according to any one of numbered embodiments 1 to 15, the stabilizer according to any one of numbered embodiments 27 to 63 and the lubricant according to any one of numbered embodiments 64 to 71.

Numbered Embodiment 76

A heat transfer system comprising a heat transfer composition of any one of numbered embodiments 16 and 19 to 71 and a lubricant, optionally wherein said heat transfer system comprises an evaporator, a condenser and a compressor.

Numbered Embodiment 77

The heat transfer system of numbered embodiment 76, wherein lubricant loading in the system is from about 5% to 60% by weight, wherein the term "lubricant loading" refers to the total weight of lubricant contained in the system as a percentage of total of lubricant and refrigerant contained in the system.

Numbered Embodiment 78

The heat transfer system of numbered embodiment 77, wherein lubricant loading in the system is from about 10% to 60% by weight, wherein the term "lubricant loading" refers to the total weight of lubricant contained in the system as a percentage of total of lubricant and refrigerant contained in the system.

Numbered Embodiment 79

The heat transfer system of numbered embodiment 78, wherein lubricant loading in the system is from about 20% to 50% by weight, wherein the term "lubricant loading" refers to the total weight of lubricant contained in the system as a percentage of total of lubricant and refrigerant contained in the system.

Numbered Embodiment 80

The heat transfer system of numbered embodiment 79, wherein lubricant loading in the system is from about 20% to 40% by weight, wherein the term "lubricant loading" refers to the total weight of lubricant contained in the system as a percentage of total of lubricant and refrigerant contained in the system.

Numbered Embodiment 81

The heat transfer system of numbered embodiment 80, wherein lubricant loading in the system is from about 20% to 30% by weight, wherein the term "lubricant loading" refers to the total weight of lubricant contained in the system as a percentage of total of lubricant and refrigerant contained in the system.

Numbered Embodiment 82

The heat transfer system of numbered embodiment 79, wherein lubricant loading in the system is from about 30% to 50% by weight, wherein the term "lubricant loading" refers to the total weight of lubricant contained in the system as a percentage of total of lubricant and refrigerant contained in the system.

Numbered Embodiment 83

The heat transfer system of numbered embodiment 82, wherein lubricant loading in the system is from about 30% to 40% by weight, wherein the term "lubricant loading" refers to the total weight of lubricant contained in the system as a percentage of total of lubricant and refrigerant contained in the system.

Numbered Embodiment 84

The heat transfer system of numbered embodiment 77, wherein lubricant loading in the system is from about 5% to 10% by weight, wherein the term "lubricant loading" refers to the total weight of lubricant contained in the system as a percentage of total of lubricant and refrigerant contained in the system.

Numbered Embodiment 85

The heat transfer system of numbered embodiment 77, wherein lubricant loading in the system is from about 8% by weight, wherein the term "lubricant loading" refers to the total weight of lubricant contained in the system as a percentage of total of lubricant and refrigerant contained in the system.

Numbered Embodiment 86

A method of cooling in a heat transfer system comprising an evaporator, a condenser and a compressor, the process comprising the steps of i) condensing a heat transfer composition of any one of numbered embodiments 16 to 75 and ii) evaporating the composition in the vicinity of body or article to be cooled; wherein the evaporator temperature of the heat transfer system is in the range of from about −40° C. to about −12° C.

Numbered Embodiment 87

A method of cooling in a heat transfer system comprising an evaporator, a condenser and a compressor, the process comprising the steps of i) condensing a refrigerant composition of any one of numbered embodiments 1 to 15 and ii) evaporating the composition in the vicinity of body or article to be cooled; wherein the evaporator temperature of the heat transfer system is in the range of from about −40° C. to about −12° C.

Numbered Embodiment 88

A method of cooling in a heat transfer system comprising an evaporator, a condenser and a compressor, the process comprising the steps of i) condensing a heat transfer composition of any one of numbered embodiments 16 to 75 and ii) evaporating the composition in the vicinity of body or article to be cooled; wherein the evaporator temperature of the heat transfer system is in the range of from about −35° C. to about −25° C.

Numbered Embodiment 89

A method of cooling in a heat transfer system comprising an evaporator, a condenser and a compressor, the process comprising the steps of i) condensing a refrigerant composition of any one of numbered embodiments 1 to 15 and ii) evaporating the composition in the vicinity of body or article to be cooled; wherein the evaporator temperature of the heat transfer system is in the range of from about −35° C. to about −25° C.

Numbered Embodiment 90

A method of cooling in a heat transfer system comprising an evaporator, a condenser and a compressor, the process comprising the steps of i) condensing a heat transfer composition of any one of numbered embodiments 16 to 75, in the vicinity of a body or article to be heated and ii) evaporating the composition; wherein the evaporator temperature of the heat transfer system is in the range of about −12° C. to about 0° C.

Numbered Embodiment 91

A method of cooling in a heat transfer system comprising an evaporator, a condenser and a compressor, the process comprising the steps of i) condensing a heat transfer composition of any one of numbered embodiments 16 to 75, in the vicinity of a body or article to be heated and ii) evaporating the composition; wherein the evaporator temperature of the heat transfer system is in the range of about −10° C. to about −6.7° C.

Numbered Embodiment 92

A method of cooling in a heat transfer system comprising an evaporator, a condenser and a compressor, the process comprising the steps of i) condensing a refrigerant of any one of numbered embodiments 1 to 15 and ii) evaporating the composition in the vicinity of body or article to be cooled; wherein the evaporator temperature of the heat transfer system is in the range of from about −40° C. to about −12° C.

Numbered Embodiment 93

A method of cooling in a heat transfer system comprising an evaporator, a condenser and a compressor, the process comprising the steps of i) condensing a heat transfer composition of any one of numbered embodiments 16 to 75 and ii) evaporating the composition in the vicinity of body or article to be cooled; wherein the evaporator temperature of the heat transfer system is in the range of from about −40° C. to about −12° C.

Numbered Embodiment 94

A method of heating in a heat transfer system comprising an evaporator, a condenser and a compressor, the process comprising the steps of i) condensing a refrigerant of any one of numbered embodiments 1 to 15, in the vicinity of a body or article to be heated and ii) evaporating the composition; wherein the evaporator temperature of the heat transfer system is in the range of about −35° C. to about −25° C.

Numbered Embodiment 95

A method of heating in a heat transfer system comprising an evaporator, a condenser and a compressor, the process comprising the steps of i) condensing a heat transfer composition of any one of numbered embodiments 16 to 75, in the vicinity of a body or article to be heated and ii) evaporating the composition; wherein the evaporator temperature of the heat transfer system is in the range of about −35° C. to about −25° C.

Numbered Embodiment 96

A method of cooling in a heat transfer system comprising an evaporator, a condenser and a compressor, the process comprising the steps of i) condensing a refrigerant of any one of numbered embodiments 1 to 15, in the vicinity of a body or article to be heated and ii) evaporating the composition; wherein the evaporator temperature of the heat transfer system is in the range of about −12° C. to about −0° C.

Numbered Embodiment 97

A method of cooling in a heat transfer system comprising an evaporator, a condenser and a compressor, the process comprising the steps of i) condensing a refrigerant of any one of numbered embodiments 1 to 15, in the vicinity of a body or article to be heated and ii) evaporating the composition; wherein the evaporator temperature of the heat transfer system is in the range of about −10° C. to about −6.7° C.

Numbered Embodiment 98

A method of heating in a heat transfer system comprising an evaporator, a condenser and a compressor, the process comprising the steps of i) condensing a refrigerant of any one of numbered embodiments 1 to 15, in the vicinity of a body or article to be heated and ii) evaporating the composition; wherein the evaporator temperature of the heat transfer system is in the range of about −10° C. to about −6.7° C.

Numbered Embodiment 98a

A method of heating in a heat transfer system comprising an evaporator, a condenser and a compressor, the process comprising the steps of i) condensing a heat temperature composition of any one of numbered embodiments 16 to 71, in the vicinity of a body or article to be heated and ii) evaporating the composition; wherein the evaporator temperature of the heat transfer system is in the range of about −10° C. to about −6.7° C.

Numbered Embodiment 98b

A method of heating in a heat transfer system comprising an evaporator, a condenser and a compressor, the process comprising the steps of i) condensing a refrigerant composition of any one of numbered embodiments 1 to 15, in the vicinity of a body or article to be heated and ii) evaporating the composition; wherein the evaporator temperature of the heat transfer system is in the range of about −10° C. to about −6.7° C.

Numbered Embodiment 98c

A method of heating in a heat transfer system comprising an evaporator, a condenser and a compressor, the process comprising the steps of i) condensing a heat temperature composition of any one of numbered embodiments 16 to 71, in the vicinity of a body or article to be heated and ii) evaporating the composition; wherein the evaporator temperature of the heat transfer system is in the range of about −12° C. to about −0° C.

Numbered Embodiment 98d

A method of heating in a heat transfer system comprising an evaporator, a condenser and a compressor, the process comprising the steps of i) condensing a refrigerant composition of any one of numbered embodiments 1 to 15, in the vicinity of a body or article to be heated and ii) evaporating the composition; wherein the evaporator temperature of the heat transfer system is in the range of about −12° C. to about −0° C.

Numbered Embodiment 99

A method of heating or cooling according to any one of numbered embodiments 86 to 98d wherein the heat transfer system is a refrigeration system.

Numbered Embodiment 100

The method of numbered embodiment 99, wherein the refrigeration system is a low temperature refrigeration system, a medium temperature refrigeration system, a commercial refrigerator, a commercial freezer, an ice machine, a vending machine, a transport refrigeration system, an industrial freezer, an industrial refrigerator, a chiller, low temperature supermarket refrigeration and medium temperature supermarket refrigeration.

Numbered Embodiment 101

The method of numbered embodiment 99, wherein the refrigeration system is a low temperature refrigeration system.

Numbered Embodiment 102

The method of numbered embodiment 99, wherein the refrigeration system is a medium temperature refrigeration system.

Numbered Embodiment 103

The method of numbered embodiment 99, wherein the refrigeration system is a commercial refrigerator.

Numbered Embodiment 104

The method of numbered embodiment 99, wherein the refrigeration system is a commercial freezer.

Numbered Embodiment 105

The method of numbered embodiment 99, wherein the refrigeration system is an ice machine.

Numbered Embodiment 106

The method of numbered embodiment 99, wherein the refrigeration system is a vending machine.

Numbered Embodiment 107

The method of numbered embodiment 99, wherein the refrigeration system is a transport refrigeration system.

Numbered Embodiment 107a

The method of numbered embodiment 99, wherein the refrigeration system is a low temperature transport refrigeration system.

Numbered Embodiment 107b

The method of numbered embodiment 99, wherein the refrigeration system is a medium temperature transport refrigeration system.

Numbered Embodiment 108

The method of numbered embodiment 99, wherein the refrigeration system is an industrial freezer.

Numbered Embodiment 109

The method of numbered embodiment 99, wherein the refrigeration system is an industrial refrigerator.

Numbered Embodiment 110

The method of numbered embodiment 99, wherein the refrigeration system is a chiller.

Numbered Embodiment 110a

The method of numbered embodiment 99, wherein the refrigeration system is a medium temperature chiller.

Numbered Embodiment 110b

The method of numbered embodiment 99, wherein the refrigeration system is a medium temperature supermarket refrigerator.

Numbered Embodiment 110c

The method of numbered embodiment 99, wherein the refrigeration system is a low temperature supermarket refrigerator.

Numbered Embodiment 111

The method of numbered embodiments 99 to 110c wherein the refrigeration system has an evaporator temperature in the range of about −12 to about 0° C., particularly about −8° C.

Numbered Embodiment 112

The method of numbered embodiments 99 to 110c, wherein the refrigeration system has an evaporator temperature in the range of about −40 to about −12° C., particularly about −23° C. or preferably about −32° C.

Numbered Embodiment 113

The method of numbered embodiment 111, wherein the refrigeration system has an air-to-refrigerant evaporator to chill a food or beverage, a reciprocating, scroll or screw or rotary compressor, an air-to-refrigerant condenser to exchange heat with the ambient air, and a thermal or electronic expansion valve, wherein the refrigerant evaporating temperature is in the range of about −12 to about 0° C. and the condensing temperature is in the range of about 40 to about 70° C., or about 20 to about 70° C.

Numbered Embodiment 114

The method of numbered embodiment 112, wherein the refrigeration system has an air-to-refrigerant evaporator to chill a food or beverage, a reciprocating, scroll or rotary compressor, an air-to-refrigerant condenser to exchange heat with the ambient air, and a thermal or electronic expansion valve, wherein the refrigerant evaporating temperature is in the range of about −40 to about −12° C. and the condensing temperature is in the range of about 40 to about 70° C., or about 20 to about 70° C.

Numbered Embodiment 115

The method of numbered embodiment 113 or 114, wherein the refrigeration system is a chiller.

Numbered Embodiment 116

The method of numbered embodiment 115, wherein the chiller has an evaporating temperature in the range of about 0 to about 10° C.

Numbered Embodiment 117

The method of any one of numbered embodiments 86 to 116 wherein said evaporator is an air-to-refrigerant evaporator chilling a food or beverage.

Numbered Embodiment 118

The method of any one of numbered embodiments 86 to 117 wherein said compressor is a reciprocating compressor.

Numbered Embodiment 119

The method of any one of numbered embodiments 86 to 117 wherein said compressor is a scroll compressor.

Numbered Embodiment 120

The method of any one of numbered embodiments 86 to 117 wherein said compressor is a screw compressor.

Numbered Embodiment 121

The method of any one of numbered embodiments 86 to 117 wherein said compressor is a rotary compressor.

Numbered Embodiment 121a

The method of any one of numbered embodiments 86 to 117 wherein said compressor is a centrifugal compressor.

Numbered Embodiment 122

The method of any one of numbered embodiments 86 to 121 wherein said condenser is an air-to-refrigerant condenser exchanging heat with ambient air.

Numbered Embodiment 123

The method of any one of numbered embodiments 86 to 122 wherein said system further comprises a thermal expansion valve.

Numbered Embodiment 124

The method of any one of numbered embodiments 86 to 122 wherein said system further comprises an electronic expansion valve.

Numbered Embodiment 124a

The method of any one of numbered embodiments 86 to 122 wherein said system further comprises a capillary tube.

Numbered Embodiment 124b

The heat transfer system of any one of numbered embodiments 86 to 122 wherein said system further comprises a fixed orifice.

Numbered Embodiment 125

The method of any numbered embodiments 86 to 124 wherein said system further comprises a vapor injector and/or liquid injector.

Numbered Embodiment 125a

The method of any one of numbered embodiments 86 to 125 wherein the evaporator and the condenser are independently selected from a finned tube heat exchanger, a microchannel heat exchanger, a shell and tube, a plate heat exchanger, and a tube-in-tube heat exchanger.

Numbered Embodiment 126

The method of any numbered embodiments 116 to 125 wherein the condensing temperature is in the range of 40° C. to 70° C.

Numbered Embodiment 127

The method of any numbered embodiments 116 to 125 wherein the condensing temperature is in the range of 20° C. to 70° C.

Numbered Embodiment 128

The method of numbered embodiment 115, wherein the chiller is a positive displacement chiller, more particularly an air cooled or water cooled direct expansion chiller, which is conventionally singularly packaged.

Numbered Embodiment 129

The method of numbered embodiment 115, wherein the chiller is a positive displacement chiller, more particularly an air cooled or water cooled direct expansion chiller, which is modular packaged.

Numbered Embodiment 130

A method of replacing an existing refrigerant contained in a heat transfer system comprising removing at least a portion of said existing refrigerant from said system, said existing refrigerant being R-404A and replacing at least a portion of said existing refrigerant by introducing into said system, a refrigerant according to any one of numbered embodiments 1 to 15 or a heat transfer composition according to any one of numbered embodiments 16 to 78.

Numbered Embodiment 131

The method of numbered embodiment 130, wherein the portion of the existing R-404A refrigerant is at least about 5% by weight of the R-404A from the system.

Numbered Embodiment 132

The method of numbered embodiment 130, wherein the portion of the existing R-404A refrigerant is at least about 10% by weight of the R-404A from the system.

Numbered Embodiment 133

The method of numbered embodiment 130, wherein the portion of the existing R-404A refrigerant is at least about 25% by weight of the R-404A from the system.

Numbered Embodiment 134

The method of numbered embodiment 130, wherein the portion of the existing R-404A refrigerant is at least about 50% by weight of the R-404A from the system.

Numbered Embodiment 135

The method of numbered embodiment 130, wherein the portion of the existing R-404A refrigerant is at least about 75% by weight of the R-404A from the system.

Numbered Embodiment 136

The method of numbered embodiment 130, wherein the portion of the existing R-404A refrigerant is about 100% by weight of the R-404A from the system

Numbered Embodiment 137

The method of any one of numbered embodiments 130 to 136, wherein the system is a low temperature refrigeration system, a medium temperature refrigeration system, a commercial refrigerator, a commercial freezer, an ice machine, a vending machine, a transport refrigeration system, an industrial freezer, an industrial refrigerator, a chiller or a supermarket refrigeration system.

Numbered Embodiment 137a

The method of numbered embodiment 137, wherein the system is a low temperature refrigeration system.

Numbered Embodiment 137b

The method of numbered embodiment 137, wherein the system is a medium temperature refrigeration system.

Numbered Embodiment 137c

The method of numbered embodiment 137, wherein the system is a commercial refrigerator.

Numbered Embodiment 137d

The method of numbered embodiment 137, wherein the system is an ice machine.

Numbered Embodiment 137e

The method of numbered embodiment 137, wherein the system is a vending machine.

Numbered Embodiment 137f

The method of numbered embodiment 137, wherein the system is a transport refrigeration system.

Numbered Embodiment 137g

The method of numbered embodiment 137, wherein the system is a low temperature transport refrigeration system.

Numbered Embodiment 137h

The method of numbered embodiment 137, wherein the system is a medium temperature transport refrigeration system.

Numbered Embodiment 137i

The method of numbered embodiment 137, wherein the system is an industrial freezer.

Numbered Embodiment 137h

The method of numbered embodiment 137, wherein the system is an industrial refrigerator.

Numbered Embodiment 137h

The method of numbered embodiment 137, wherein the system is a chiller.

Numbered Embodiment 138

The method of numbered embodiments 137 to 137h, wherein the refrigeration system has an evaporator temperature in the range of about −12 to about 0° C., particularly about −8° C.

Numbered Embodiment 139

The method of numbered embodiment 137, wherein the refrigeration system has an evaporator temperature in the range of about −40 to about −12° C., particularly about −23° C. or preferably about −32° C.

Numbered Embodiment 140

The use of a heat transfer composition according to any one of numbered embodiments 16 to 75, in a refrigeration system, wherein the refrigeration system is a low temperature refrigeration system, a medium temperature refrigeration system, a commercial refrigerator, a commercial freezer, an ice machine, a vending machine, a transport refrigeration system, an industrial freezer, an industrial refrigerator or a chiller.

Numbered Embodiment 141

The use of a heat transfer composition according to any one of numbered embodiments 16 to 75 in a low temperature refrigeration system.

Numbered Embodiment 141a

The use of a heat transfer composition according to numbered embodiment 141 wherein the refrigeration system is a low temperature commercial refrigerator.

Numbered Embodiment 142

The use of a heat transfer composition according to any one of numbered embodiments 16 to 75 in a medium temperature refrigeration system.

Numbered Embodiment 142a

The use of a heat transfer composition according to numbered embodiment 142 wherein the medium temperature refrigeration system is a bottle cooler.

Numbered Embodiment 142b

The use of a heat transfer composition according to any one of numbered embodiments 16 to 75, wherein the system is a commercial refrigerator.

Numbered Embodiment 142c

The use of a heat transfer composition according to any one of numbered embodiments 16 to 75, wherein the system is an ice machine.

Numbered Embodiment 142d

The use of a heat transfer composition according to any one of numbered embodiments 16 to 75, wherein the system is a vending machine.

Numbered Embodiment 142e

The use of a heat transfer composition according to any one of numbered embodiments 16 to 75, wherein the system is a transport refrigeration system.

Numbered Embodiment 142f

The use of a heat transfer composition according to any one of numbered embodiments 16 to 75, wherein the system is a low temperature transport refrigeration system.

Numbered Embodiment 142g

The use of a heat transfer composition according to any one of numbered embodiments 16 to 75, wherein the system is a medium temperature transport refrigeration system.

Numbered Embodiment 142h

The use of a heat transfer composition according to any one of numbered embodiments 16 to 75, wherein the system is an industrial freezer.

Numbered Embodiment 142i

The use of a heat transfer composition according to any one of numbered embodiments 16 to 75, wherein the system is an industrial refrigerator.

Numbered Embodiment 142j

The use of a heat transfer composition according to any one of numbered embodiments 16 to 75, wherein the system is a chiller.

Numbered Embodiment 143

The use of numbered embodiments 142 to 142j, wherein the refrigeration system has an evaporator temperature in the range of about −12 to about 0° C., particularly about −8° C.

Numbered Embodiment 144

The use of numbered embodiment 143, wherein the refrigeration system has an evaporator temperature in the range of about −40 to about −12° C., particularly about −23° C. or preferably about −32° C.

Numbered Embodiment 145

The use of numbered embodiment 142, 142a-j or 143, wherein the refrigeration system has an air-to-refrigerant evaporator to chill a food or beverage, a reciprocating, scroll or screw or rotary compressor, an air-to-refrigerant condenser to exchange heat with the ambient air, and a thermal or electronic expansion valve, wherein the refrigerant evaporating temperature is in the range of about −12 to about 0° C. and the condensing temperature is in the range of about 40 to about 70° C., or about 20 to about 70° C.

Numbered Embodiment 146

The use of numbered embodiment 141 or 144, wherein the refrigeration system has an air-to-refrigerant evaporator to chill a food or beverage, a reciprocating, scroll or rotary compressor, an air-to-refrigerant condenser to exchange heat with the ambient air, and a thermal or electronic expansion valve, wherein the refrigerant evaporating temperature is in the range of about −40 to about −12° C. and the condensing temperature is in the range of about 40 to about 70° C., or about 20 to about 70° C.

Numbered Embodiment 147

The use of numbered embodiment 144, wherein the refrigeration system is a chiller.

Numbered Embodiment 148

The use of numbered embodiment 147, wherein the chiller has a condensing temperature in the range of about 40 to about 70° C.

Numbered Embodiment 149

The use of numbered embodiments 147 or 148, wherein the chiller is a positive displacement chiller, more particularly an air cooled or water cooled direct expansion chiller, which is either modular or conventionally singularly packaged.

Numbered Embodiment 150

The use of numbered embodiment 140, wherein the refrigeration system is a commercial refrigeration system, particularly a commercial refrigerator, commercial freezer, an ice machine, or a vending machine.

Numbered Embodiment 151

The use of a heat transfer composition according to any one of numbered embodiments 16 to 75 to replace R-404A in a medium temperature refrigeration system having an evaporator temperature in the range of about −12 to about 0° C., particularly about −8° C.

Numbered Embodiment 152

The use of a heat transfer composition according to any one of numbered embodiments 16 to 75 to replace R-404A in a low temperature refrigeration system having an evaporator temperature in the range of about −40 to about −12° C., particularly about −23° C. or preferably about −32° C.

Numbered Embodiment 153

The use of a heat transfer composition according to any one of numbered embodiments 16 to 75 to replace R-404A in a vapor injection refrigeration system.

Numbered Embodiment 154

The use of a heat transfer composition according to any one of numbered embodiments 16 to 75 to retrofit R-404A in a vapor injection refrigeration system.

Numbered Embodiment 155

A refrigerant of any one of numbered embodiments 1 to 15 wherein said refrigerant
(a) has an efficiency (COP) from about 95% to about 105% of the efficiency of R404A in said system and/or used in said method; and
(b) (b) has a capacity from about 95% to about 105% of the capacity of R404A in said system and/or used in said method.

Numbered Embodiment 156

The refrigerant of numbered embodiment 155, wherein the refrigerant is provided to replace the R404A refrigerant in a system.

Numbered Embodiment 157

The refrigerant of numbered embodiment 155 or 156, wherein the refrigerant
(a) has an efficiency (COP) from about 100% to about 105% of the efficiency of R404A in said system and/or used in said method; and
(b) has a capacity from about 98% to about 105% of the capacity of R404A in said system and/or used in said method.

Numbered Embodiment 158

The refrigerant of any one of numbered embodiments 155 to 157, wherein the refrigerant has a discharge temperature which is not greater than 10° C. higher than that of R-404A in a heat transfer system in which the refrigerant is used to replace the R-404A refrigerant.

Numbered Embodiment 159

The refrigerant of any one of numbered embodiments 155 to 157, wherein the refrigerant has a compressor pressure ratio of from 95 to 105% of the compressor pressure ratio of R-40 in a heat transfer system, in which the refrigerant is used to replace the R-404A refrigerant.

Numbered Embodiment 160

The refrigerant of any one of numbered embodiments 155 to 158, wherein the refrigerant has an evaporator glide of less than 2° C., preferably less than 1.5° C.

Numbered Embodiment 161

The refrigerant of any one of numbered embodiments 1 to 15 having a performance efficiency which is higher than 95% of R404A.

Numbered Embodiment 162

The refrigerant of any one of numbered embodiments 1 to 15 having a performance capacity which is higher than 95% of R404A.

Numbered Embodiment 163

The refrigerant of any of numbered embodiments 1 to 15 having a discharge temperature which is lower than 150° C., preferably lower than 135° C.

Numbered Embodiment 164

The refrigerant of any one of numbered embodiments 1 to 15 which is thermally stable based on the standard sealed tube testing according to ANSI/ASHRAE Standard 97-2007.

Numbered Embodiment 165

The refrigerant of any one of numbered embodiments 1 to 15, wherein said refrigerant
(a) has an efficiency (COP) from about 95% to about 105% of the efficiency of R404A in said system and/or used in said method; and
(b) is non-flammable as determined in accordance with the Non-Flammability Test.

Numbered Embodiment 166

The refrigerant of any one of numbered embodiments 1 to 15 or 159 to 165, wherein said refrigerant
(a) has an efficiency (COP) from about 95% to about 105% of the efficiency of R404A in said system and/or used in said method;
(b) is non-flammable as determined in accordance with the Non-Flammability Test; and
(c) produces in the system and/or the methods a compressor discharge temperature that is not greater than 10° C. higher than that of R-404A.

Numbered Embodiment 167

The refrigerant of any one of numbered embodiments 1 to 15 or 159 to 165, wherein said refrigerant
(a) has an efficiency (COP) from about 95% to about 105% of the efficiency of R404A in said system and/or used in said method;
(b) is non-flammable as determined in accordance with the Non-Flammability Test;
(c) produces in the system and/or the methods a compressor discharge temperature that is not greater than 10° C. higher than that of R-404A; and
(d) produces in the system and/or the methods a compressor pressure ratio that is from about 95% to about 105% of the compressor pressure ratio of R-404A.

Numbered Embodiment 168

A heat transfer system comprising a compressor, an evaporator, a condenser and an expansion device in communication with each other, a refrigerant of any one of numbered embodiments 1 to 15, a lubricant according to any one of numbered embodiments 64 to 71 and a sequestration material in the system, wherein the sequestration material preferably comprises:
  i. copper or a copper alloy, or
  ii. activated alumina, or
  iii. a zeolite molecular sieve comprising copper, silver, lead or a combination thereof, or
  iv. an anion exchange resin, or
  v. a moisture-removing material, preferably a moisture-removing molecular sieve, or
  vi. a combination of two or more of the above.

Numbered Embodiment 169

The heat transfer system of numbered embodiment 168, wherein the sequestration material is a copper alloy, preferably comprising at least 5 wt %, at least 15 wt %, at least 30 wt %, at least 50 wt %, at least 70 wt % or at least 90 wt % of copper, based on the total weight of the copper alloy.

Numbered Embodiment 170

The heat transfer system of numbered embodiment 168, wherein the sequestration material is a copper alloy, preferably comprising from about 5 wt % to about 95 wt %, from about 10 wt % to about 90 wt %, from about 15 wt % to about 85 wt %, from about 20 wt % to about 80 wt %, from about 30 wt % to about 70 wt %, or from about 40 wt % to about 60 wt % of copper, based on the total weight of the copper alloy.

Numbered Embodiment 171

The heat transfer system of numbered embodiment 168, wherein the sequestration material is copper, preferably wherein the copper contains at least 99 wt %, more preferably at least 99.5 wt %, more preferably at least 99.9 wt % of elemental copper.

Numbered Embodiment 172

The heat transfer system of numbered embodiment 171, wherein the copper is in the form of a mesh, wool, spheres, cones, cylinders.

Numbered Embodiment 173

The heat transfer system of numbered embodiments 169 or 170, wherein the copper alloy is in the form of a mesh, wool, spheres, cones, cylinders.

Numbered Embodiment 174

The heat transfer system of any one of numbered embodiments 169 to 173, wherein the BET surface area of the copper or copper alloy is at least about 10 $m^2/g$, at least about 20 $m^2/g$, at least about 30 $m^2/g$, at least about 40 $m^2/g$ or at least about 50 $m^2/g$.

Numbered Embodiment 175

The heat transfer system of any one of numbered embodiments 169 to 173, wherein the BET surface area of the copper or copper alloy is from 0.01 to 1.5 $m^2$ per kg of refrigerant, preferably from 0.02 to 0.5 $m^2$ per kg of refrigerant.

Numbered Embodiment 176

The heat transfer system of numbered embodiment 175, wherein the BET surface area of the copper or copper alloy is about 0.08 $m^2$ per kg of refrigerant.

Numbered Embodiment 177

The heat transfer system of numbered embodiment 168, wherein the sequestration materials is a zeolite molecular sieve and the zeolite molecular sieve contains an amount of copper, silver, lead or a combination thereof, preferably silver, of from 1% to 30% by weight, or preferably from 5% to 20% by weight, based on the total weight of the zeolite.

Numbered Embodiment 178

The heat transfer system of numbered embodiments 168 or 177, wherein the zeolite molecular sieve has openings which have a size across their largest dimension of from 5 to 40 Angstroms, such as from 15 to 35 Angstroms or 35 Angstroms.

Numbered Embodiment 179

The heat transfer system of numbered embodiments 177 or 178, wherein when the zeolite molecular sieve comprises copper, silver, lead or a combination thereof, the zeolite molecular sieve is present in an amount of from about 1 wt % to about 30 wt %, such as from about 2 wt % to about 25 wt % relative to the total amount of zeolite molecular sieve, refrigerant and lubricant in the heat transfer system.

Numbered Embodiment 180

The heat transfer system of any one of numbered embodiments 177 to 179, wherein when the zeolite molecular sieve comprises silver, the zeolite molecular sieve is present in an amount of at least 5% parts by weight (pbw), preferably from about 5 pbw to about 30 pbw, or from about 5 pbw to about 20 pbw, per 100 parts by weight of lubricant (pphl) based on the total amount of zeolite molecular sieve and lubricant in the heat transfer system.

Numbered Embodiment 181

The heat transfer system of any one of numbered embodiments 177 to 179, wherein when the zeolite molecular sieve comprises silver, the amount of the silver present in the molecular sieve is from about 1% to about 30% by weight based on the total weight of the zeolite.

Numbered Embodiment 182

The heat transfer system of any one of numbered embodiments 177 to 179, wherein when the zeolite molecular sieve comprises silver the molecular sieve is present in an amount of at least 10 pphl, preferably from about 10 pphl to about 30 pphl, preferably from about 15 pphl to about 30 pphl, or from about 10 pphl to 20 pphl, preferably from about 15 pphl to about 20 pphl by weight relative to the total amount of molecular sieve, and lubricant in the heat transfer system.

Numbered Embodiment 183

The heat transfer system of any one of numbered embodiments 177 to 179, wherein when the zeolite molecular sieve comprises silver, the amount of the silver present in the molecular sieve is from about 5% to about 20% by weight, based on the total weight of the zeolite.

Numbered Embodiment 184

The heat transfer system of any one of numbered embodiments 177 to 179, wherein when the zeolite molecular sieve is present in an amount of at least about 5 pphl relative to the total amount of molecular sieve and lubricant in the system.

Numbered Embodiment 185

The heat transfer system of any one of numbered embodiments 177 to 179, wherein when the zeolite molecular sieve is present in an amount of at least about 15 pphl relative to the total amount of molecular sieve and lubricant in the system.

Numbered Embodiment 186

The heat transfer system of any one of numbered embodiments 177 to 179, wherein when the zeolite molecular sieve is present in an amount of at least about 18 pphl relative to the total amount of molecular sieve and lubricant in the system.

Numbered Embodiment 187

The heat transfer system of any one of numbered embodiments 177 to 179, wherein when the zeolite molecular sieve is present in an amount of at least about 21 pphl relative to the total amount of molecular sieve and lubricant in the system.

Numbered Embodiment 188

The heat transfer system of any one of numbered embodiments 177 to 179, wherein when the zeolite molecular sieve is present in an amount of from about 15 pphl to about 30 pphl relative to the total amount of molecular sieve and lubricant in the system.

Numbered Embodiment 189

The heat transfer system of any one of numbered embodiments 177 to 179, wherein the zeolite molecular sieve is present in an amount of from about 18 pphl to about 25 pphl relative to the total amount of molecular sieve and lubricant in the system.

Numbered Embodiment 190

The heat transfer system of numbered embodiment 168, wherein the sequestration material is an anion exchange resin.

Numbered Embodiment 191

The heat transfer system of numbered embodiment 190, wherein the anion exchange resin is a strongly basic anion exchange resin, preferably a type 1 resin or a type 2 resin, more preferably a type 1 strongly basic anion exchange resin.

Numbered Embodiment 191a

The heat transfer system of numbered embodiment 190, wherein the anion exchange resin comprises an industrial grade weakly basic anion exchange adsorbent resin.

Numbered Embodiment 191b

The heat transfer system of numbered embodiment 190, wherein the anion exchange resin comprises a positively charged matrix and exchangeable anions.

Numbered Embodiment 192

The heat transfer system of numbered embodiments 190 or 191, wherein the anion exchange resin is provided as beads.

Numbered Embodiment 193

The heat transfer system of numbered embodiment 192, wherein the beads have a size across their largest dimension of from about 0.3 mm to about 1.2 mm when dry.

Numbered Embodiment 194

The heat transfer system of any one of numbered embodiments 190 to 193, wherein the anion exchange resin is present in an amount of from about 1 pphl to about 60 pphl based on the total amount of anion exchange resin and lubricant in the system.

Numbered Embodiment 195

The heat transfer system of numbered embodiment 194, wherein the anion exchange resin is present in an amount of from about 5 pphl to about 60 pphl based on the total amount of anion exchange resin and lubricant in the system.

Numbered Embodiment 196

The heat transfer system of numbered embodiment 195, wherein the anion exchange resin is present in an amount of from about 20 pphl to about 50 pphl based on the total amount of anion exchange resin and lubricant in the system.

Numbered Embodiment 197

The heat transfer system of numbered embodiment 169, wherein the anion exchange resin is present in an amount of from about 20 pphl to about 30 pphl based on the total amount of anion exchange resin and lubricant in the system.

Numbered Embodiment 198

The heat transfer system of numbered embodiment 195, wherein the anion exchange resin is present in an amount of from about 1 pphl to about 25 pphl based on the total amount of anion exchange resin and lubricant in the system.

Numbered Embodiment 199

The heat transfer system of numbered embodiment 198, wherein the anion exchange resin is present in an amount of from about 2 pphl to about 20 pphl based on the total amount of anion exchange resin and lubricant in the system.

Numbered Embodiment 200

The heat transfer system of numbered embodiment 199, wherein the anion exchange resin is present in an amount of at least about 10 pphl relative to the total amount of anionic exchange resin and lubricant in the system.

Numbered Embodiment 201

The heat transfer system of numbered embodiment 199, wherein the anion exchange resin is present in an amount of at least about 15 pphl relative to the total amount of anionic exchange resin and lubricant in the system.

Numbered Embodiment 202

The heat transfer system of numbered embodiment 199, wherein the anion exchange resin is present in an amount of from about 10 pphl to about 25 pphl relative to the total amount of anionic exchange resin and lubricant in the system.

Numbered Embodiment 203

The heat transfer system of numbered embodiment 199, wherein the anion exchange resin is present in an amount of from about 15 pphl to about 20 pphl relative to the total amount of anionic exchange resin and lubricant in the system.

Numbered Embodiment 204

The heat transfer system of numbered embodiment 199, wherein the anion exchange resin is present in an amount of from about 4 pphl to about 16 pphl relative to the total amount of anionic exchange resin and lubricant in the system.

Numbered Embodiment 205

The heat transfer system of numbered embodiment 168, wherein the moisture removing material is present and is a moisture-removing molecular sieve, preferably wherein said moisture-removing molecular sieve is a sodium aluminosilicate molecular sieve, preferably crystalline metal aluminosilicates having a three dimensional interconnecting network of silica and alumina tetrahedra.

Numbered Embodiment 206

The heat transfer system of numbered embodiment 205, wherein the amount of moisture removing material and particularly the moisture-removing molecular sieve, and even more preferably sodium aluminosilicate molecular sieve, is preferably from about 15 pphl to about 60 pphl by weight, and even more preferably from about 30 pphl to 45 pphl by weight.

Numbered Embodiment 207

The heat transfer system of numbered embodiment 168, wherein the sequestration material comprises activated alumina, preferably wherein the activated alumina is present in an amount of from about 1 pphl to about 60 pphl by weight.

Numbered Embodiment 208

The heat transfer system of numbered embodiment 207, wherein the sequestration material comprises activated alumina, preferably wherein the activated alumina is present in an amount of from about 5 pphl to about 60 pphl by weight.

Numbered Embodiment 209

The heat transfer system of any one of numbered embodiments 168 to 208, comprising an anion exchange resin and a zeolite molecular sieve.

Numbered Embodiment 210

The heat transfer system of any one of numbered embodiments 168 to 209, comprising an combination of two or more sequestration materials.

Numbered Embodiment 210a

The heat transfer system of numbered embodiment 210 that includes at least one of sequestration materials (i)-(v).

Numbered Embodiment 210b

The heat transfer system of numbered embodiment 210 that includes at least two of sequestration materials (i)-(v).

Numbered Embodiment 210c

The heat transfer system of numbered embodiment 210 that includes at least two of sequestration materials (ii)-(v).

Numbered Embodiment 210d

The heat transfer system of numbered embodiment 210 that includes at least three of sequestration materials (iii)-(v).

Numbered Embodiment 210e

The heat transfer system of numbered embodiment 210 that includes sequestration material from each of categories (ii)-(v).

Numbered Embodiment 210f

The heat transfer system of numbered embodiment 210 that includes a sequestration material that includes a material from each of categories (ii)-(v), and wherein the material from category (iii) comprises silver.

Numbered Embodiment 211

The heat transfer system of numbered embodiment 209, wherein the weight ratio (when dry) of anion exchange resin to zeolite molecular sieve is preferably in the range of from about 10:90 to about 90:10, from about 20:80 to about 80:20, from about 25:75 to about 75:25, from about 30:70 to about 70:30, or from about 60:40 to about 40:60.

Numbered Embodiment 212

The heat transfer system of numbered embodiment 209, wherein the weight ratio (when dry) of anion exchange resin to zeolite molecular sieve is about 25:75.

Numbered Embodiment 213

The heat transfer system of numbered embodiment 209, wherein the weight ratio (when dry) of anion exchange resin to zeolite molecular sieve is about 50:50.

Numbered Embodiment 214

The heat transfer system of numbered embodiment 209, wherein the weight ratio (when dry) of anion exchange resin to zeolite molecular sieve is about 75:25.

Numbered Embodiment 215

The heat transfer system of any one of numbered embodiments 168 to 214, wherein the sequestration materials are located inside an oil separator such that the liquid lubricant is in contact with the sequestration materials.

Numbered Embodiment 216

The heat transfer system of any one of numbered embodiments 168 to 214, wherein the sequestration materials are outside and downstream of an oil separator, such that the liquid lubricant is in contact with the sequestration materials.

Numbered Embodiment 217

A method for transferring heat, said method comprising:
(a) evaporating a refrigerant of any one of numbered embodiments 1 to 15, at a temperature of from about −40° C. to about −12° C. to produce a refrigerant vapor;
(b) compressing said refrigerant vapor to produce a refrigerant at discharge temperature of less than about 135° C.; and
(c) condensing the refrigerant from said compressor at a temperature of from about 20° C. to about 60° C. to produce a refrigerant vapor.

Numbered Embodiment 218

A method for transferring heat, said method comprising:
(a) evaporating a refrigerant of any one of numbered embodiments 1 to 15, at a temperature of from about −40° C. to about −12° C. to produce a refrigerant vapor;
(b) compressing said refrigerant vapor to produce a refrigerant at discharge temperature of less than about 135° C.; and
(c) condensing the refrigerant from said compressor at a temperature of from about 25° C. to about 45° C. to produce a refrigerant vapor.

Numbered Embodiment 219

A method for transferring heat, said method comprising:
(a) evaporating a refrigerant of any one of numbered embodiments 1 to 15, at a temperature in the range of from about −35° C. to about −25° C. to produce a refrigerant vapor;
(b) compressing said refrigerant vapor to produce a refrigerant at discharge temperature of less than about 135° C.; and
(c) condensing the refrigerant from said compressor at a temperature of from about 25° C. to about 45° C. to produce a refrigerant vapor.

Numbered Embodiment 220

A method for transferring heat, said method comprising:
(a) evaporating a refrigerant of any one of numbered embodiments 1 to 15, at a temperature in the range of from about −25° C. to about −12° C. to produce a refrigerant vapor;
(b) compressing said refrigerant vapor to produce a refrigerant at discharge temperature of less than about 135° C.; and
(c) condensing the refrigerant from said compressor at a temperature of from about 25° C. to about 45° C. to produce a refrigerant liquid.

Numbered Embodiment 221

A method for transferring heat, said method comprising:
(a) evaporating a refrigerant of any one of numbered embodiments 1 to 15, at a temperature in the range of from about −25° C. to about −12° C. to produce a refrigerant vapor;
(b) compressing said refrigerant vapor to produce a refrigerant at discharge temperature of less than about 135° C.; and
(c) condensing the refrigerant from said compressor at a temperature in the range of from about 20° C. to about 60° C. to produce a refrigerant liquid.

Numbered Embodiment 222

A method for transferring heat, said method comprising:
(a) evaporating a refrigerant of any one of numbered embodiments 1 to 15, at a temperature of from about −40° C. to about −12° C. to produce a refrigerant vapor;
(b) compressing said refrigerant vapor in a compressor lubricated with a POE lubricant to produce a refrigerant at a discharge temperature of less than about 135° C.;
(c) condensing the refrigerant from said compressor at a temperature of from about 20° C. to about 60° C. to produce a refrigerant vapor; and
(d) exposing at least a portion of said refrigerant and/or at least a portion of said lubricant to a sequestration material as defined in any one of numbered embodiments 168 to 214.

Numbered Embodiment 223

A method for transferring heat, said method comprising:
(a) evaporating a refrigerant of any one of numbered embodiments 1 to 15, at a temperature of from about −40° C. to about −12° C. to produce a refrigerant vapor;
(b) compressing said refrigerant vapor in a compressor lubricated with a POE lubricant to produce a refrigerant at discharge temperature of less than about 135° C.;
(c) condensing the refrigerant from said compressor at a temperature of from about 25° C. to about 45° C. to produce a refrigerant vapor; and (d) exposing at least a portion of said refrigerant and/or at least a portion of said lubricant to a sequestration material as defined in any one of numbered embodiments 168 to 214.

Numbered Embodiment 224

A method for transferring heat, said method comprising:
(a) evaporating a refrigerant of any one of numbered embodiments 1 to 15, at a temperature in the range of from about −35° C. to about −25° C. to produce a refrigerant vapor;
(b) compressing said refrigerant vapor to in a compressor lubricated with a POE lubricant produce a refrigerant at discharge temperature of less than about 135° C.;
(c) condensing the refrigerant from said compressor at a temperature of from about 25° C. to about 45° C. to produce a refrigerant vapor; and
(d) exposing at least a portion of said refrigerant and/or at least a portion of said lubricant to a sequestration material as defined in any one of numbered embodiments 168 to 214.

Numbered Embodiment 225

A method for transferring heat, said method comprising:
(a) evaporating a refrigerant of any one of numbered embodiments 1 to 15, at a temperature in the range of from about −25° C. to about −12° C. to produce a refrigerant vapor;
(b) compressing said refrigerant vapor in a compressor lubricated with a POE lubricant to produce a refrigerant at discharge temperature of less than about 135° C.;
(c) condensing the refrigerant from said compressor at a temperature of from about 25° C. to about 45° C. to produce a refrigerant liquid; and
(d) exposing at least a portion of said refrigerant and/or at least a portion of said lubricant to a sequestration material as defined in any one of numbered embodiments 168 to 214.

Numbered Embodiment 226

A method for transferring heat, said method comprising:
(a) evaporating a of any one of numbered embodiments 1 to 15, at a temperature in the range of from about −25° C. to about −12° C. to produce a refrigerant vapor;
(b) compressing said refrigerant vapor in a compressor lubricated with a POE lubricant to produce a refrigerant at discharge temperature of less than about 135° C.;
(c) condensing the refrigerant from said compressor at a temperature in the range of from about 20° C. to about 60° C. to produce a refrigerant liquid; and
(d) exposing at least a portion of said refrigerant and/or at least a portion of said lubricant to a sequestration material as defined in any one of numbered embodiments 168 to 214.

Numbered Embodiment 227

A method for transferring heat, said method comprising:
(a) evaporating a refrigerant of any one of numbered embodiments 1 to 15, at a temperature of from about −12° C. to about 0° C. to produce a refrigerant vapor;
(b) compressing said refrigerant vapor to produce a refrigerant at discharge temperature of less than about 135° C.; and
(c) condensing the refrigerant from said compressor at a temperature of from about 20° C. to about 60° C. to produce a refrigerant vapor.

Numbered Embodiment 228

A method for transferring heat, said method comprising:
(a) evaporating a refrigerant of any one of numbered embodiments 1 to 15, at a temperature of from about −10° C. to about −6.7° C. to produce a refrigerant vapor;
(b) compressing said refrigerant vapor to produce a refrigerant at discharge temperature of less than about 135° C.; and
(c) condensing the refrigerant from said compressor at a temperature of from about 25° C. to about 45° C. to produce a refrigerant vapor.

Numbered Embodiment 229

A method for transferring heat, said method comprising:
(a) evaporating a refrigerant of any one of numbered embodiments 1 to 15, at a temperature in the range of from about −12° C. to about 0° C. to produce a refrigerant vapor;
(b) compressing said refrigerant vapor to produce a refrigerant at discharge temperature of less than about 135° C.; and
(c) condensing the refrigerant from said compressor at a temperature of from about 25° C. to about 45° C. to produce a refrigerant vapor.

Numbered Embodiment 230

A method for transferring heat, said method comprising:
(a) evaporating a refrigerant of any one of numbered embodiments 1 to 15, at a temperature of from about −12° C. to about 0° C. to produce a refrigerant vapor;
(b) compressing said refrigerant vapor in a compressor lubricated with a POE lubricant to produce a refrigerant at a discharge temperature of less than about 135° C.;
(c) condensing the refrigerant from said compressor at a temperature of from about 20° C. to about 60° C. to produce a refrigerant vapor; and
(d) exposing at least a portion of said refrigerant and/or at least a portion of said lubricant to a sequestration material as defined in any one of numbered embodiments 168 to 214.

Numbered Embodiment 231

A method for transferring heat, said method comprising:
(a) evaporating a refrigerant of any one of numbered embodiments 1 to 15, at a temperature of from about −12° C. to about 0° C. to produce a refrigerant vapor;
(b) compressing said refrigerant vapor in a compressor lubricated with a POE lubricant to produce a refrigerant at discharge temperature of less than about 135° C.;
(c) condensing the refrigerant from said compressor at a temperature of from about 25° C. to about 45° C. to produce a refrigerant vapor; and
(d) exposing at least a portion of said refrigerant and/or at least a portion of said lubricant to a sequestration material as defined in any one of numbered embodiments 168 to 214.

Numbered Embodiment 232

A method for transferring heat, said method comprising:
(a) evaporating a refrigerant of any one of numbered embodiments 1 to 15, at a temperature in the range of from about −10° C. to about −6.7° C. to produce a refrigerant vapor;
(b) compressing said refrigerant vapor to in a compressor lubricated with a POE lubricant produce a refrigerant at discharge temperature of less than about 135° C.;

(c) condensing the refrigerant from said compressor at a temperature of from about 25° C. to about 45° C. to produce a refrigerant vapor; and (d) exposing at least a portion of said refrigerant and/or at least a portion of said lubricant to a sequestration material as defined in any one of numbered embodiments 168 to 214.

Numbered Embodiment 233

A heat transfer system comprising a compressor, an evaporator, a condenser and an expansion device in fluid communication with each other, a refrigerant according to any one of numbered embodiments 1 to 15, a lubricant according to any one of embodiments 64 to 71 and a sequestration material as defined in any one of numbered embodiments 168 to 214.

Numbered Embodiment 234

The heat transfer system of numbered embodiment 233, wherein the evaporator temperature is in the range of about −12 to about 0° C., preferably −10° C. to −6.7° C., particularly about −8° C.

Numbered Embodiment 235

The heat transfer system of numbered embodiment 233, wherein the evaporator temperature is in the range of about −40 to about −12° C., preferably from −35° C. to −25° C.

Numbered Embodiment 236

The heat transfer system of numbered embodiment 233, wherein the evaporator temperature is about −23° C.

Numbered Embodiment 237

The heat transfer system of numbered embodiment 233, wherein the evaporator temperature is about −32° C.

Numbered Embodiment 238

The heat transfer system of any one of numbered embodiments 233 to 237, wherein the method takes place within a refrigeration system that is a low temperature refrigeration system, a medium temperature refrigeration system, a commercial refrigerator, a commercial freezer, an ice machine, a vending machine, a transport refrigeration system, an industrial freezer, an industrial refrigerator, a chiller, or a supermarket refrigeration system.

Numbered Embodiment 239

The heat transfer system of numbered embodiment 238, wherein the refrigeration system is a low temperature refrigeration system.

Numbered Embodiment 240

The heat transfer system of numbered embodiment 238, wherein the refrigeration system is a medium temperature refrigeration system.

Numbered Embodiment 241

The heat transfer system of numbered embodiment 238, wherein the refrigeration system is a commercial refrigerator.

Numbered Embodiment 242

The heat transfer system of numbered embodiment 238, wherein the refrigeration system is a commercial freezer.

Numbered Embodiment 243

The heat transfer system of numbered embodiment 238, wherein the refrigeration system is an ice machine.

Numbered Embodiment 244

The heat transfer system of numbered embodiment 238, wherein the refrigeration system is a vending machine.

Numbered Embodiment 245

The heat transfer system of numbered embodiment 238, wherein the refrigeration system is a transport refrigeration system.

Numbered Embodiment 245a

The heat transfer system of numbered embodiment 238, wherein the refrigeration system is a low temperature transport refrigeration system.

Numbered Embodiment 245b

The heat transfer system of numbered embodiment 238, wherein the refrigeration system is a medium temperature transport refrigeration system.

Numbered Embodiment 246

The heat transfer system of numbered embodiment 238, wherein the refrigeration system is an industrial freezer.

Numbered Embodiment 247

The heat transfer system of numbered embodiment 238, wherein the refrigeration system is an industrial refrigerator.

Numbered Embodiment 248

The heat transfer system of numbered embodiment 238, wherein the refrigeration system is a chiller.

Numbered Embodiment 248a

The heat transfer system of numbered embodiment 238, wherein the refrigeration system is a low temperature supermarket refrigeration system.

Numbered Embodiment 248b

The heat transfer system of numbered embodiment 238, wherein the refrigeration system is a medium temperature supermarket refrigeration system.

Numbered Embodiment 249

The heat transfer system of any one of numbered embodiments 233 to 248b wherein said evaporator is an air-to-refrigerant evaporator chilling a food or beverage.

Numbered Embodiment 250

The heat transfer system of any one of numbered embodiments 233 to 248b wherein said compressor is a reciprocating compressor.

Numbered Embodiment 251

The heat transfer system of any one of numbered embodiments 233 to 248b wherein said compressor is a scroll compressor.

Numbered Embodiment 252

The heat transfer system of any one of numbered embodiments 233 to 248 wherein said compressor is a screw compressor.

Numbered Embodiment 253

The heat transfer system of any one of numbered embodiments 233 to 248b wherein said compressor is a rotary compressor.

Numbered Embodiment 253a

The heat transfer system of any one of numbered embodiments 233 to 248b wherein said compressor is a centrifugal compressor.

Numbered Embodiment 254

The heat transfer system of any one of numbered embodiments 233 to 248b wherein said condenser is an air-to-refrigerant condenser exchanging heat with ambient air.

Numbered Embodiment 255

The heat transfer system of any one of numbered embodiments 233 to 254 wherein said system further comprises a thermal expansion valve.

Numbered Embodiment 256

The heat transfer system of any one of numbered embodiments 233 to 254 wherein said system further comprises an electronic expansion valve.

Numbered Embodiment 256a

The heat transfer system of any one of numbered embodiments 233 to 254 wherein said system further comprises a capillary tube.

Numbered Embodiment 256b

The heat transfer system of any one of numbered embodiments 233 to 254 wherein said system further comprises a fixed orifice.

Numbered Embodiment 257

The heat transfer system of any one of numbered embodiments 233 to 256b wherein said system further comprises a vapor injector.

Numbered Embodiment 257a

The heat transfer system of any one of numbered embodiments 233 to 256b wherein the evaporator and the condenser can each independently be selected from a finned tube heat exchanger, a microchannel heat exchanger, a shell and tube, a plate heat exchanger, and a tube-in-tube heat exchanger.

Numbered Embodiment 258

The heat transfer system of any one of numbered embodiments 233 to 257a wherein the condensing temperature is in the range of 40° C. to 70° C.

Numbered Embodiment 259

The heat transfer system of any one of numbered embodiments 233 to 258 wherein the condensing temperature is in the range of 20° C. to 70° C.

Numbered Embodiment 260

The heat transfer system of numbered embodiment 248, wherein the chiller is a positive displacement chiller, more particularly an air cooled or water cooled direct expansion chiller, which is conventionally singularly packaged.

Numbered Embodiment 261

The heat transfer system of numbered embodiment 248, wherein the chiller is a positive displacement chiller, more particularly an air cooled or water cooled direct expansion chiller, which is modular packaged.

Numbered Embodiment 262

Use of a heat transfer composition according to any one of numbered embodiments 16 to 75 as a retrofit composition.

Numbered Embodiment 263

A method of retrofitting an existing heat transfer system designed to contain or containing R-404A refrigerant or which is suitable for use with R-404A refrigerant, said method comprising replacing at least a portion of the existing R-404A refrigerant with a heat transfer composition according to any one of numbered embodiments 16 to 75.

Numbered Embodiment 264

The method of numbered embodiment 263, wherein the step of replacing comprises removing at least a substantial portion of, and preferably substantially all of, the existing refrigerant and introducing a heat transfer composition according to any one of numbered embodiments 16 to 75 or a refrigerant according to any one of numbered embodiments 1 to 15 without any substantial modification of the system to accommodate the heat transfer composition or refrigerant.

Numbered Embodiment 265

The method of numbered embodiments 263 or 264, wherein the removing step comprises removing at least about 5% by weight of the R-404A from the existing system and replacing it with the heat transfer composition according to any one of numbered embodiments 16 to 75 or a refrigerant according to any one of numbered embodiments 1 to 15.

Numbered Embodiment 266

The method of numbered embodiments 263 or 264, wherein the removing step comprises removing at least about 10% by weight of the R-404A from the existing system and replacing it with the heat transfer composition according to any one of numbered embodiments 16 to 75 or a refrigerant according to any one of numbered embodiments 1 to 15.

Numbered Embodiment 267

The method of numbered embodiments 263 or 264, wherein the removing step comprises removing at least about 25% by weight of the R-404A from the existing system and replacing it with the heat transfer composition according to any one of numbered embodiments 16 to 75 or a refrigerant according to any one of numbered embodiments 1 to 15.

Numbered Embodiment 268

The method of numbered embodiments 263 or 264, wherein the removing step comprises removing at least about 50% by weight of the R-404A from the existing system and replacing it with the heat transfer composition according to any one of numbered embodiments 16 to 75 or a refrigerant according to any one of numbered embodiments 1 to 15.

Numbered Embodiment 269

The method of numbered embodiments 263 or 264, wherein the removing step comprises removing at least about 70% by weight of the R-404A from the existing system and replacing it with the heat transfer composition according to any one of numbered embodiments 16 to 75 or a refrigerant according to any one of numbered embodiments 1 to 15.

Numbered Embodiment 270

A heat transfer system comprising a refrigerant according to any one of numbered embodiments 1 to 15, a lubricant according to any one of numbered embodiments 64 to 71 and alkylated naphthalene present in an amount of from 0.1% to about 20%, preferably from about 5% to about 15%, more preferably from about 8% to about 12%, where amounts are in percent by weight based on the amount of alkylated naphthalene plus lubricant in the system.

Numbered Embodiment 271

A heat transfer system comprising a refrigerant according to any one of numbered embodiments 1 to 15, a lubricant that is a POE having a viscosity at 40° C. measured in accordance with ASTM D445 of from about 30 to about 70, and alkylated naphthalene present in an amount of from 0.1% to about 20%, preferably from about 5% to about 15%, more preferably from about 8% to about 12%, where amounts are in percent by weight based on the amount of alkylated naphthalene plus lubricant in the system.

Numbered Embodiment 272

Low temperature refrigeration methods using a refrigerant according to any one of numbered embodiments 1 to 15, where the refrigerant vapor has a degree of superheat at evaporator outlet of from about 0° C. to about 10° C. and a degree of superheat in the suction line of from about 15° C. to about 50° C.

Numbered Embodiment 273

Low temperature refrigeration methods using a refrigerant according to any one of numbered embodiments 1 to 15, where the refrigerant vapor has and a degree of superheat at evaporator outlet of from about 4° C. to about 6° C. and a degree of superheat in the suction line of from about 25° C. to about 30° C.

Numbered Embodiment 274

A method of using a refrigerant according to any one of numbered embodiments 1 to 15 to replace R-404A in a heat transfer system designed to contain or suitable for use with R-404A refrigerant.

Numbered Embodiment 275

A method of using a heat transfer composition according to any one of numbered embodiments 16 to 75 to replace R-404A in a heat transfer system designed to contain or suitable for use with R-404A refrigerant.

Numbered Embodiment 276

A method of retrofitting an existing heat transfer system designed for and containing R-404A refrigerant, without requiring substantial engineering modification of the existing system, particularly without modification of the condenser, the evaporator and/or the expansion valve using a refrigerant according to any one of numbered embodiments 1 to 15.

Numbered Embodiment 277

A method of retrofitting an existing heat transfer system designed for and containing R-404A refrigerant, without requiring substantial engineering modification of the existing system, particularly without modification of the condenser, the evaporator and/or the expansion valve using a heat transfer composition according to any one of numbered embodiments 16 to 75.

Numbered Embodiment 278

A method of using a refrigerant a refrigerant according to any one of numbered embodiments 1 to 15 as a replacement for R-404A, and in particular as a replacement for R-404A in a low temperature refrigeration system, without requiring substantial engineering modification of the existing system, particularly without modification of the condenser, the evaporator and/or the expansion valve.

Numbered Embodiment 279

A method of using a refrigerant a heat transfer composition according to any one of numbered embodiments 16 to 75 as a replacement for R-404A, and in particular as a replacement for R-404A in a low temperature refrigeration system, without requiring substantial engineering modification of the existing system, particularly without modification of the condenser, the evaporator and/or the expansion valve.

Numbered Embodiment 280

A method of retrofitting an existing heat transfer system designed to contain or containing R-404A refrigerant or which is suitable for use with R-404 refrigerant, said method comprising replacing at least a portion of the existing R-404A refrigerant with a heat transfer composition according to any one of numbered embodiments 16 to 75.

Numbered Embodiment 281

The method of numbered embodiment 280 wherein at least about 5%, about 10%, about 25%, about 50% or about 75% by weight of the R-404A is removed from the existing system and replaced with the heat transfer compositions according to any one of numbered embodiments 16 to 75.

The invention claimed is:

1. A refrigerant comprising at least about 97% by weight of the following four compounds, with each compound being present in the following relative percentages:
   about 41 to about 49% by weight trifluoroiodomethane (CF3I);
   about 36 to about 44% by weight 1,1,1,2-tetrafluoropropene (HFO-1234yf);
   about 12 to about 15% by weight difluoromethane (HFC-32); and
   1 to 3.5±0.2% by weight carbon dioxide (CO2).

2. The refrigerant of claim 1 comprising at least about 98.5% by weight of the following four compounds in the relative amounts set forth below:
   about 43 to about 47% by weight trifluoroiodomethane (CF3I);
   about 38 to about 42% by weight 1,1,1,2-tetrafluoropropene (HFO-1234yf);
   about 12 to about 15% by weight difluoromethane (HFC-32); and
   1 to 3.5±0.2% by weight carbon dioxide (CO2).

3. The refrigerant of claim 1 consisting essentially of the following four compounds in the relative amounts set forth below:
   43 to 47% by weight trifluoroiodomethane (CF3I);
   38 to 42% by weight 1,1,1,2-tetrafluoropropene (HFO-1234yf); 12 to 15% by weight difluoromethane (HFC-32); and
   1 to 3.5±0.2% by weight carbon dioxide (CO2).

4. The refrigerant of claim 1 consisting of the following four compounds in the relative amounts set forth below:
   43 to 47% by weight trifluoroiodomethane (CF3I);
   38 to 42% by weight 1,1,1,2-tetrafluoropropene (HFO-1234yf); 12 to 15% by weight difluoromethane (HFC-32); and
   1 to 3.5±0.2% by weight carbon dioxide (CO2).

5. The refrigerant of claim 1 comprising at least about 97% by weight of the following four compounds in the relative amounts set forth below:
   45±1% by weight trifluoroiodomethane (CF3I);
   40±1% by weight 1,1,1,2-tetrafluoropropene (HFO-1234yf); 13±1 by weight difluoromethane (HFC-32); and
   2%±0.5 by weight carbon dioxide (CO2).

6. The refrigerant of claim 5 comprising at least about 98.5% by weight of the following four compounds in the relative amounts set forth below:
   45±1% by weight trifluoroiodomethane (CF3I);
   40±1% by weight 1,1,1,2-tetrafluoropropene (HFO-1234yf);
   13±1% by weight difluoromethane (HFC-32); and
   2±0.5% by weight carbon dioxide (CO2), wherein said refrigerant is nonflammable as determined in accordance with the Non-Flammability Test and wherein said refrigerant has a GWP of less than 100.

7. The refrigerant of claim 4 wherein said refrigerant is nonflammable as determined in accordance with the Non-Flammability Test and wherein said refrigerant has a GWP of less than 100.

8. The refrigerant of claim 1 consisting essentially of the following four compounds in the relative amounts set forth below:
   45±1% by weight trifluoroiodomethane (CF3I);
   40±1% by weight 1,1,1,2-tetrafluoropropene (HFO-1234yf); 13±1% by weight difluoromethane (HFC-32); and
   2±0.5% by weight carbon dioxide (CO2).

9. The refrigerant of claim 1 consisting of the following four compounds in the relative amounts set forth below:
   45±1% by weight trifluoroiodomethane (CF3I);
   40±1% by weight 1,1,1,2-tetrafluoropropene (HFO-1234yf); 13±1% by weight difluoromethane (HFC-32); and
   2±0.5% by weight carbon dioxide (CO2).

10. A heat transfer composition comprising a refrigerant of claim 7.

11. The heat transfer composition of claim 10 further comprising a stabilizer comprising an alkylated naphthalene and/or a diene based compound and/or isobutylene.

12. The heat transfer composition of claim 11 further comprising a lubricant selected from the group consisting of polyol esters (POEs), polyalkylene glycols (PAGs), PAG oils, silicone oils, mineral oil, alkylbenzenes (ABs), polyvinyl ethers (PVE) and poly(alpha-olefin) (PAO).

13. The heat transfer composition of claim 12 wherein the lubricant is a polyolester (POE).

14. A heat transfer composition comprising the refrigerant of claim 1, an alkylated naphthalene stabilizer and a lubricant.

15. The heat transfer composition of claim 14 wherein said alkylated naphthalene comprises AN10 and wherein said lubricant is selected from the group consisting of polyol esters (POEs), polyalkylene glycols (PAGs), PAG oils, silicone oils, mineral oil, alkylbenzenes (ABs), polyvinyl ethers (PVE) and poly(alpha-olefin) (PAO).

16. The heat transfer composition of claim 15 further comprising a limonene.

17. A heat transfer system comprising:
   a compressor, a condenser, an evaporator, a sequestration material, and a heat transfer composition, wherein:
   (a) said heat transfer composition comprises a POE lubricant and a refrigerant comprising at least about 97% by weight of the following four compounds, with each compound being present in the following relative percentages:
      about 43 to about 47% by weight trifluoroiodomethane (CF3I);
      about 38 to about 42% by weight 1,1,1,2-tetrafluoropropene (HFO-1234yf); about 12 to about 15% by weight difluoromethane (HFC-32); and
      1 to 3.5±0.2% by weight carbon dioxide (CO2); and (b) said sequestration material is comprises:
   i. activated alumina, or
   ii. a zeolite molecular sieve comprising copper, silver, lead or a combination thereof, or
   iii. an anion exchange resin, or
   iv. a moisture-removing material, or
   v. a combination of two or more of the above.

18. The heat transfer system of claim 17 further comprising an oil separator located downstream of the compressor and wherein said sequestration material is located inside the oil separator such that said POE lubricant contacts the sequestration material(s) during operation of said system.

19. A chiller comprising the heat transfer system of claim 18.

20. A commercial refrigeration system comprising the heat transfer system of claim 18.

\* \* \* \* \*